(12) United States Patent
Takahashi

(10) Patent No.: US 12,362,616 B2
(45) Date of Patent: Jul. 15, 2025

(54) ROTATING ELECTRICAL MACHINE

(71) Applicant: DENSO CORPORATION, Kariya (JP)

(72) Inventor: Yuki Takahashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 638 days.

(21) Appl. No.: 17/832,850

(22) Filed: Jun. 6, 2022

(65) Prior Publication Data

US 2022/0302785 A1    Sep. 22, 2022

Related U.S. Application Data

(63) Continuation of application No. PCT/JP2020/045123, filed on Dec. 3, 2020.

(30) Foreign Application Priority Data

Dec. 5, 2019    (JP) ................. 2019-220250

(51) Int. Cl.
*H02K 3/28*    (2006.01)
*H02K 1/2753*    (2022.01)
*H02K 11/33*    (2016.01)
*H02K 21/22*    (2006.01)

(52) U.S. Cl.
CPC ............ *H02K 3/28* (2013.01); *H02K 1/2753* (2013.01); *H02K 11/33* (2016.01); *H02K 21/22* (2013.01); *H02K 2213/03* (2013.01)

(58) Field of Classification Search
CPC ........ H02K 3/28; H02K 1/2753; H02K 11/33; H02K 21/22; H02K 2213/03; H02K 1/2792; H02K 3/522; H02K 5/225
See application file for complete search history.

(56) References Cited

U.S. PATENT DOCUMENTS

| | | |
|---|---|---|
| 2020/0161939 A1 | 5/2020 | Takahashi et al. |
| 2020/0162003 A1 | 5/2020 | Takahashi et al. |
| 2020/0244119 A1 | 7/2020 | Morishita |
| 2020/0328639 A1 | 10/2020 | Takahashi |

(Continued)

FOREIGN PATENT DOCUMENTS

| | | |
|---|---|---|
| JP | H03-106756 A | 5/1991 |
| JP | 2004-088855 A | 3/2004 |

(Continued)

*Primary Examiner* — Christopher M Koehler
*Assistant Examiner* — Riley Owen Stout
(74) *Attorney, Agent, or Firm* — Oliff PLC

(57) ABSTRACT

A rotating electrical machine armature winding includes conductor portions arranged circumferentially away from each other and face a magnet unit. The conductor portions have no inter-conductor members circumferentially disposed therebetween. Each conductor portion includes wire segments of the conductor wire member arranged in circumferentially and radially arranged rows. The conductor portions include a first conductor portion and a second conductor portion which are arranged adjacent to each other in the circumferential direction as a pair and belong to the same phase. The first conductor portion includes the wire segments of the conductor wire member which are arranged asymmetrically with those of the second conductor portion in the circumferential direction. The magnet unit includes magnet which have major magnetic pole faces. Each of the major magnetic pole faces is shaped to have a major magnetic pole angle is selected to be less than or equal to an inter-conductor angle.

16 Claims, 41 Drawing Sheets

(56) References Cited

U.S. PATENT DOCUMENTS

| | | |
|---|---|---|
| 2020/0336031 A1 | 10/2020 | Takahashi |
| 2020/0336033 A1 | 10/2020 | Takahashi |
| 2022/0006356 A1 | 1/2022 | Takahashi et al. |
| 2022/0006357 A1 | 1/2022 | Takahashi et al. |
| 2022/0006358 A1 | 1/2022 | Takahashi et al. |
| 2022/0014074 A1 | 1/2022 | Takahashi et al. |
| 2022/0014075 A1 | 1/2022 | Takahashi et al. |
| 2022/0045578 A1 | 2/2022 | Takahashi et al. |

FOREIGN PATENT DOCUMENTS

| | | |
|---|---|---|
| JP | 2005-121157 A | 5/2005 |
| JP | 2019-106864 A | 6/2019 |
| WO | 2019/131905 A1 | 7/2019 |
| WO | 2019/131915 A1 | 7/2019 |

FIG.28(a)
FIG.28(b)
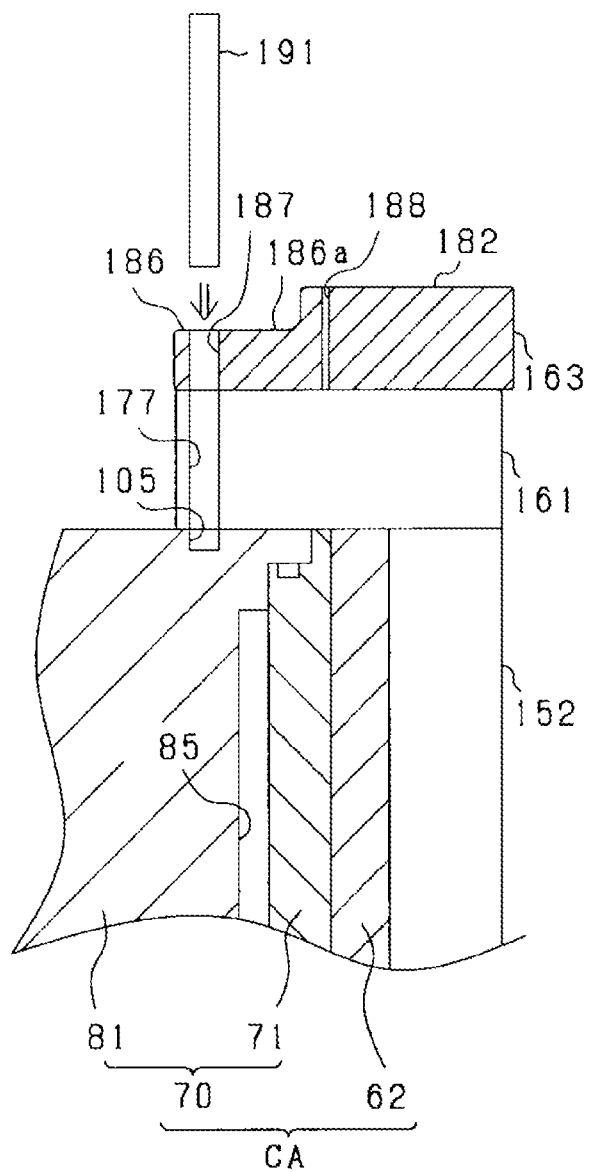
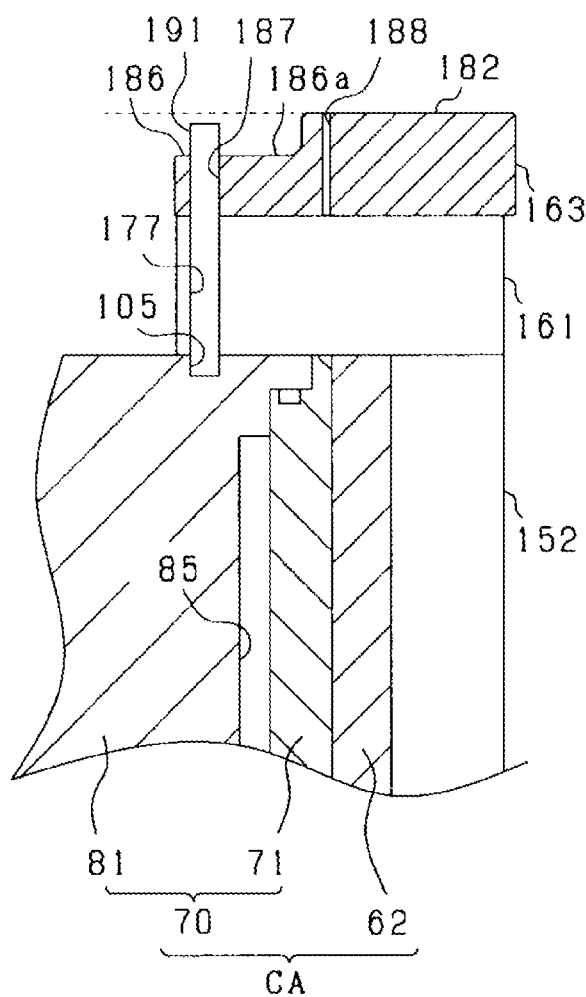

ROTATING ELECTRICAL MACHINE

CROSS REFERENCE TO RELATED DOCUMENT

The present application claims the benefit of priority of Japanese Patent Application No. 2019-220250 filed on Dec. 5, 2019, the disclosure of which is incorporated in its entirety herein by reference.

TECHNICAL FIELD

This disclosure generally relates to a rotating electrical machine.

BACKGROUND

Rotating electrical machines, such as taught in patent literature 1, are known which include a field generator and an armature. The field generator is equipped with a magnet unit having a plurality of magnetic poles whose magnetic polarities alternate in a circumferential direction of the magnet unit. The armature includes a multi-phase armature winding. Such rotating electrical machines employ a slot-less structure in order to eliminate some limitation arising from magnetic saturation occurring in teeth of a stator core and also use polar anisotropic magnets in order to improve the density of magnetic flux in the field generator. This minimizes the limitation due to the magnetic saturation and enhances the degree of output torque from the rotating electrical machines.

PRIOR ART DOCUMENT

Patent Literature

PATENT LITERATURE 1 Japanese Patent First Publication No. 2019-106864

SUMMARY OF THE INVENTION

Typical armature windings generally include a plurality of turns of a conductive wire wound multiple times on teeth (or in slots) of an armature core. Such a structure will have a risk that the turns of the conductive wire wound on the armature core may physically interfere with each other, which results in a difficulty in winding the conductive wire to be symmetrical with respect to the center of each of the teeth in a circumferential direction of the armature core. Such a drawback is usually encountered by structures using a slot-less structure (or tooth-less structure). The presence of the teeth in the armature core, however, causes magnetic flux to pass through the teeth which are high in magnetic permeability, which should be no major concern even if the conductive wire is not wound symmetrically.

The use of the slot-less structure, such as taught in patent literature 1, however, will cause magnetic flux produced by the magnets to directly interlink with the conductive wire of the armature winding, thus leading to a significant problem arising from the asymmetrical winding of the conductive wire, that is, an increase in torque ripple in the rotating electrical machine. Such a type of rotating electrical machine may also experience a variation in electromotive force which results in generation of circulating electrical current.

This disclosure was made in view of the above problem. It is a principal object of this disclosure to provide a rotating electrical machine which has a slot-less structure and is capable of minimizing an adverse effect arising from asymmetrical winding of a conductive wire.

Various exemplary aspects disclosed in this specification respectively use different technical means for achieving their objects. The objects, features, and beneficial advantages in this specification will be apparent from the following detailed descriptions and the appended drawings.

In order to solve the above problem, the first means is to provide a rotating electrical machine which comprises: (a) a magnetic field-producing unit including a magnet unit which is equipped with a plurality of magnetic poles whose polarities alternate in a circumferential direction of the magnet unit; (b) an armature which includes a multi-phase armature winding; and (c) a rotor which is implemented by one of the magnetic field-producing unit and the armature. The armature winding is made of a winding of a conductor wire member and includes conductor portions which face the magnet unit and are arranged at a given interval away from each other in a circumferential direction of the armature. The armature is configured to have one of a first, a second, and a third structure: the first structure is equipped with inter-conductor members each of which is disposed between the conductor portions in the circumferential direction and made using a magnetic material which meets a relation of Wt×Bs≤Wm×Br where Wt is a width of the inter-conductor members in the circumferential direction within one magnetic pole, Bs is a saturation magnetic flux density of the inter-conductor members, Wm is a width of a portion of the magnet unit equivalent to one magnetic pole in the circumferential direction, and Br is the remanent flux density in the magnet unit, the second structure has the inter-conductor members each of which is made of a non-magnetic material, and the third structure has no inter-conductor members disposed between the conductor portions in the circumferential direction. Each of the conductor portions includes wire segments of the conductor wire member which are arranged in a plurality of circumferentially arranged rows and a plurality of radially arranged rows. The conductor portions include a first conductor portion and a second conductor portion which are arranged adjacent to each other in the circumferential direction as a pair and belong to the same phase. The first conductor portion includes the wire segments of the conductor wire member which are arranged asymmetrically with those of the second conductor portion in the circumferential direction. The magnet unit includes a plurality of magnets which are arranged adjacent to each other in the circumferential direction. The magnets have armature-facing peripheral surfaces which include major magnetic pole faces each of which is disposed across a d-axis that is a center of the magnetic pole. A major magnetic pole angle is selected to be less than or equal to an inter-conductor angle. The major magnetic pole angle is an angle which a first straight line makes with a second straight line. The first straight line is defined to extend between one of circumferentially opposed ends of each of the major magnetic pole faces and the center of rotation of the rotor. The second straight line is defined to extend between the other end of a corresponding one of the major magnetic pole faces and the center of rotation of the rotor. The inter-conductor angle is an angle which a third straight line makes with a fourth straight line. The third straight line is defined to extend between a circumferentially inner end of one of the first and second conductor portions and the center of rotation of the rotor. The fourth straight line is defined to extend between a circumferentially inner end of other of the first and second conductor portions and the center of rotation of the rotor.

The above angular relation results in each of the major magnetic pole faces not simultaneously facing the paired first and second conductor portions belonging to the same phase. This minimizes the torque ripple regardless of the asymmetric arrangement of the wire segments of the first and second conductor portions. The fact that each major magnetic pole face does not simultaneously face the first and second conductor portions of the same phase serves to reduce the circulating current.

The second means is to provide the rotating electrical machine in the first means wherein the major magnetic pole angle is selected to meet a relation of 0<θa≤120°, and two of the major magnetic pole faces which are arranged adjacent to each other in the circumferential direction are located at an interval of 60° or more in electrical angle away from each other.

The above angular relation causes the major magnetic pole faces not to face the first and second conductor portions belonging to the same phase at the same time.

The third means is to provide the rotating electrical machine in the first or second means wherein each of the magnets is magnetically oriented to have easy axes of magnetization which extend more parallel to the d-axis in a region close to the d-axis than that in a region close to a q-axis that is a magnetic boundary between the poles. The easy axes of magnetization define magnetic paths extending therealong. Each of the magnets has a magnet recess formed in a peripheral surface thereof facing the armature. The magnet recess lies around the q-axis and is curved inward in the magnet in a radial direction of the magnet unit. Each of the magnet recesses occupies an electrical angle of 60° or more across the q-axis. Each of the major magnetic pole faces lies between two of the magnet recesses which are arranged adjacent to each other in the circumferential direction.

The above arrangements enable the volume of material of the magnets to be reduced without sacrificing the density of magnetic flux around the d-axis, also enable the magnetic paths in the magnets to have an increased length, and facilitate concentration of magnetic flux flowing from around the d-axis, thereby enhancing the density of magnetic flux around the d-axis.

The fourth means is to provide the rotating electrical machine in one of the first to third means wherein if the number of phases of the armature winding is expressed by S, the major magnetic pole angle is selected to meet a relation of 0<θa≤2π/S in electrical angle.

The fifth means is to provide the rotating electrical machine in one of the first to fourth means wherein the armature winding includes a plurality of winding segments each of which is of a circular shape and made of a winding of the conductor wire member, each of the winding segments includes the pair of first and second conductor portions and a pair of link portions which connects the first and second conductor portions together, and each of the first and second conductor portions has a first row that is one of the radially arranged rows of the wire segments of the conductor wire member. The first row is located at one of radial ends of a corresponding one of the first and second conductor portions. The wire segments of the first rows are asymmetrically arranged in the circumferential direction between the first and second conductor portions. Each of the first and second conductor portions also has a second row that is one of the radially arranged rows of the wire segments other than the first row. The wire segments of the second rows are symmetrically arranged in the circumferential direction between the first and second conductor portions.

The above arrangements result in a decreased number of the wire segments of the conductor wire member arranged asymmetrically between the first and second conductor portions, thereby minimizing adverse effects arising from the asymmetrical arrangement of the wire segments, and also results in a decreased size of an air gap between the wire segments to improve the space factor of the armature winding.

BRIEF DESCRIPTION OF THE DRWAWINGS

The above-described object, and other objects, features, or beneficial advantages in this disclosure will be apparent from the appended drawings or the following detailed discussion.

Figure 19A:
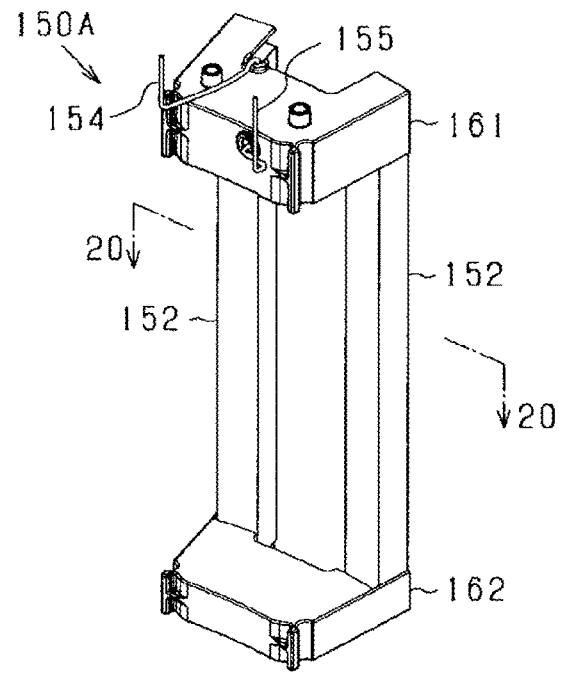
Figure 19B:
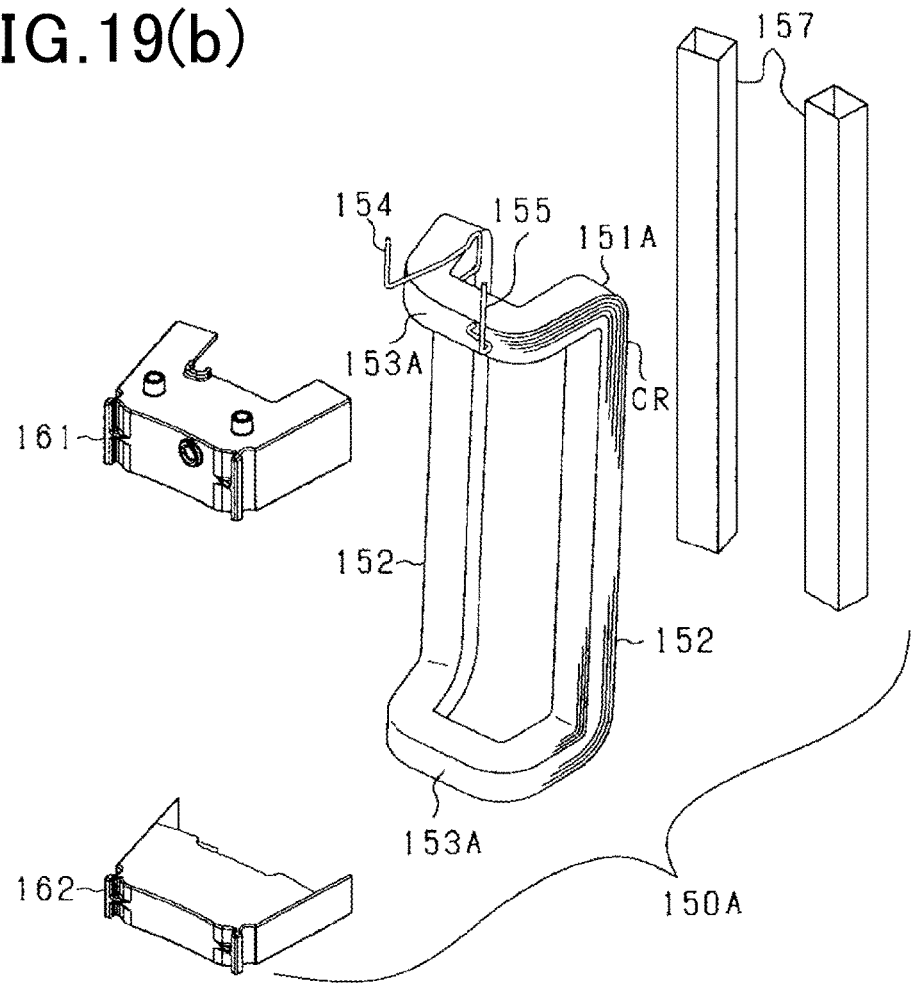
Figure 20:
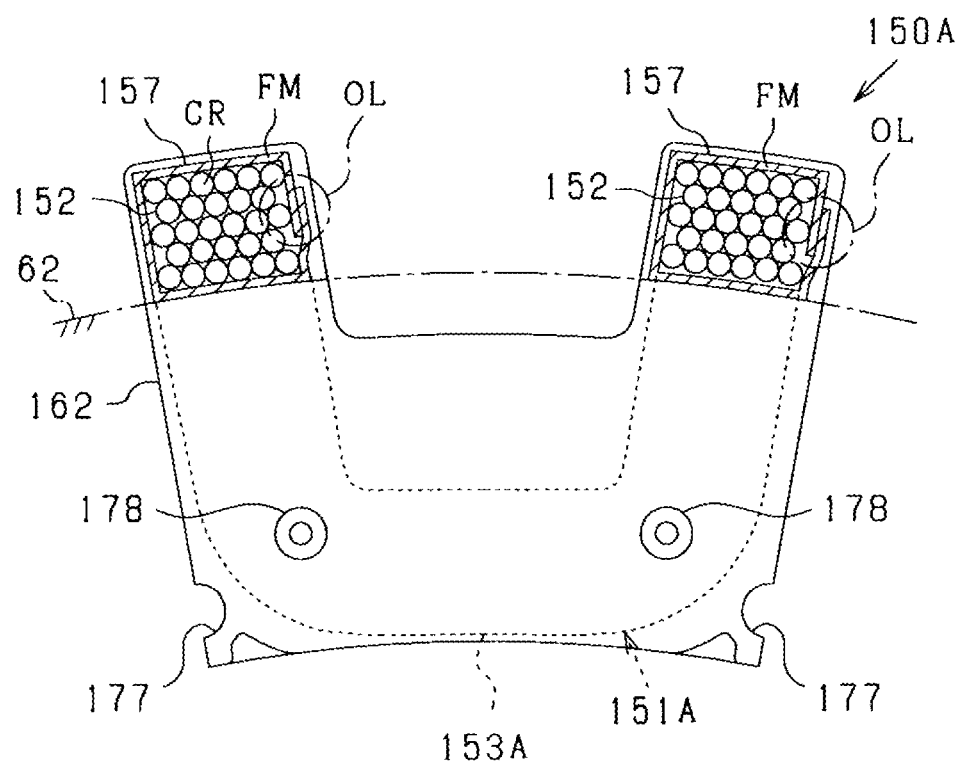
Figure 22A:
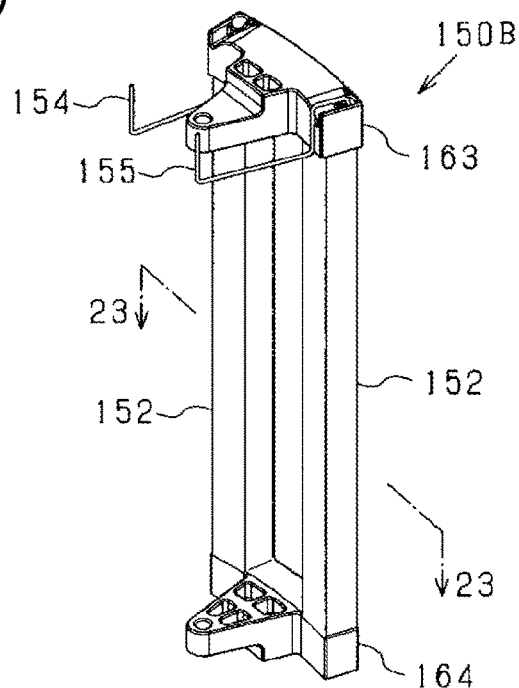
Figure 22B:
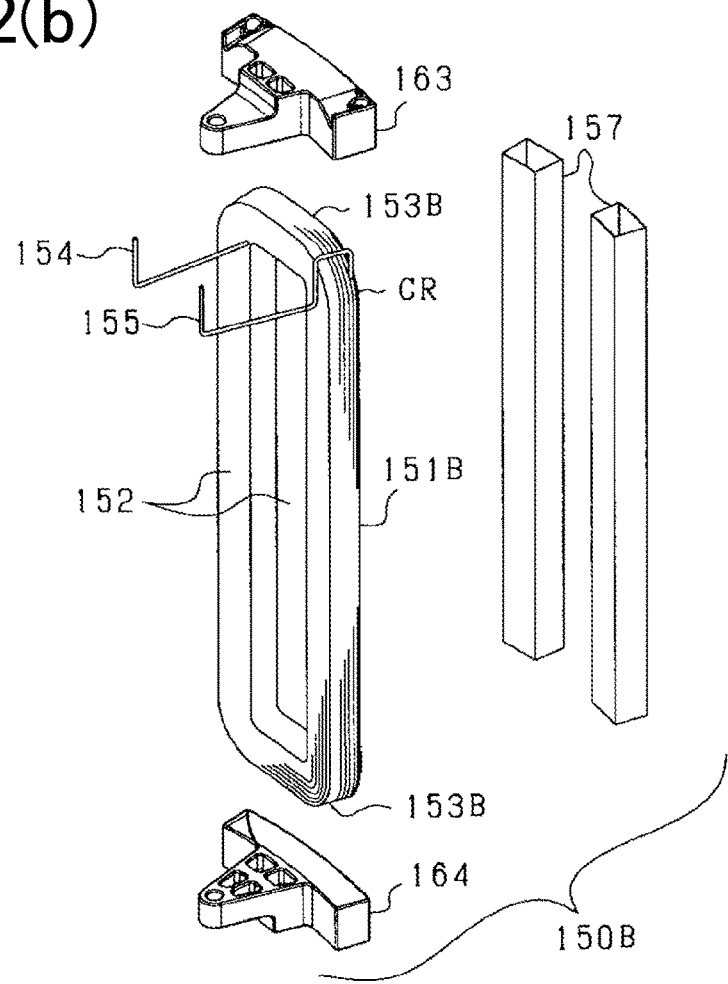
Figure 23:
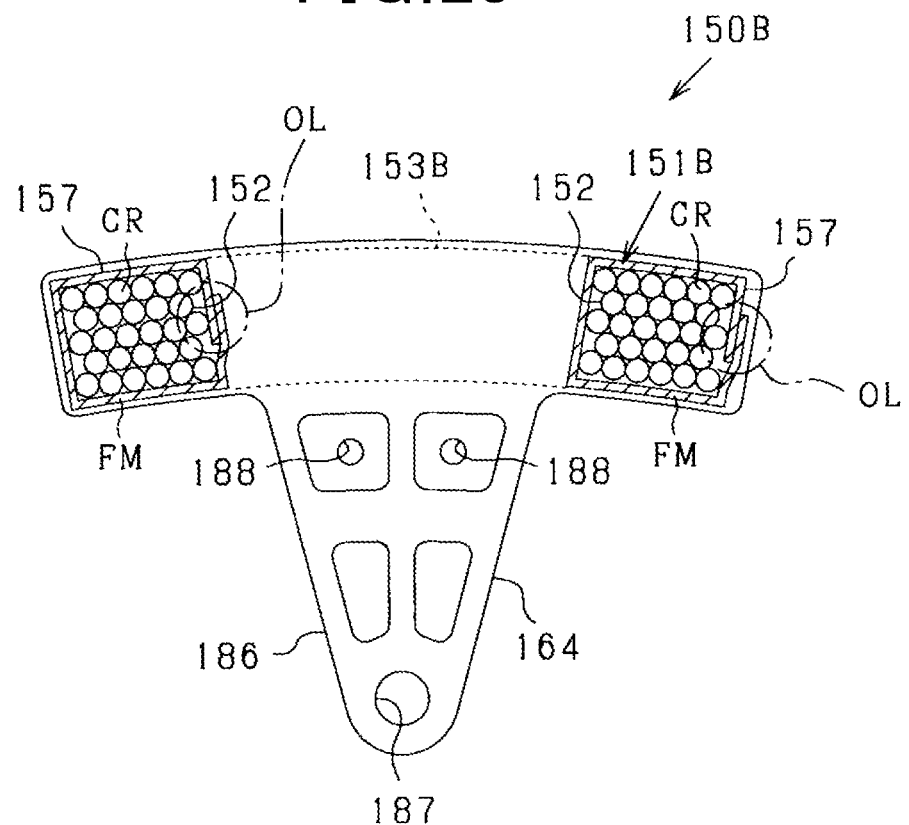
Figure 25:
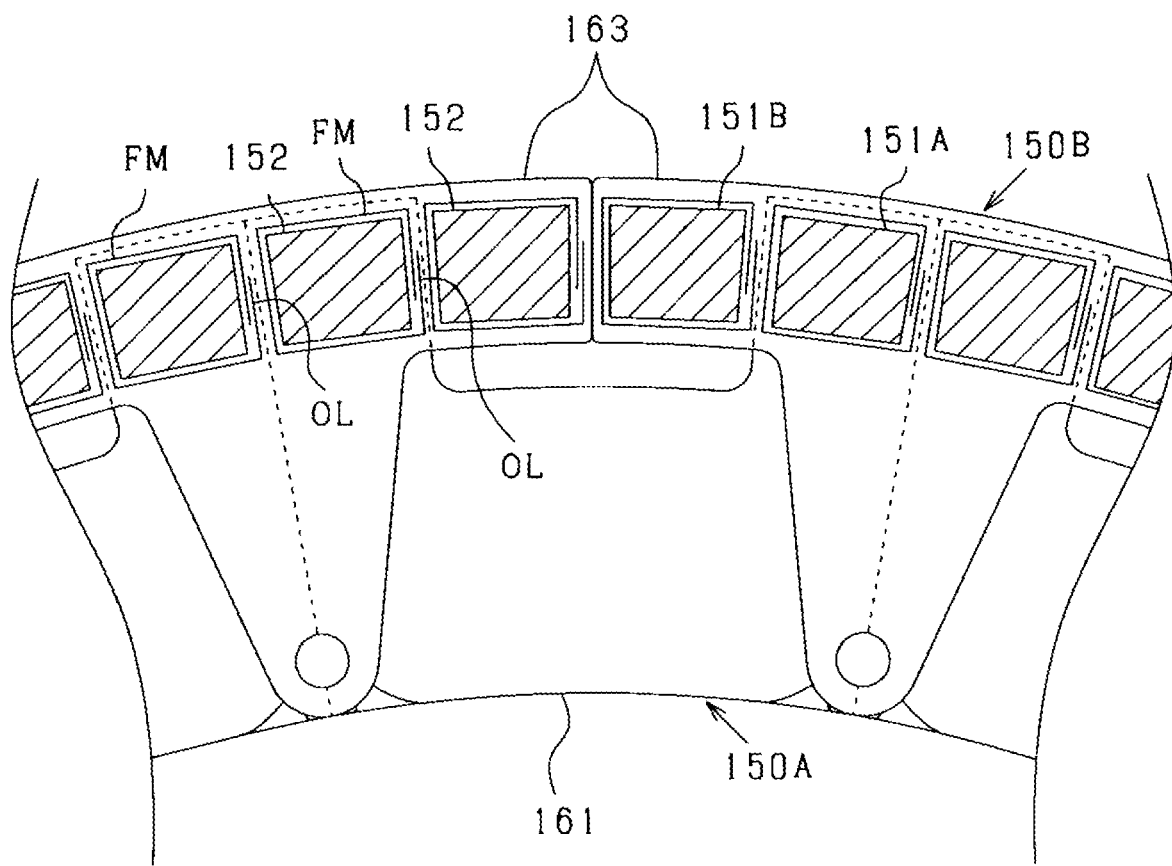
Figure 26:
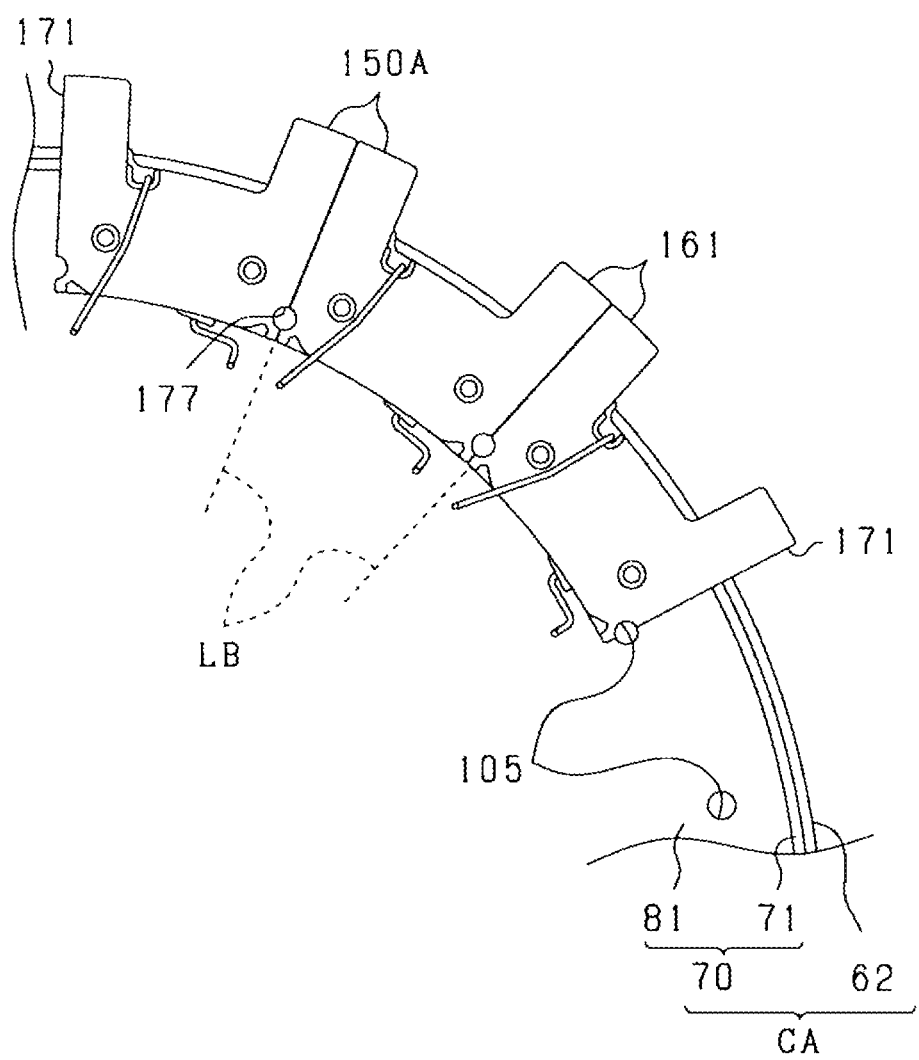
Figure 27:
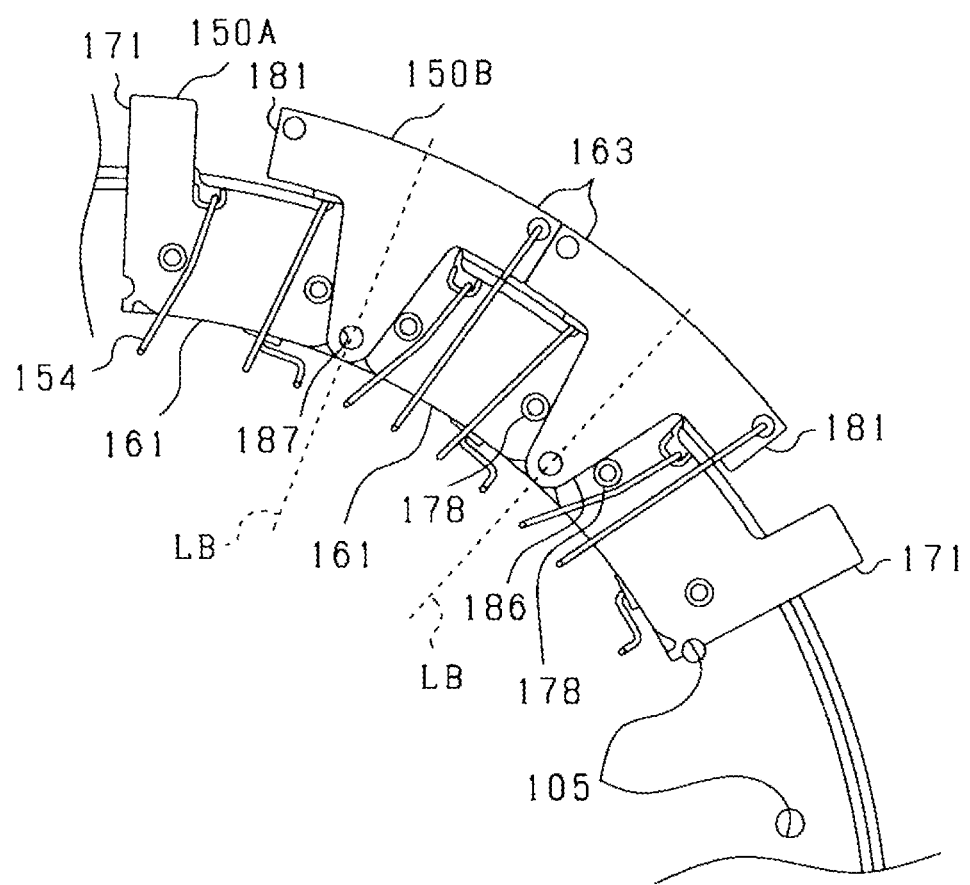
Figure 29:
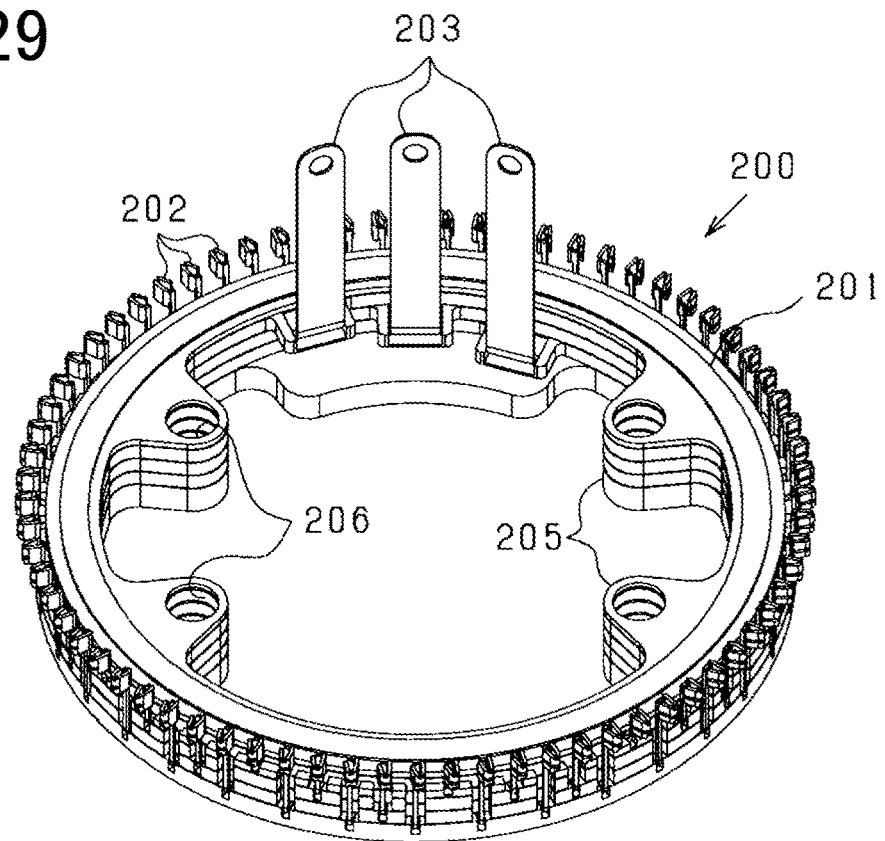
Figure 30:
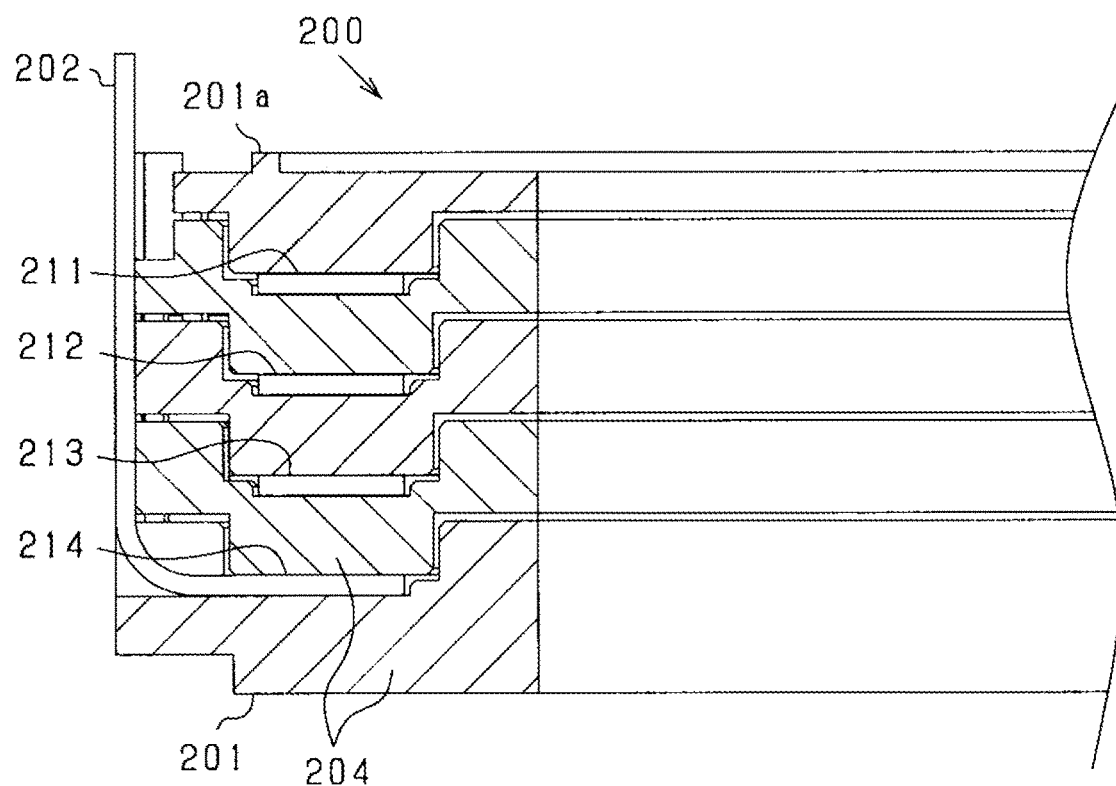
Figure 31:
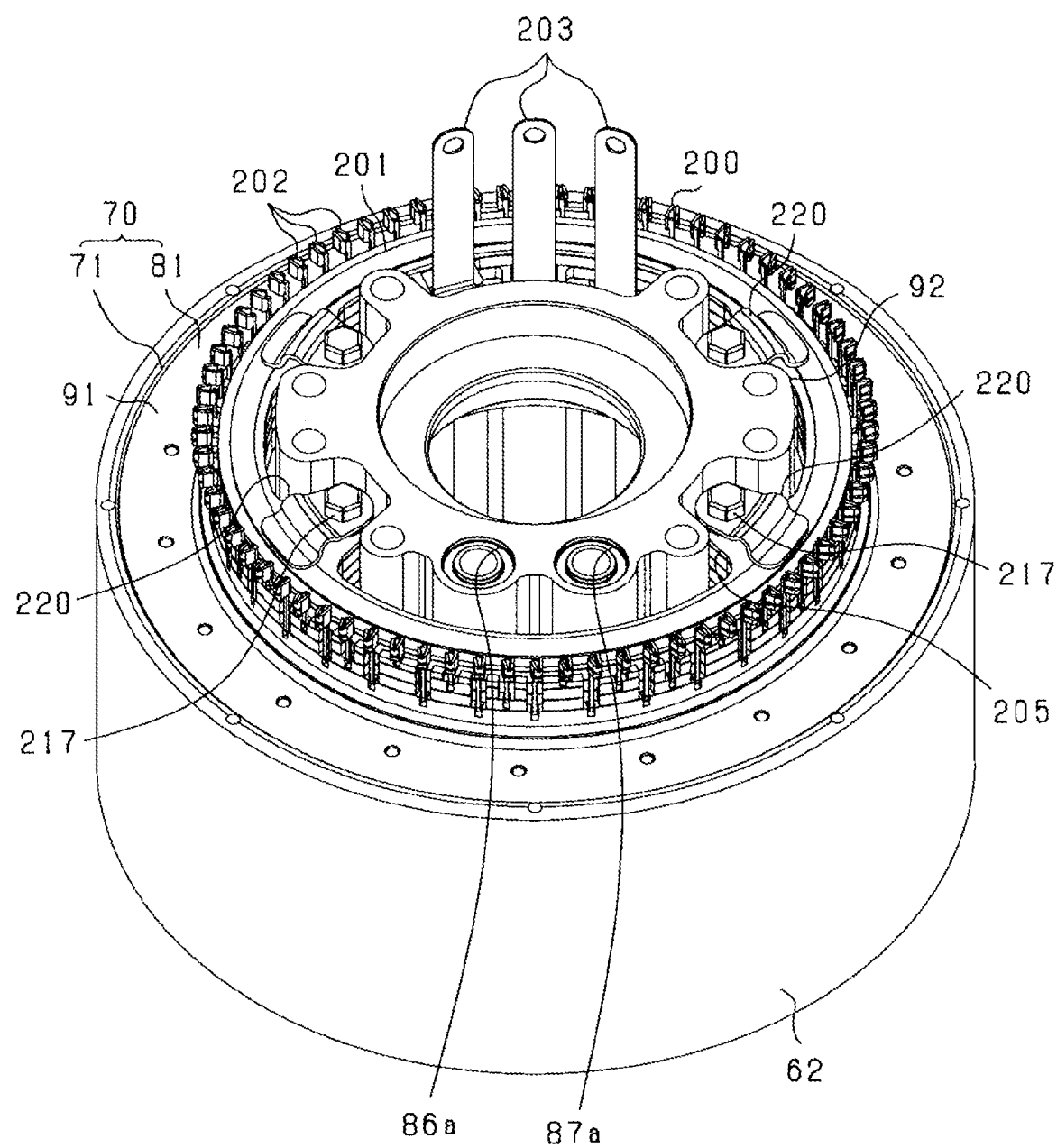
Figure 32:
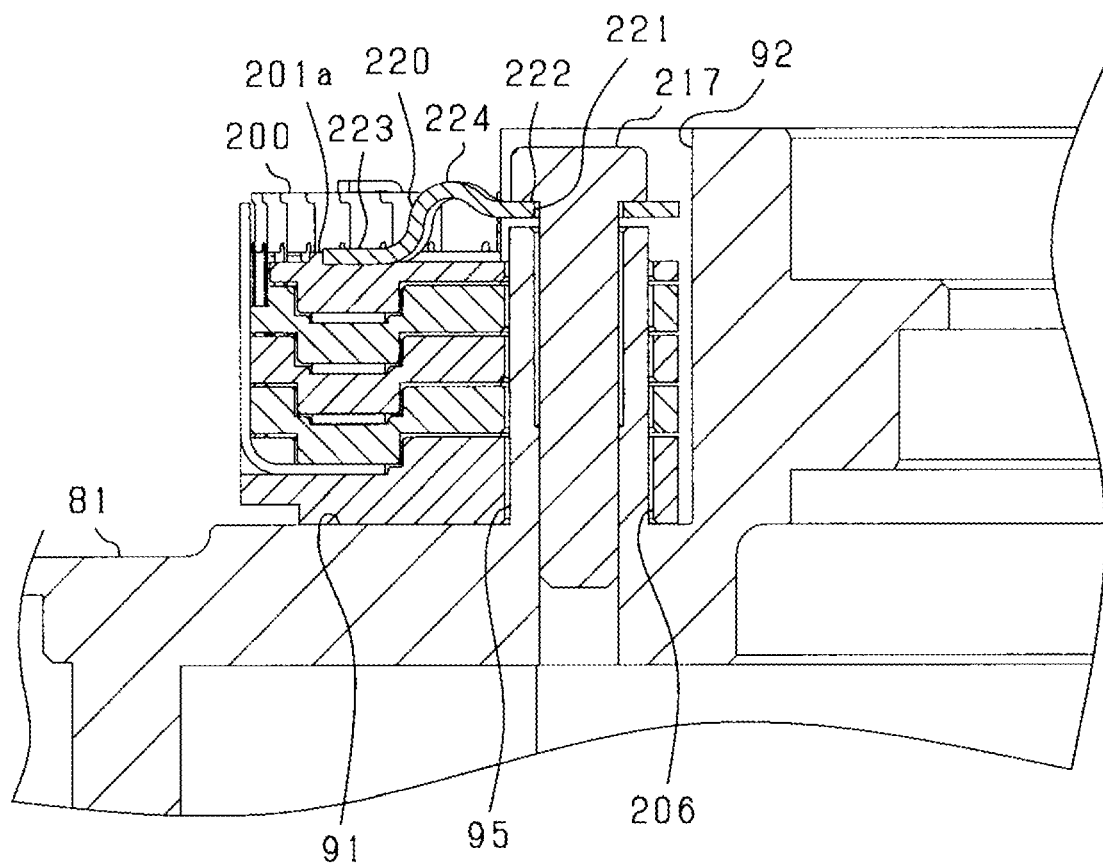
Figure 33:
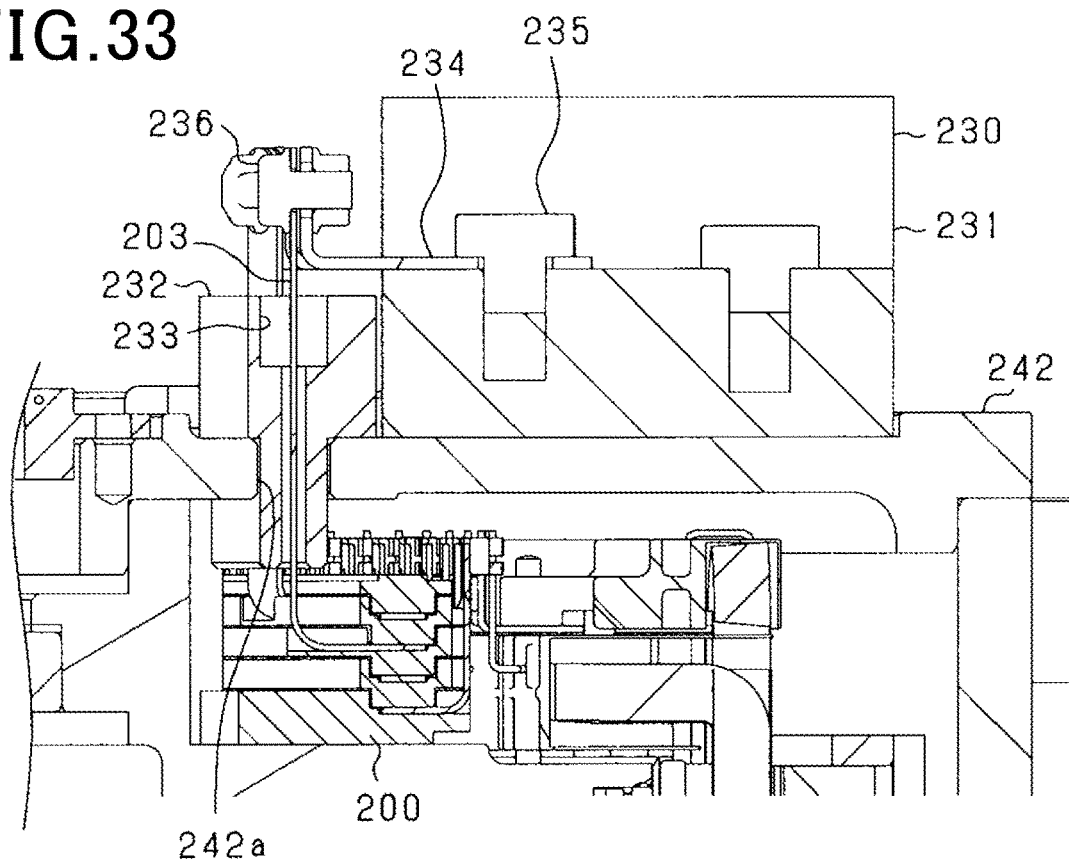
Figure 34:
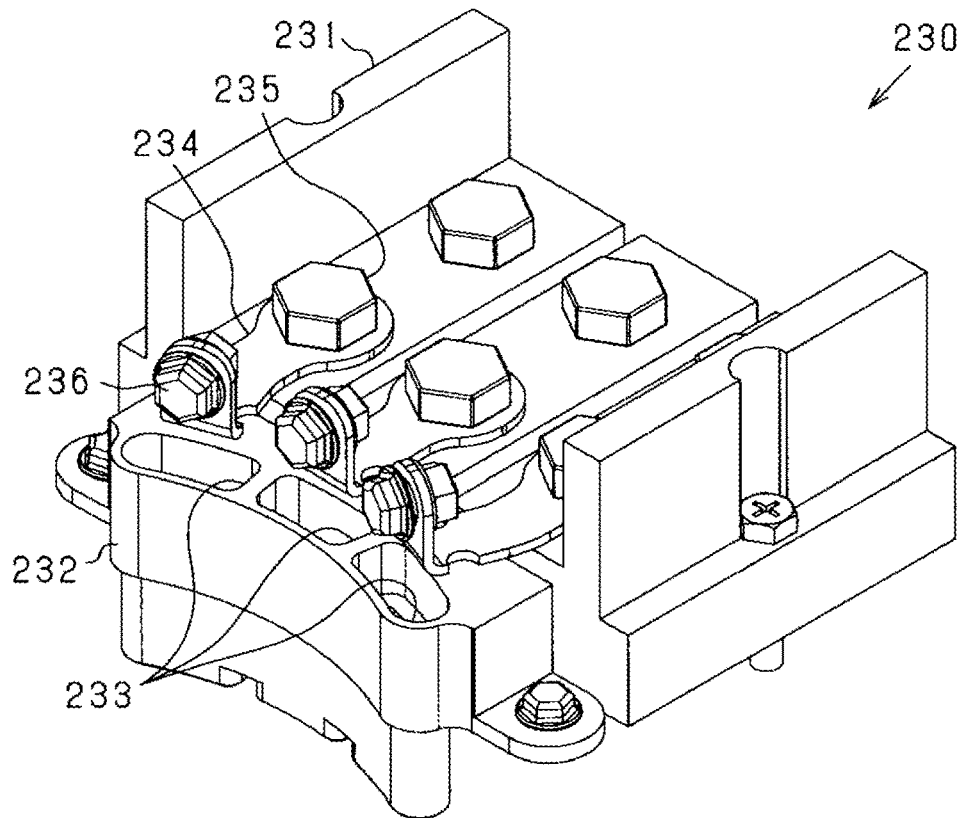
Figure 35:
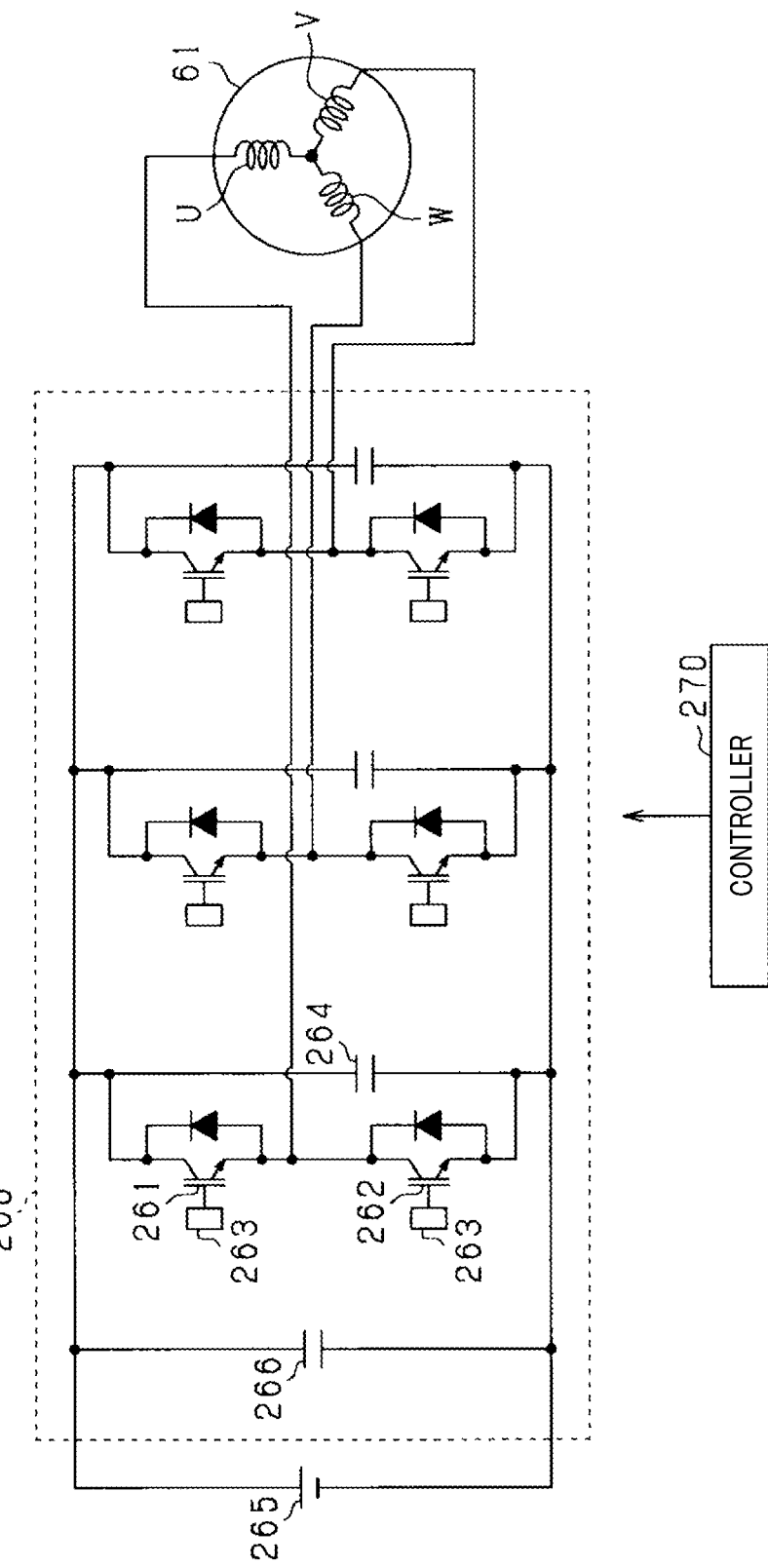
Figure 36:
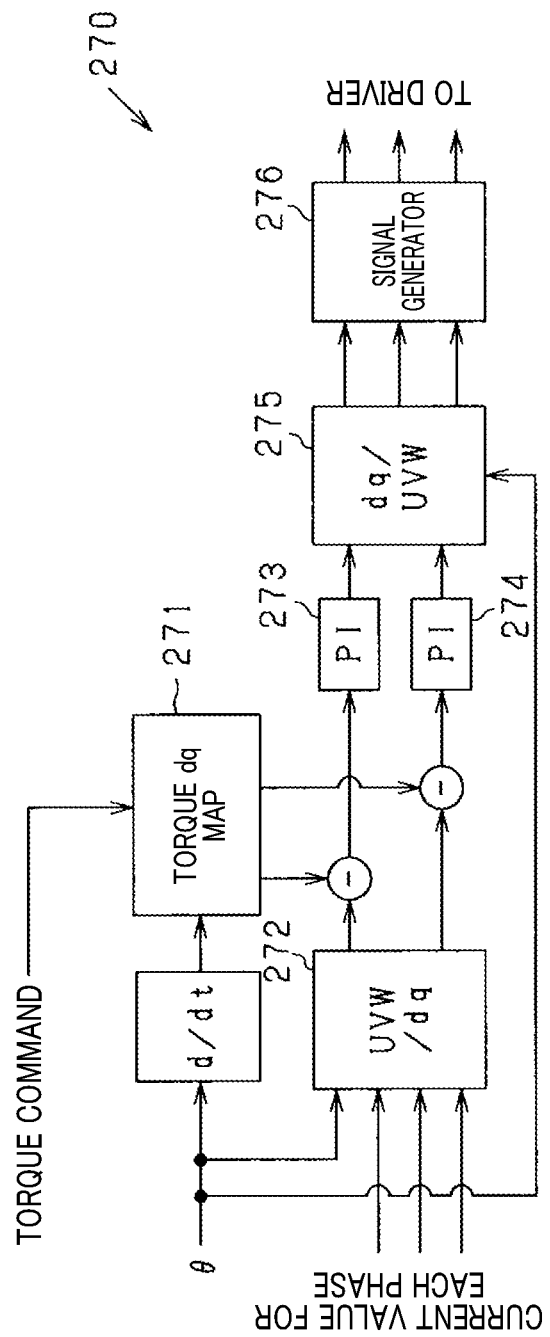
Figure 37:
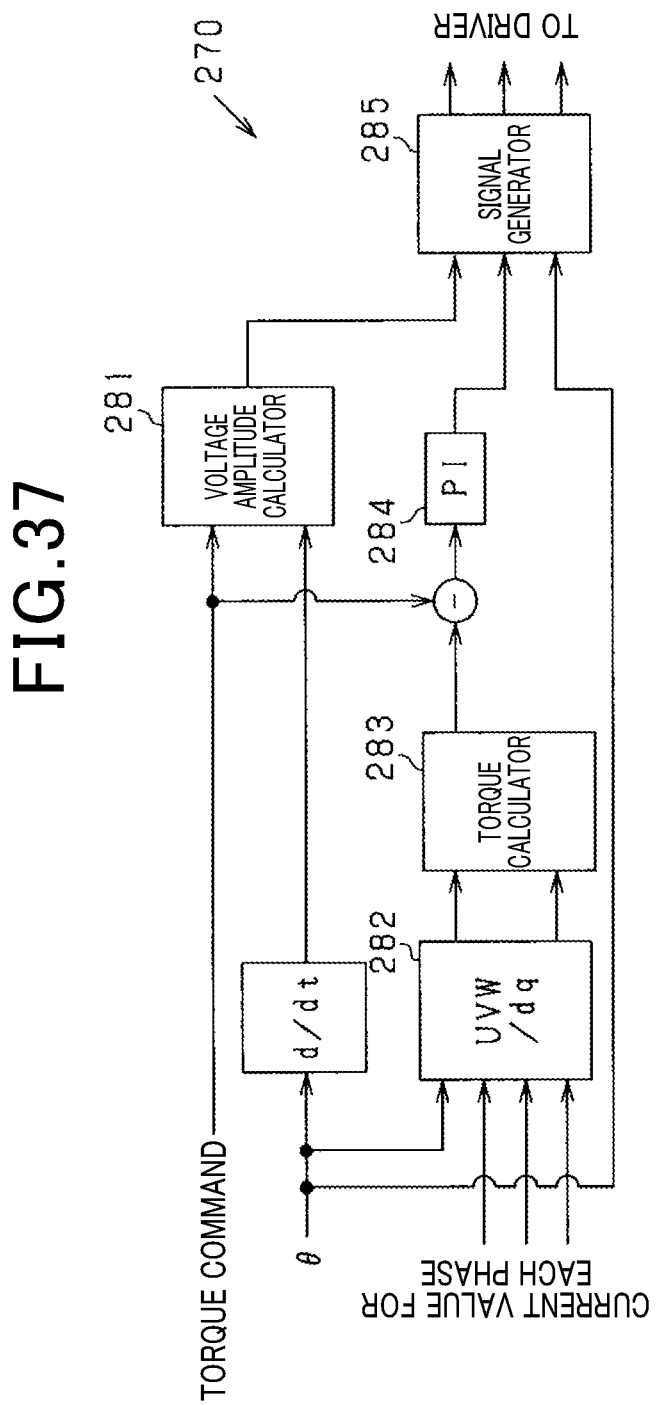
Figure 38:
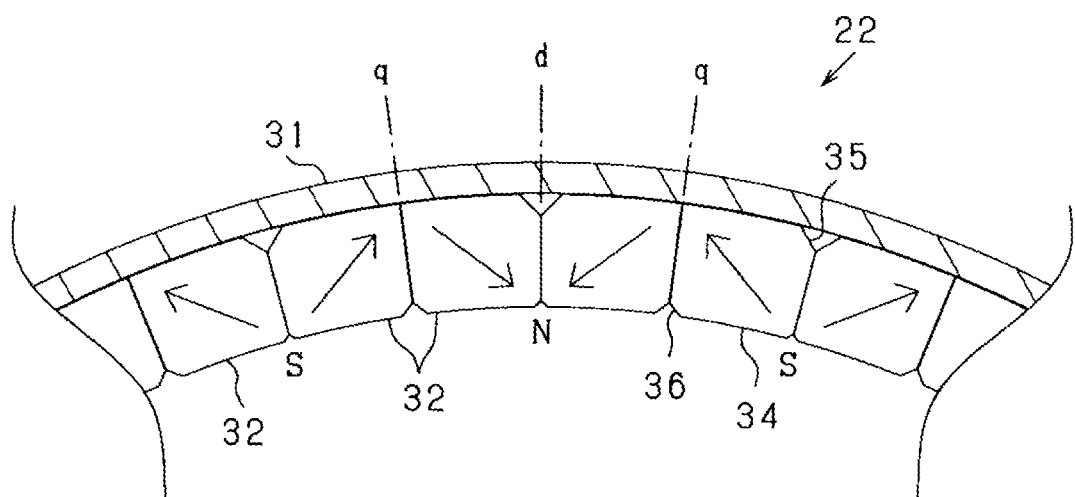
Figure 39A:
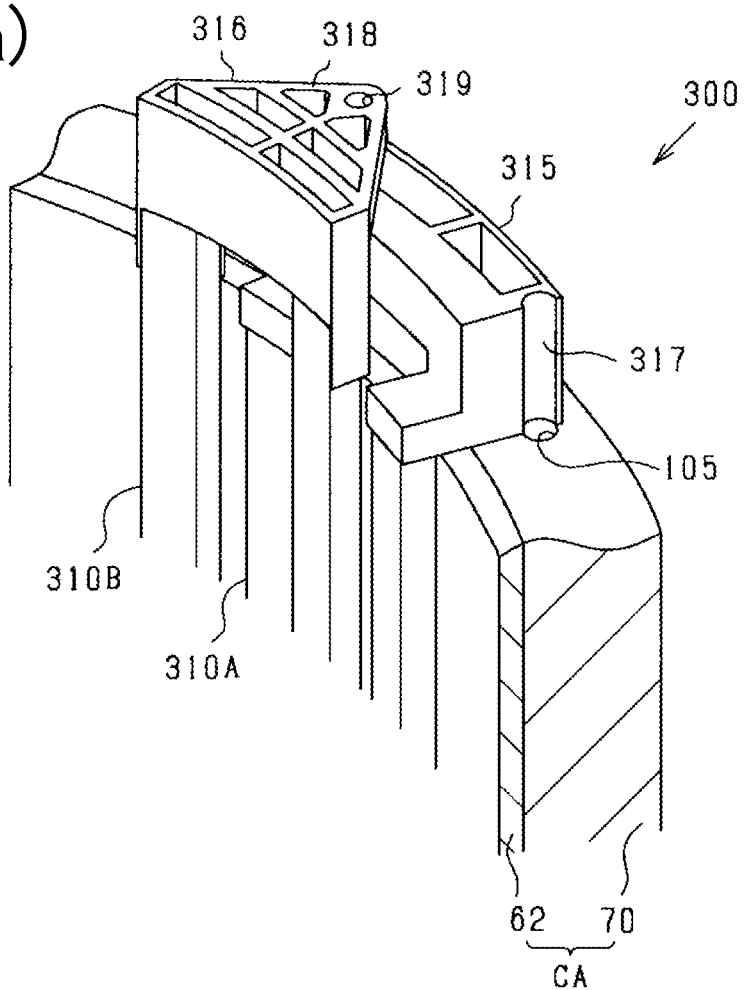
Figure 39B:
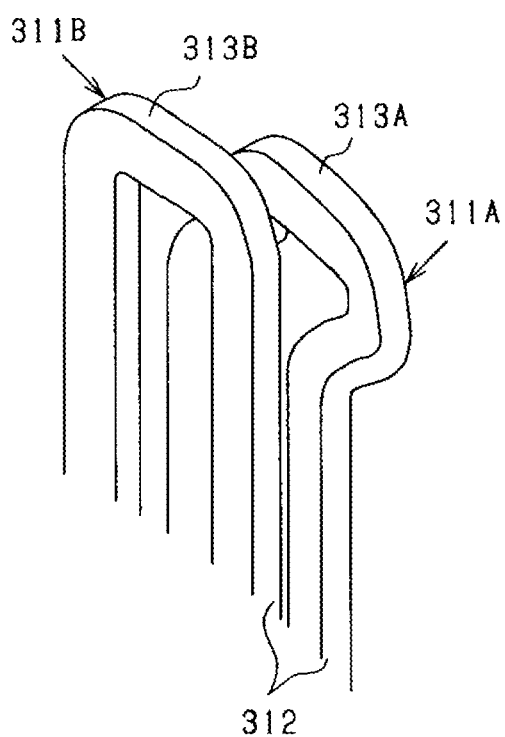
Figure 40:
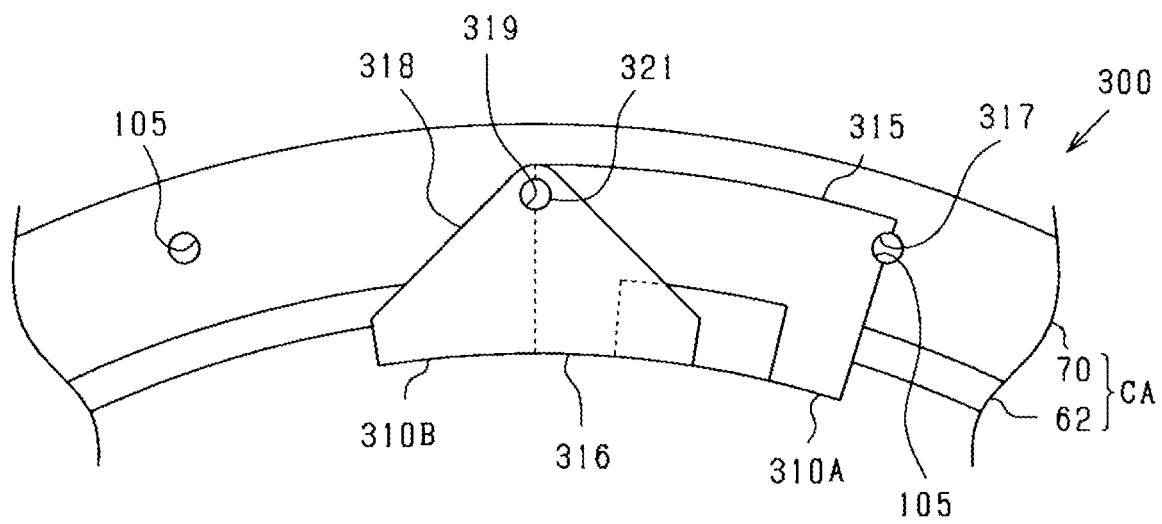
Figure 41:
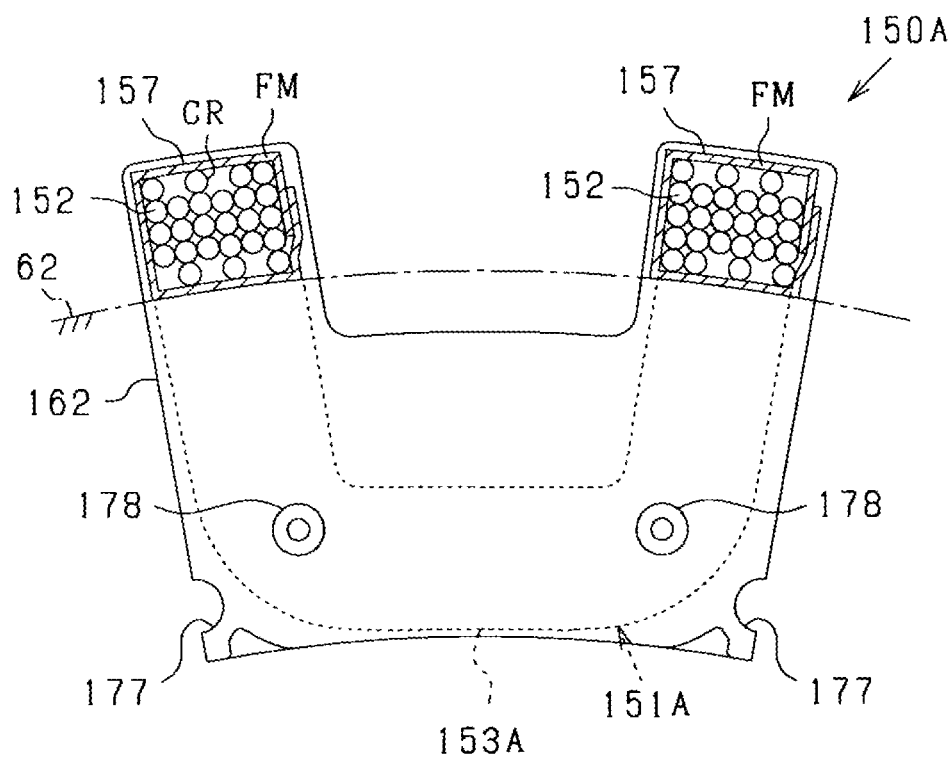
Figure 42:
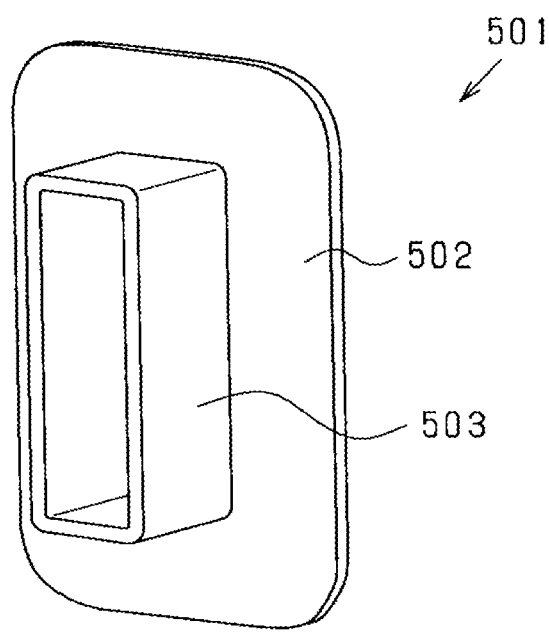
Figure 43:
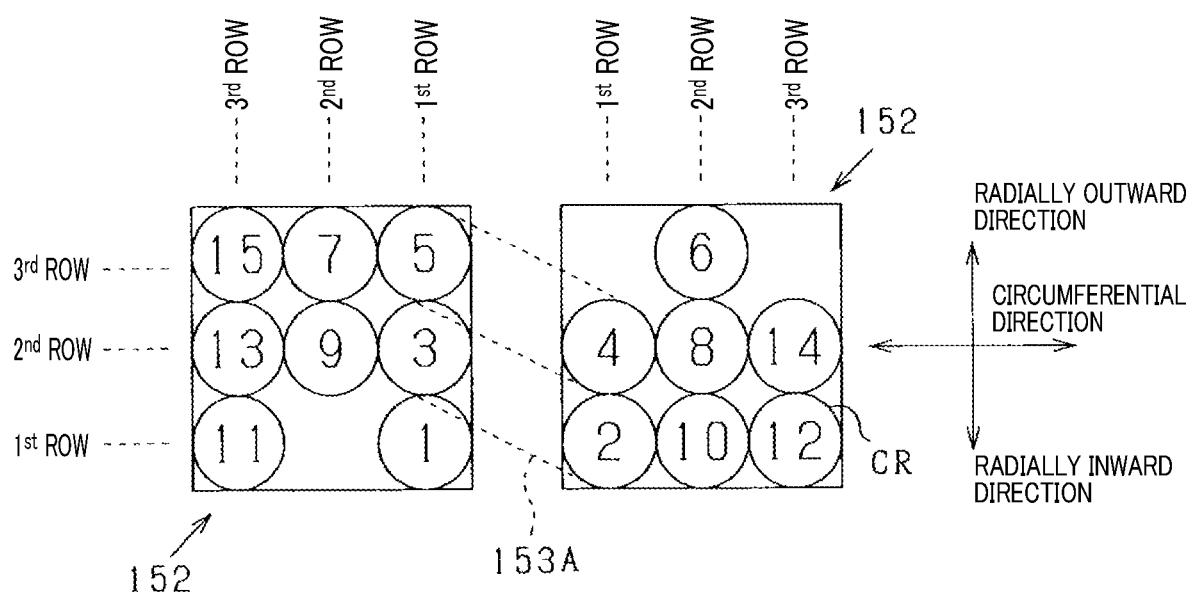
Figure 44:
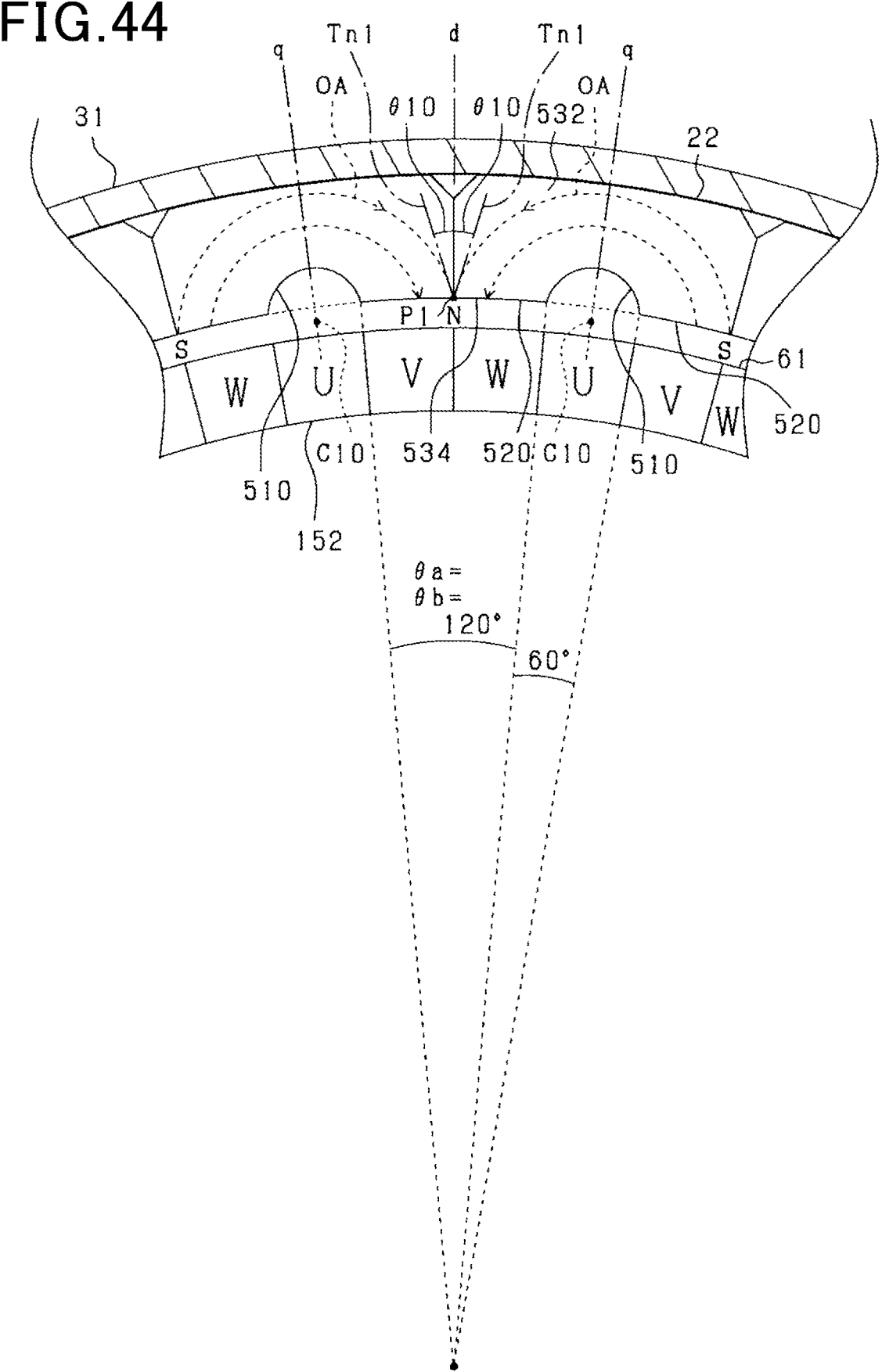
Figure 45:
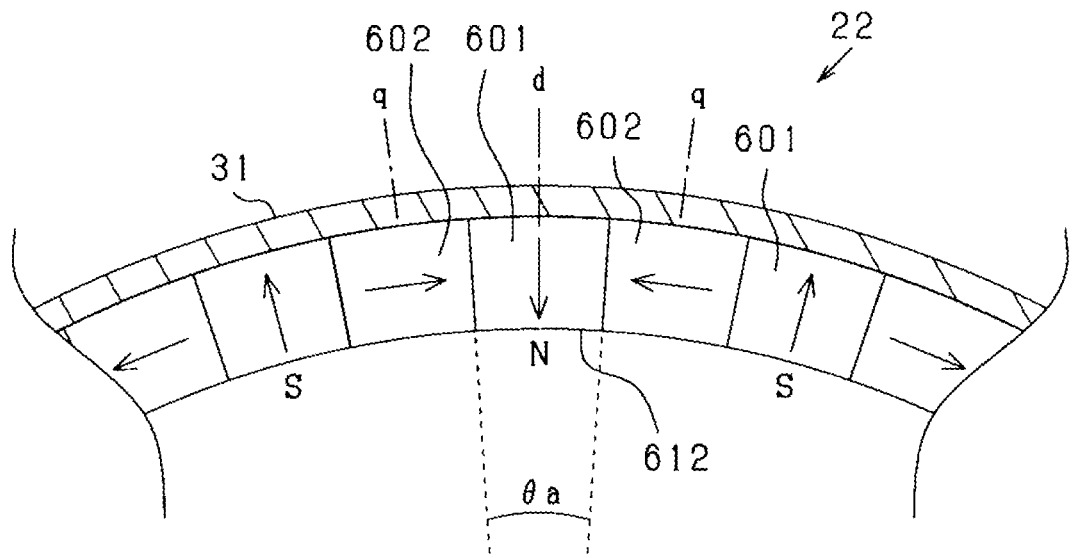
Figure 46:
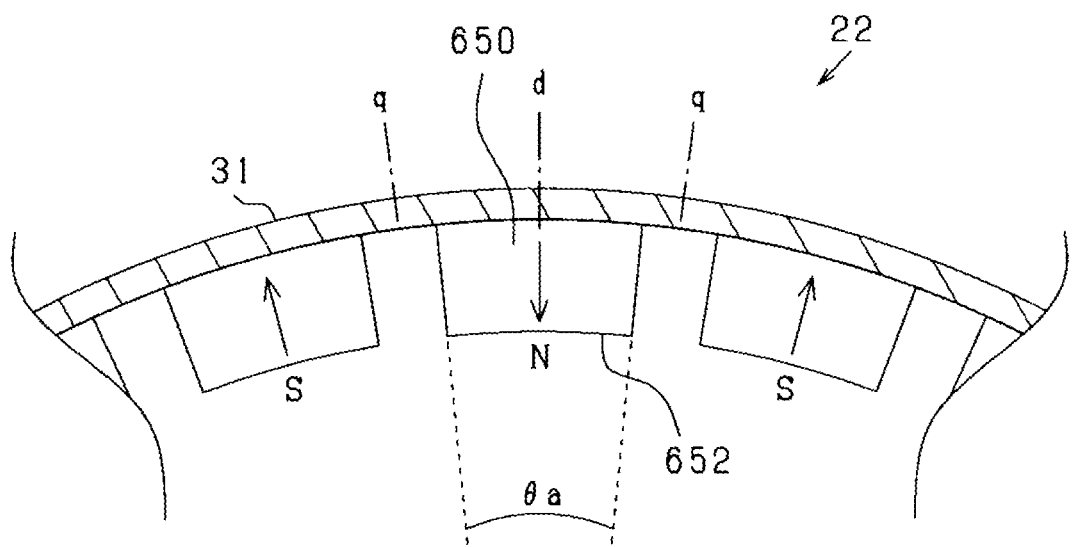
Figure 47:
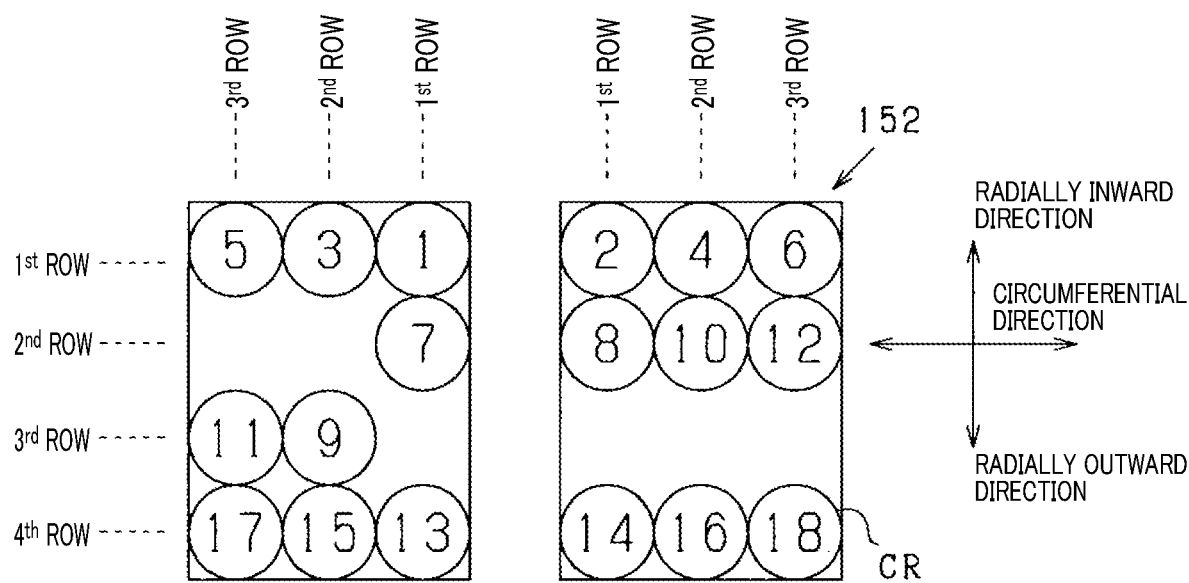

FIGS. 19(*a*) and 19(*b*) are views which illustrate a structure of a first coil module;

FIG. 20 is a sectional view taken along the line 20-20 in FIG. 19(*a*);

FIGS. 21(*a*) and 21(*b*) are perspective views which illustrate a structure of an insulating cover;

FIGS. 22(*a*) and 22(*b*) are views which illustrate a structure of a second coil module;

FIG. 23 is a sectional view taken along the line 23-23 in FIG. 22(*a*);

FIGS. 24(*a*) and 24(*b*) are perspective views which illustrate a structure of an insulating cover;

FIG. 25 is a view which illustrates an overlap of film members in a circumferential array of coil modules;

FIG. 26 is a plan view which illustrates attachment of a first coil module to a core assembly;

FIG. 27 is a plan view which illustrates attachment of a first coil module and a second coil module to a core assembly;

FIGS. 28(a) and 28(b) are longitudinal sectional views which illustrate a fastened state using fastening pins;

FIG. 29 is a perspective view of a bus module;

FIG. 30 is a partial longitudinal sectional view of a bus module;

FIG. 31 is a perspective view which shows a bus module attached to a stator holder;

FIG. 32 is a longitudinal view which a fastening portion for fastening a bus module;

FIG. 33 is a longitudinal sectional view which illustrates a lead member mounted on a housing cover;

FIG. 34 is a perspective view of a lead member;

FIG. 35 is an electrical circuit diagram which illustrates a control system for a rotating electrical machine;

FIG. 36 is a functional block diagram which shows a current feedback control operation of a control device;

FIG. 37 is a functional block diagram which shows a torque feedback control operation of a control device;

FIG. 38 is a partial transverse sectional view which illustrates a modified form of a magnet unit;

FIGS. 39(a) and 39(b) are views which illustrate a structure of an inner-rotor stator unit;

FIG. 40 is a plan view which illustrates a coil module attached to a core assembly;

FIG. 41 is a view which illustrates a structure of a first coil module in the second modification;

FIG. 42 is a perspective view which illustrates a bobbin;

FIG. 43 is a schematic view which illustrates the layout of segments of a conductor wire member;

FIG. 44 is a cross sectional view which shows a magnet unit in the second modification;

FIG. 45 is a cross sectional view which shows a magnet unit in another variation;

FIG. 46 is a cross sectional view which shows a magnet unit in another variation; and FIG. 47 is a schematic view which illustrates the layout of segments of a conductor wire member in another variation.

EMBODIMENTS FOR CARRYING OUT THE INVENTION

The embodiments will be described below with reference to the drawings. Parts of the embodiments functionally or structurally corresponding to each other or associated with each other will be denoted by the same reference numbers or by reference numbers which are different in the hundreds place from each other. The corresponding or associated parts may refer to the explanation in the other embodiments.

The rotating electrical machine in the embodiments is configured to be used, for example, as a power source for vehicles. The rotating electrical machine may, however, be used widely for industrial, automotive, domestic, office automation, or gaming applications. In the following embodiments, the same or equivalent parts will be denoted by the same reference numbers in the drawings, and explanation thereof in detail will be omitted.

First Embodiment

Figure 1:
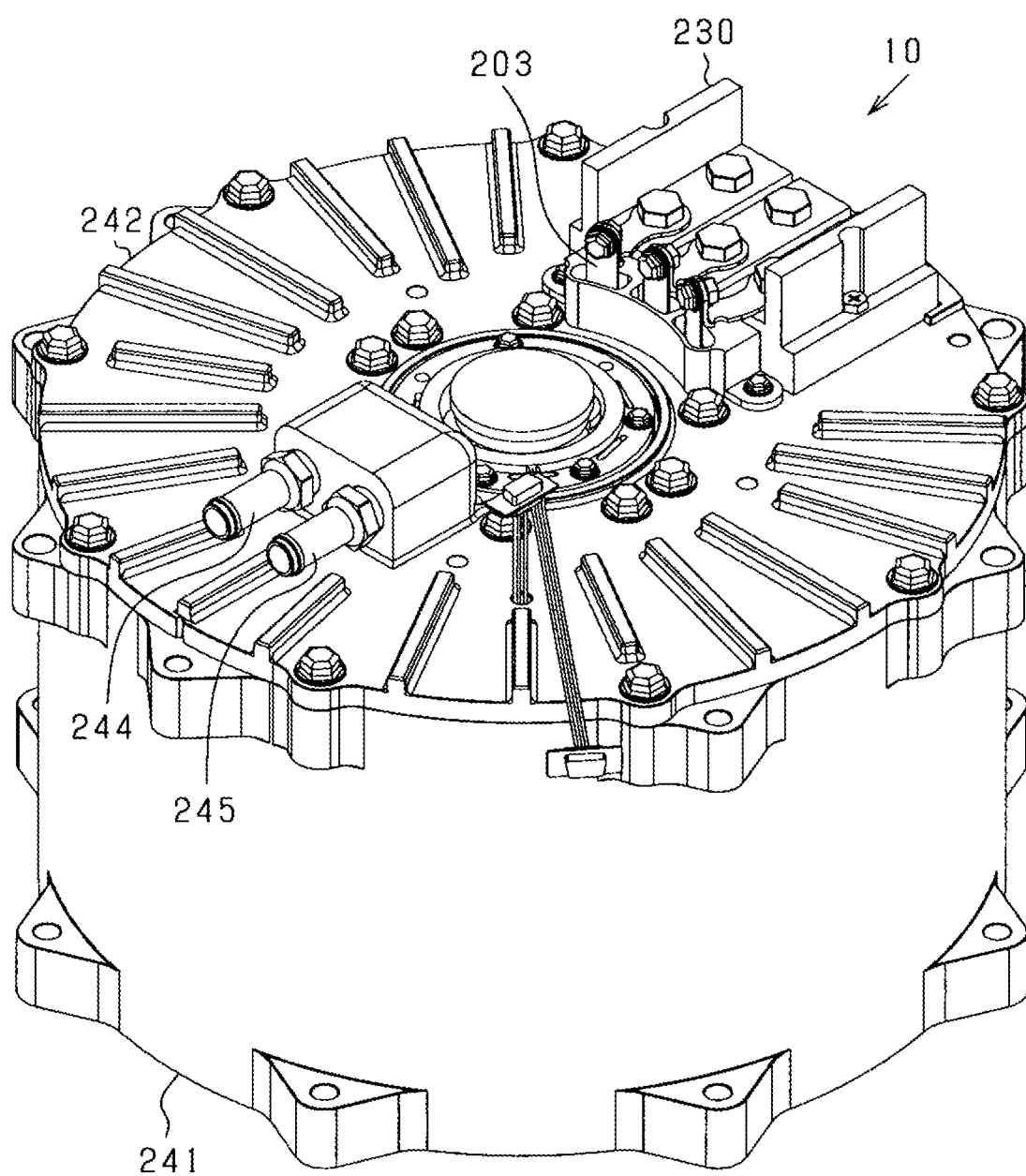
FIG. 1 is a perspective view which illustrates an entire structure of a rotating electrical machine according to the first embodiment.
Figure 2:
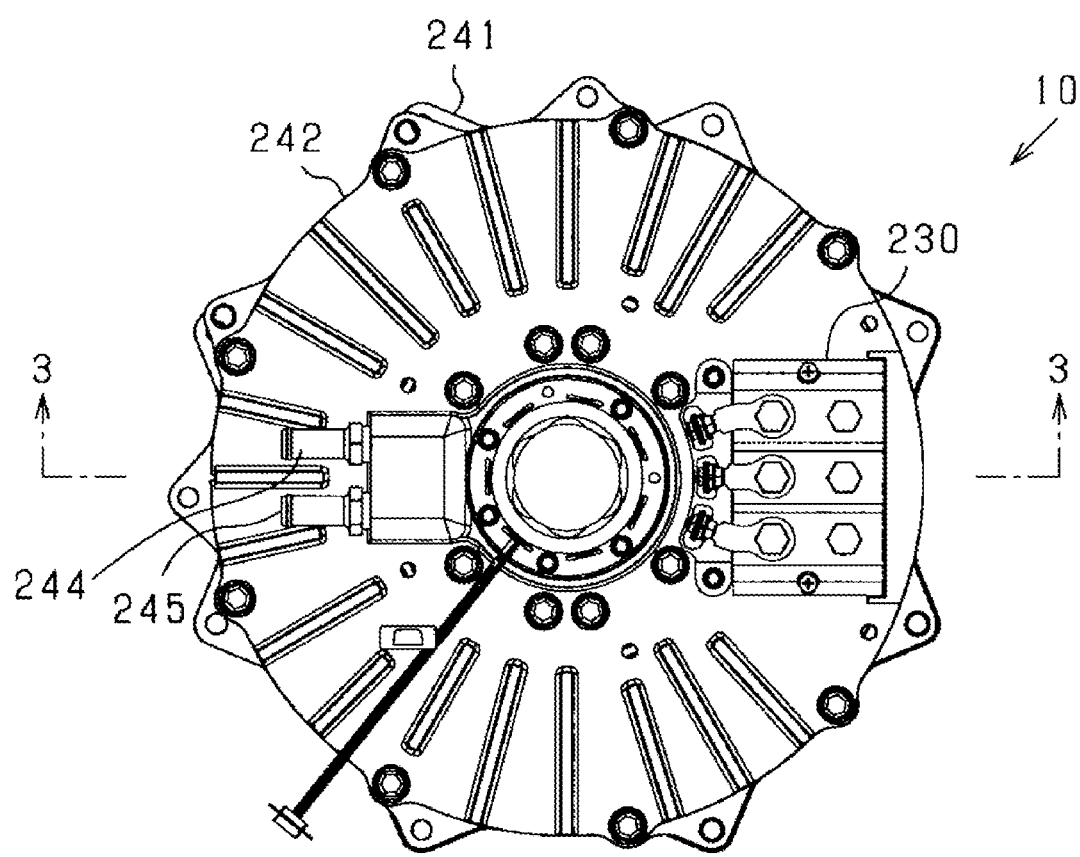
FIG. 2 is a plan view of a rotating electrical machine.
Figure 3:
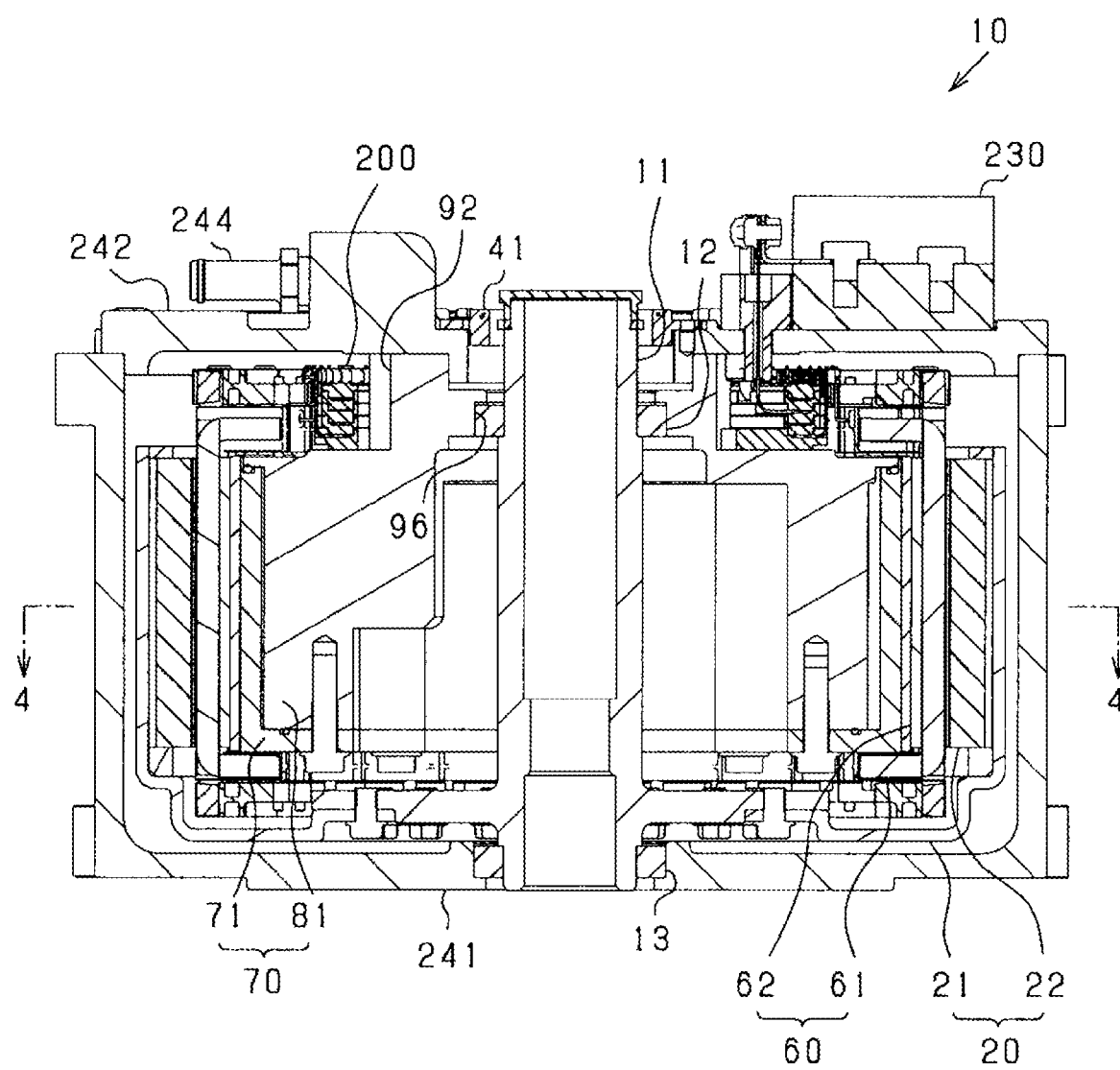
FIG. 3 is a longitudinal sectional view of a rotating electrical machine.
Figure 4:
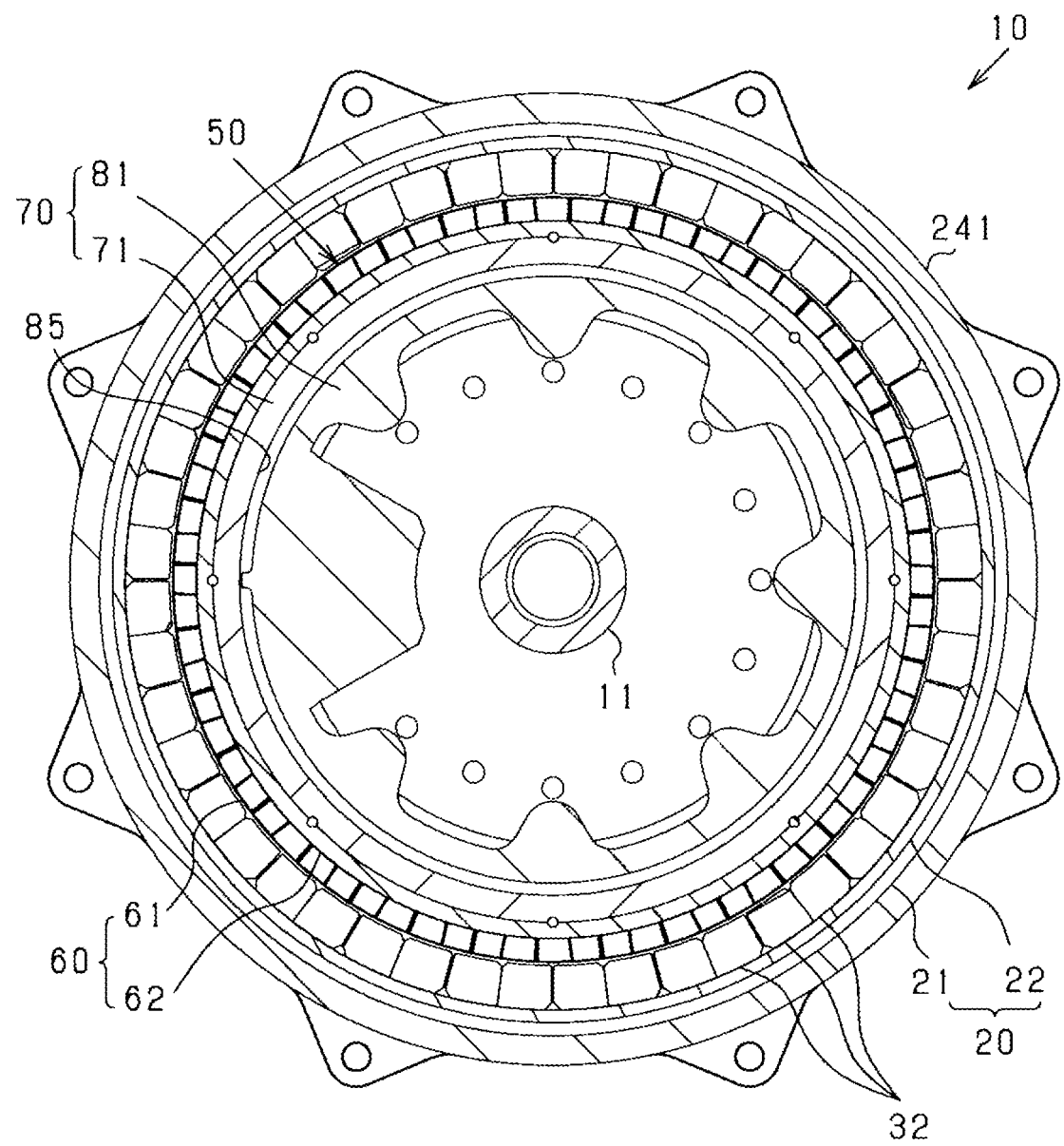
FIG. 4 is a transverse sectional view of a rotating electrical machine.
Figure 5:
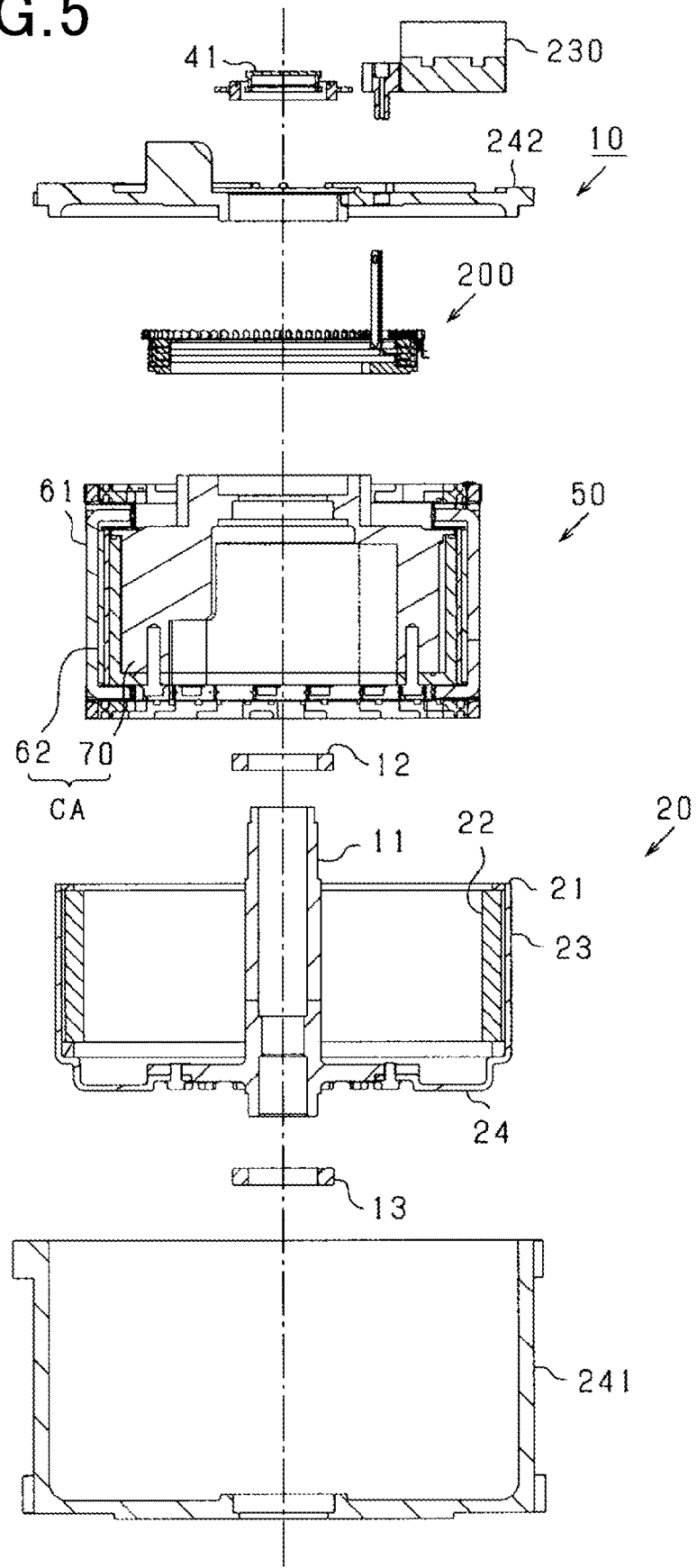
FIG. 5 is an exploded view of a rotating electrical machine.

The rotating electrical machine 10 in this embodiment is a synchronous polyphase ac motor having an outer rotor structure (i.e., an outer rotating structure). The outline of the rotating electrical machine 10 is illustrated in FIGS. 1 to 5. FIG. 1 is a perspective longitudinal sectional view of the rotating electrical machine 10. FIG. 2 is a plan view of the rotating electrical machine 10. FIG. 3 is a longitudinal sectional view (i.e., sectional view taken along the line III-III in FIG. 2) of the rotating electrical machine 10. FIG. 4 is a transverse sectional view (i.e., sectional view taken along the line IV-IV in FIG. 3) of the rotating electrical machine 10. FIG. 5 is an exploded view of component parts of the rotating electrical machine 10. In the following discussion, a direction in which the rotating shaft 11 of the rotating electrical machine 10 extends will be referred to as an axial direction. A direction extending radially from the center of the rotating shaft 11 will be referred to as a radial direction. A direction extending circumferentially about the center of the rotating shaft 11 thereof will be simply referred to as a circumferential direction.

The rotating electrical machine 10 generally includes a rotating electrical machine main body equipped with the rotor 20, the stator unit 50, and the busbar module 200, the housing 241 surrounding the rotating electrical machine main body, and the housing cover 242. These parts are placed coaxially with the rotating shaft 11 secured to the rotor 20 and fabricated in a given sequence of steps in alignment with the axial direction, thereby completing the rotating electrical machine 10. The rotating shaft 11 is retained by the bearings 12 and 13 installed in the stator unit 50 and the housing 241 to be rotatable. Each of the bearings 12 and 13 is implemented by, for example, a radial ball bearing equipped with an inner race, an outer race, and balls retained between the inner race and the outer race. The rotation of the rotating shaft 11 causes, for example, an axle of a vehicle to be rotated. The installation of the rotating electrical machine 10 in the vehicle may be achieved by securing the housing 241 to a frame of a body of the vehicle.

In the rotating electrical machine 10, the stator unit 50 is disposed to surround the rotating shaft 11. The rotor 20 is disposed radially outside the stator unit 50. The stator unit 50 includes the stator 60 and the stator holder 70 assembled to a radially inner periphery of the stator 60. The rotor 20 and the stator 60 are arranged to radially face each other with an air gap therebetween. Rotation of the rotor 20 radially outside the stator 60 causes the rotating shaft 11 to rotate together with the rotor 20. The rotor 20 works as a field generator (i.e., a magnetic field-producing unit). The stator 60 works as an armature.

Figure 6:
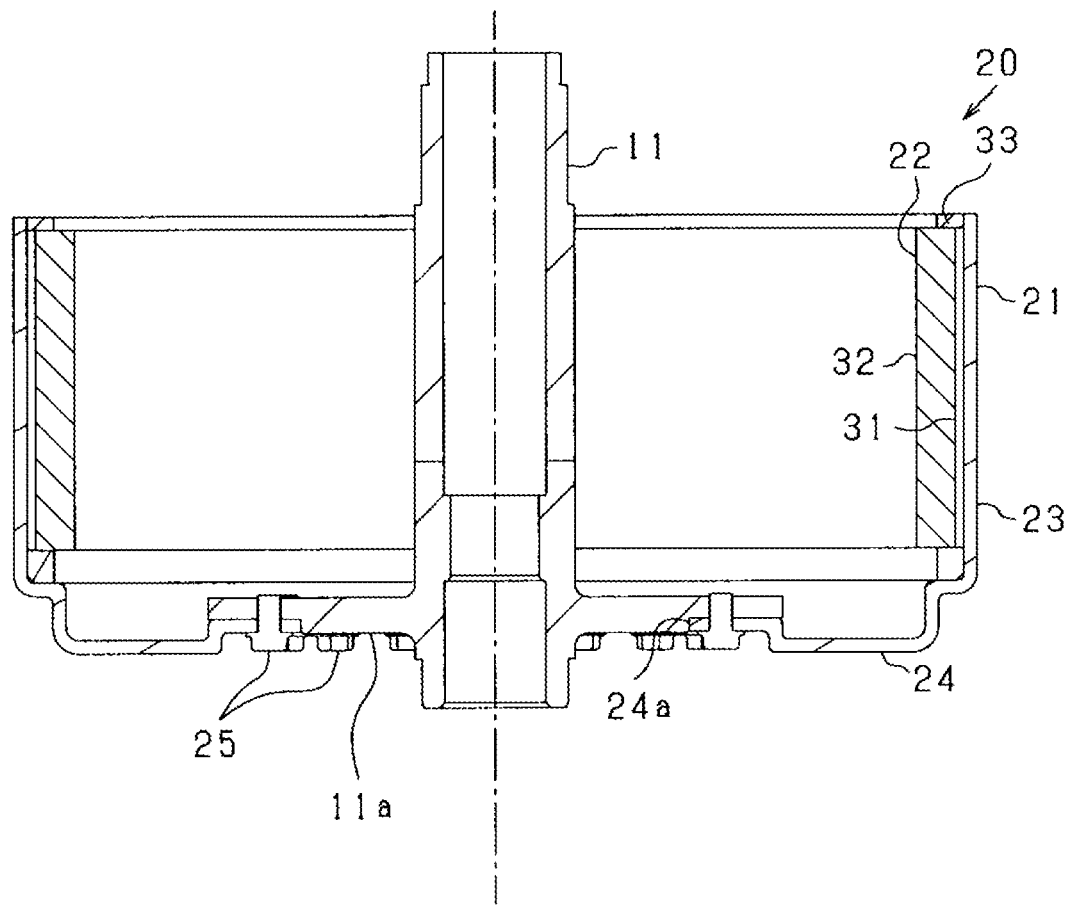
FIG. 6 is a sectional view of a rotor.

FIG. 6 is a longitudinal sectional view of the rotor 20. The rotor 20, as illustrated in FIG. 6, includes the substantially hollow cylindrical rotor carrier 21, and the annular magnet unit 22 secured to the rotor carrier 21. The rotor carrier 21 is comprised of the hollow cylindrical portion 23 and the end plate 24. The cylindrical portion 23 has opposing first and second ends in the axial direction, and the end plate 24 is mounted to the first end of the cylindrical portion 23, so that the cylindrical portion 23 and end plate 24 are integrally assembled to each other to thereby constitute the rotor carrier 21. The rotor carrier 21 serves as a magnet holder. The magnet unit 22 is mounted to a radially inner periphery of the cylindrical portion 23 in an arc-shape. The end plate 24 has the through hole 24a formed therethrough. The rotating shaft 11 passes through the through hole 24a and is retained by the end plate 24 with fasteners 25, such as bolts. The rotating shaft 11 has the flange 11a extending therefrom in a direction traversing or perpendicular to the axial direction of the rotating shaft 11. The flange 11a has an outer surface joined to an inner surface of the end plate 24, so that the rotating shaft 11 is secured to the rotor carrier 21.

The magnet unit 22 includes the cylindrica magnet holder 31, a plurality of magnets 32 secured to an inner peripheral surface of the magnet holder 31, and the end plate 33. The end plate 33 is secured to the second end of the rotor carrier 21 which is opposed to the first end of the rotor carrier 21 on which the end plate 24 is disposed. The magnet holder 31 has the same dimension as that of the magnets 32 in the axial direction. The magnets 32 are enclosed by the magnet holder 31 from radially outside it. The magnet holder 31 and the magnets 32 have axial ends firmly arranged in contact with the end plate 33.

Figure 7:
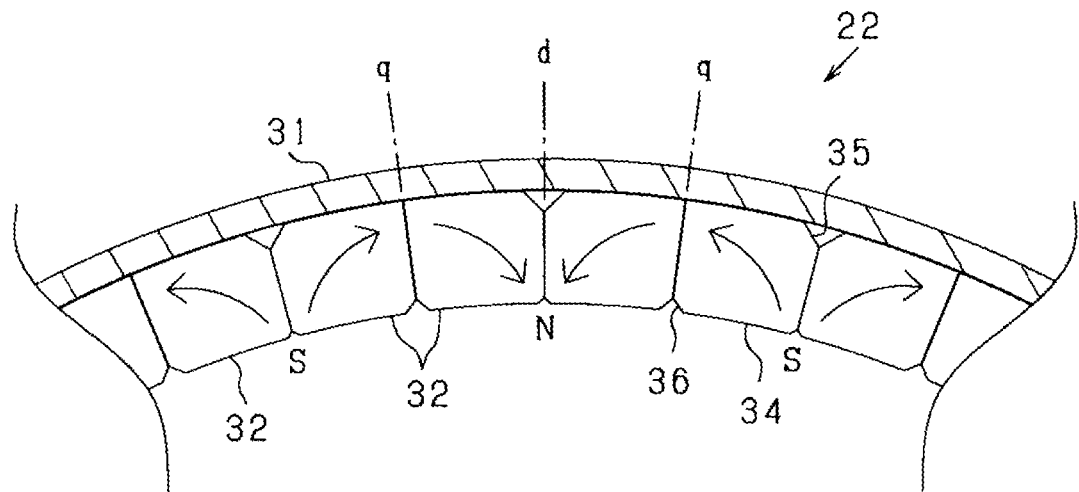
FIG. 7 is a partial transverse sectional view of a sectional structure of a magnet unit.

FIG. 7 is a partially transverse sectional view of a cross-sectional structure of the magnet unit 22. Easy axes of magnetization of the magnets 32 are illustrated by arrows in FIG. 7.

The magnets 32 are disposed in the magnet unit 22 to have different magnetic poles arranged alternately in a circumferential direction of the rotor 20. This results in the magnet unit 22 having a plurality of magnetic poles arranged in the circumferential direction of the rotor 20. Each magnet 32 is made of an anisotropic permanent sintered neodymium magnet whose intrinsic coercive force is 400 [kA/m] or more and whose remanent flux density is 1.0 [T] or more.

Each of the magnets 32 has a radially inner circumferential surface serving as the magnetic flux acting surface 34 into or from which magnetic flux flows. Each of the magnets 32 have easy axes of magnetization which are different in orientation from each other between regions close to the d-axis and the q-axis. Specifically, the easy axis of magnetization in the region close to the d-axis is oriented substantially parallel to the d-axis, while the easy axis of magnetization in the region close to the q-axis is oriented substantially perpendicular to the q-axis. Such orientations define an arc-shaped magnet-produced magnetic path extending along the easy axes of magnetization. In other words, each of the magnets 32 is magnetically oriented to have the easy axis of magnetization which extends more parallel to the d-axis in the region close to the d-axis that is the center of a magnetic pole than that in the region close to the q-axis that is a magnetic boundary between the N-pole and the S-pole.

The arc-shape of the magnetic paths in the magnets 32 causes each magnetic path to have a length longer than a radial dimension or thickness of the magnet 32, thereby enhancing the permeance in the magnets 32. This enables the magnets 32 to have substantially the same capability as that of magnets whose volume is larger than the magnets 32.

A respective circumferentially adjacent two of the magnets 32 constitute a magnet pair exhibiting one magnetic pole. In other words, each of the magnets 32 circumferentially arranged in the magnet unit 22 is shaped to have division surfaces coinciding with the d-axis and the q-axis. The magnets 32 are arranged in direct contact with or close to each other. The magnets 32, as described above, have the arc-shaped magnetic paths. A respective two of the magnets 32 which are arranged circumferentially adjacent each other across the q-axis have the N-pole and the S-pole facing each other. This results in an enhanced permeance near the q-axis. The magnets 32 which are arranged on opposite sides of the q-axis attract each other, thereby ensuring the stability in contact of the magnets 32 with each other, which also enhances the permeance.

Figure 8:
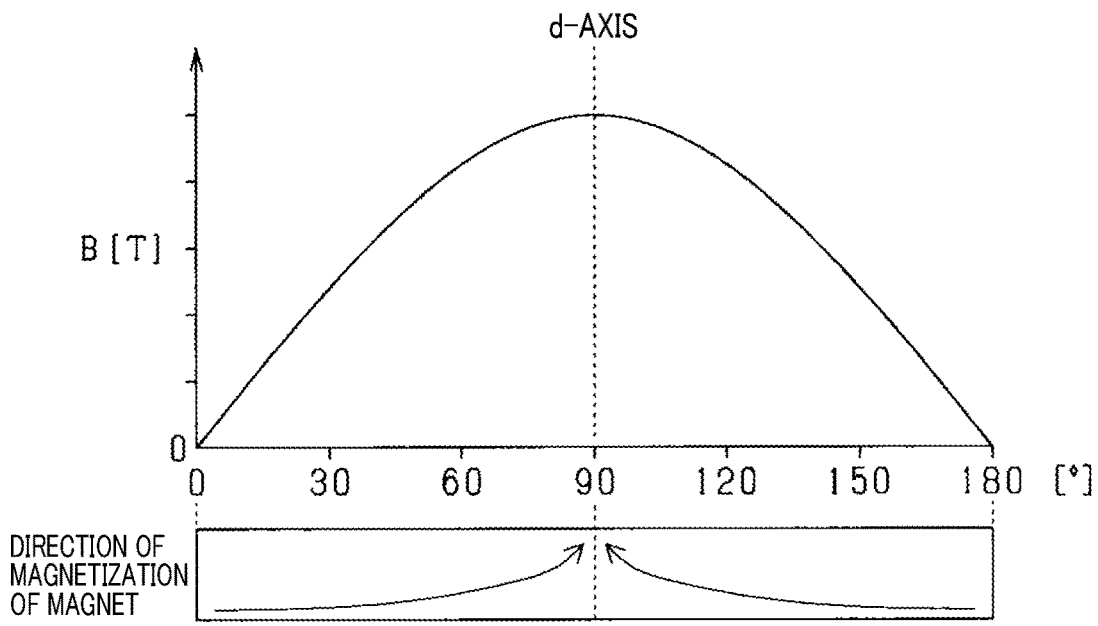
FIG. 8 is a view which represents a relation between an electrical angle and a density of magnetic flux in magnets according to an embodiment.
Figure 9:
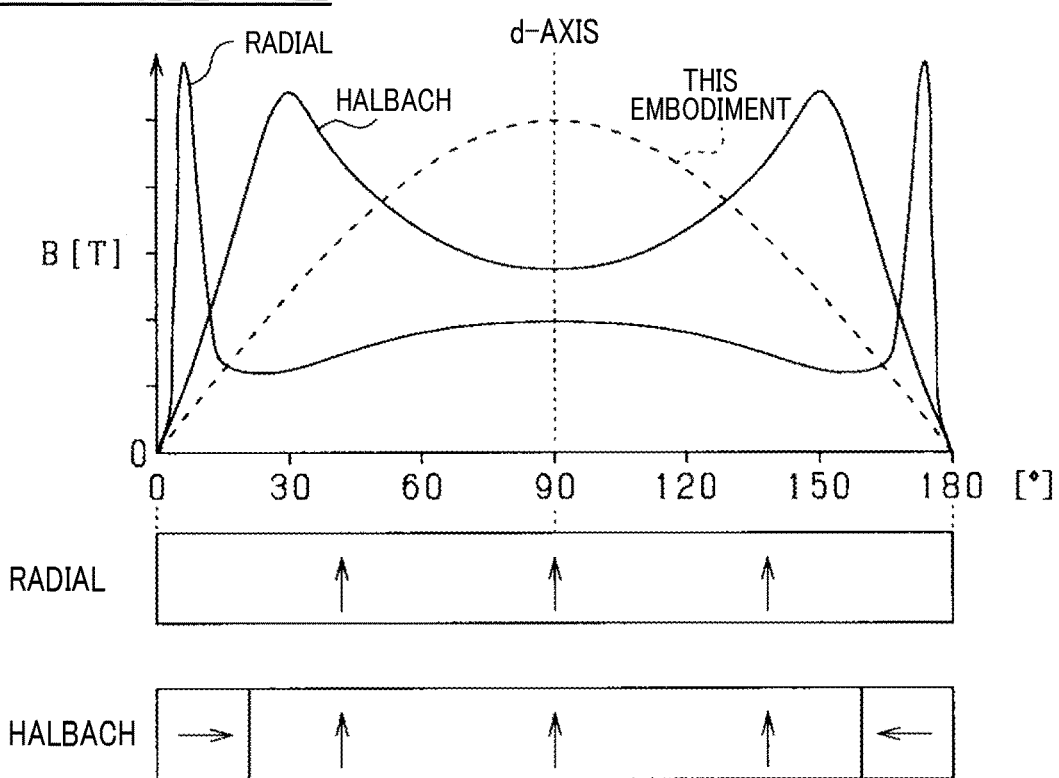
FIG. 9 is a view which represents a relation between an electrical angle and a density of magnetic flux in magnets in a comparative example.

In the magnet unit 22, a magnetic flux flows in an annular shape between a respective adjacent two of the N-poles and the S-poles of the magnets 91 and 92, so that each of the magnetic paths has an increased length, as compared with, for example, radial anisotropic magnets. A distribution of the magnetic flux density will, therefore, exhibit a shape similar to a sine wave illustrated in FIG. 8. This facilitates concentration of magnetic flux around the center of the magnetic pole unlike a distribution of magnetic flux density of a radial anisotropic magnet demonstrated in FIG. 9 as a comparative example, thereby enabling the degree of torque produced by the rotating electrical machine 10 to be increased. It has also been found that the magnet unit 22 in this embodiment has the distribution of the magnetic flux density distinct from that of a typical Halbach array magnet. In FIGS. 8 and 9, a horizontal axis indicates the electrical angle, while a vertical axis indicates the magnetic flux density. 90° on the horizontal axis represents the d-axis (i.e., the center of the magnetic pole). 0° and 180° on the horizontal axis represent the q-axis.

Accordingly, the above-described structure of each of the magnets 32 functions to enhance the magnet magnetic flux thereof on the d-axis and reduce a change in magnetic flux near the q-axis. This enables the magnets 32 to be produced which have a smooth change in surface magnetic flux from the q-axis to the d-axis on each magnetic pole.

The sine wave matching percentage in the distribution of the magnetic flux density is preferably set to, for example, 40% or more. This improves the amount of magnetic flux around the center of a waveform of the distribution of the magnetic flux density as compared with a radially oriented magnet or a parallel oriented magnet in which the sine wave matching percentage is approximately 30%. By setting the sine wave matching percentage to be 60% or more, the amount of magnetic flux around the center of the waveform is improved, as compared with a concentrated magnetic flux array, such as the Halbach array.

In the radial anisotropic magnet demonstrated in FIG. 9, the magnetic flux density changes sharply near the q-axis. The sharper the change in magnetic flux density, the more an eddy current generated in the stator winding 61 of the stator 60 will increase. The magnetic flux close to the stator winding 61 also sharply changes. In contrast, the distribution of the magnetic flux density in this embodiment has a waveform approximating a sine wave. A change in magnetic flux density near the q-axis is, therefore, smaller than that in the radial anisotropic magnet near the q-axis. This minimizes the generation of the eddy current.

Adjacent corners of the radially outer surfaces of the magnets 32 are each cut to form the recess 35 in a region including the corresponding d-axis. Each of the magnets 32 has the recess 36 which is formed in the radially inner surface thereof and occupies a region including the corresponding q-axis. The directions of the above easy axes of magnetization of the magnet 32 cause magnetic paths located close to each d-axis and the radially outer surface to be shorter. Similarly, the directions of the above easy axes of magnetization of the magnet 32 cause magnetic paths located close to the q-axis and the radially inner surface to be shorter. Each magnet 32 is, therefore, configured such that some portions, which have weaker magnetic fluxes due to the shorter magnetic paths, have been already eliminated, because each of the eliminated portions have difficulty in creating a sufficient amount of magnetic flux.

The magnet unit 22 may be designed to have as many magnets 32 as the magnetic poles. For instance, each of the magnets 32 may be shaped to have a size occupying a respective circumferentially adjacent two magnetic poles between the adjacent d-axes each of which lies at the center of the magnetic pole. In this case, the center of the circumference of each of the magnets 32 coincides with the q-axis. Each of the magnets 32 has the division surfaces each coinciding with the d-axis. Each of the magnets 32 may alternatively be shaped to have a circumference whose center lies on the d-axis, not the q-axis. Instead of twice as many magnets 32 or as many magnets 32 as the magnetic poles, a circular continuous magnet may be used.

The rotating shaft 11 has opposing first and second ends in its axial direction; the first end of the rotating shaft 11 is joined to the rotor carrier 21, which is the lower end of the rotating shaft 11 in FIG. 3. The resolver 41 is mounted on the second end of the rotating shaft 11, which is the upper end of the rotating shaft 11 in FIG. 3. The resolver 41 serves as a rotation sensor.

The resolver 41 includes a resolver rotor secured to the rotating shaft 11, and a resolver stator disposed radially outside the resolver rotor to face the resolver rotor. The resolver rotor has an annular disc shape, and is coaxially mounted around the rotating shaft 11. The resolver stator includes a stator core and a stator coil, and is retained to the housing cover 242.

Figure 10:
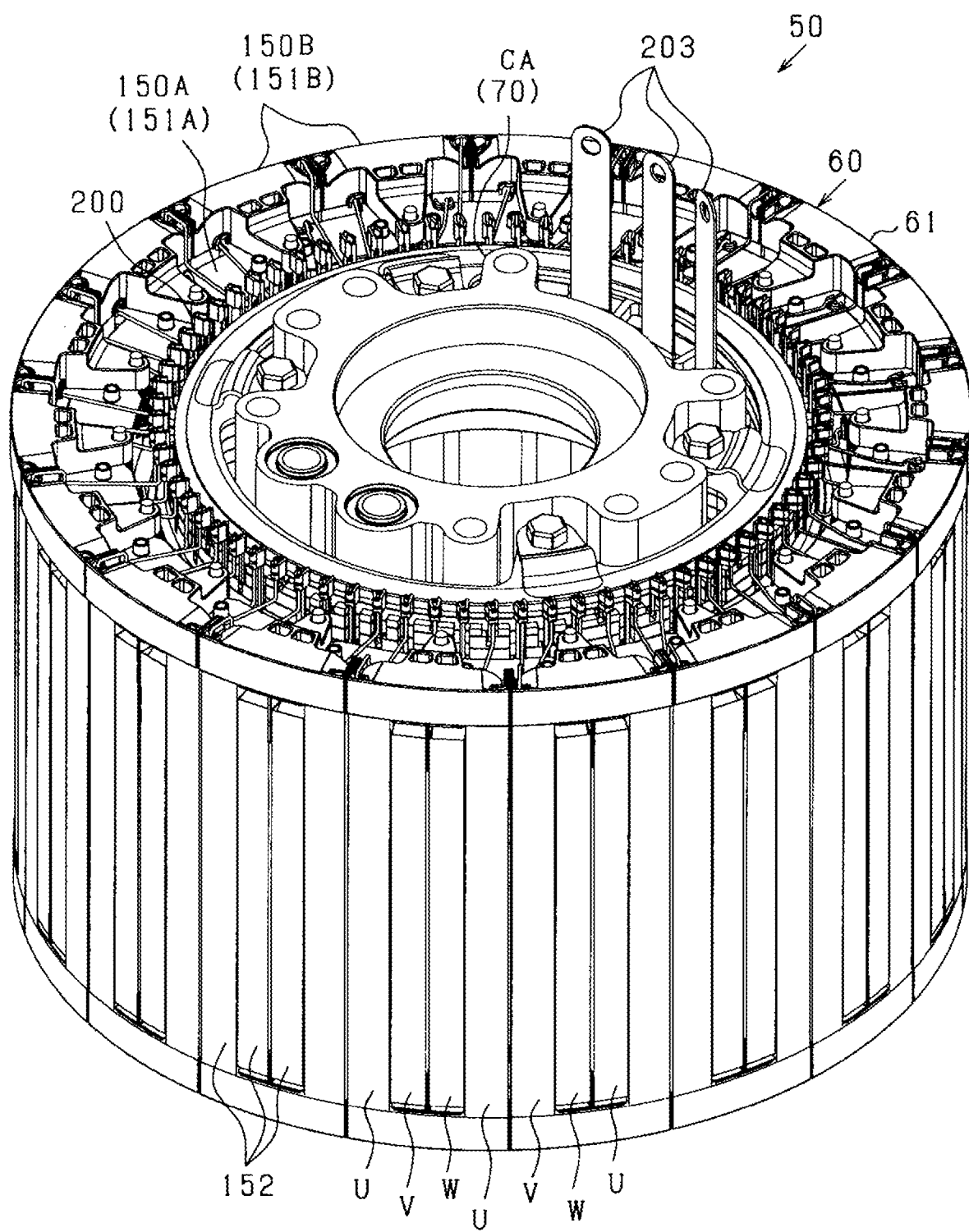
FIG. 10 is a perspective view of a stator unit.
Figure 11:
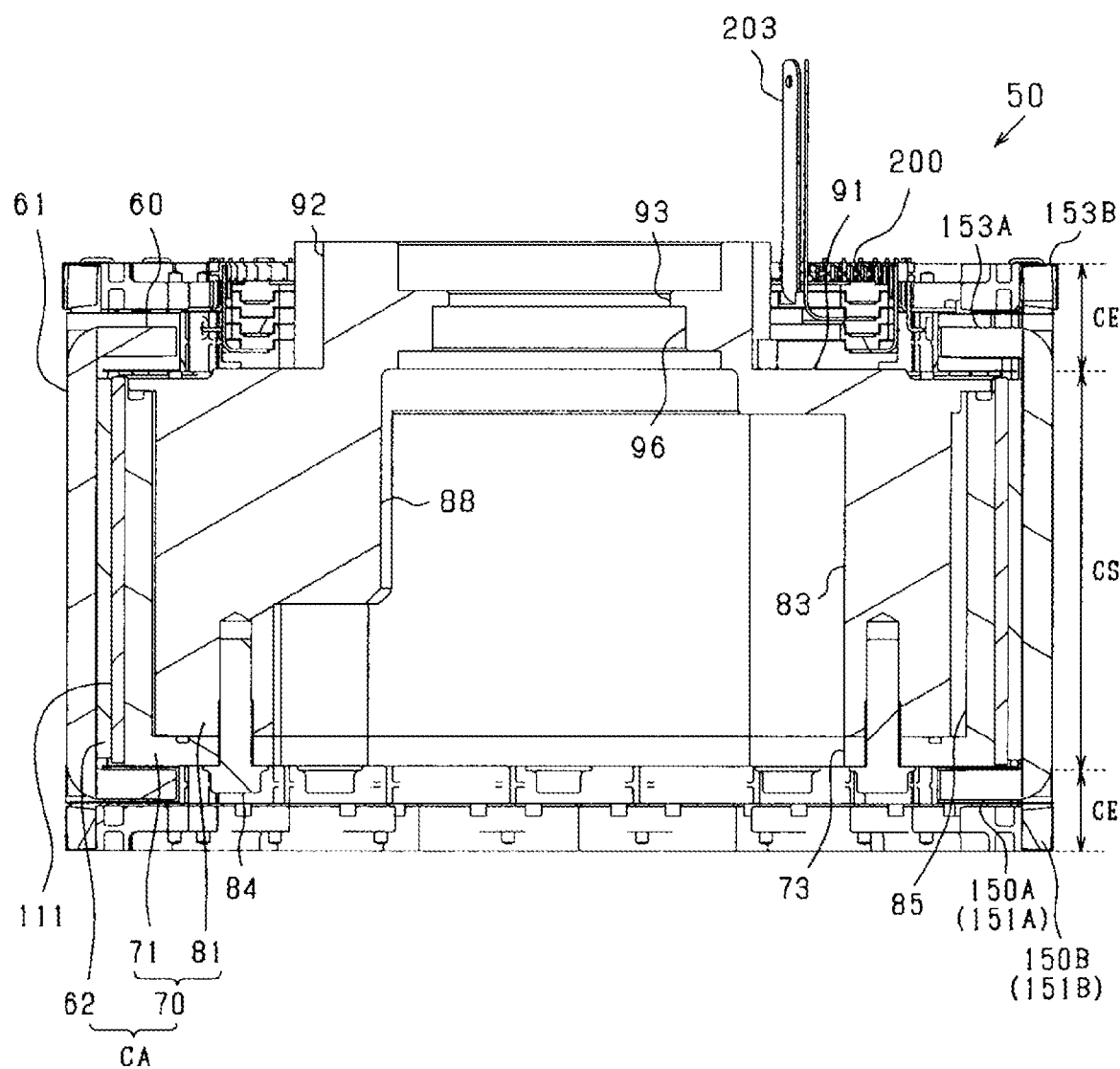
FIG. 11 is a longitudinal sectional view of a stator unit.

Next, the following describes the structure of the stator unit 50. FIG. 10 is a perspective view of the stator unit 50. FIG. 11 is a longitudinal sectional view of the stator unit 50 which is taken along the same line as in FIG. 3.

The stator unit 50 is schematically comprised of the stator 60 and the stator holder 70 disposed radially inside the stator 60. The stator 60 includes the stator winding 61 and the stator core 62. The stator core 62 and the stator holder 70 are integrally assembled to each other as a core assembly CA. The stator winding 61 is made up of a plurality of winding segments 151 which are disposed in the core assembly CA. The stator winding 61 serves as an armature winding. The stator core 62 serves as an armature core. The stator holder 70 serves as an armature holder. The core assembly CA serves as a retainer.

Figure 12:
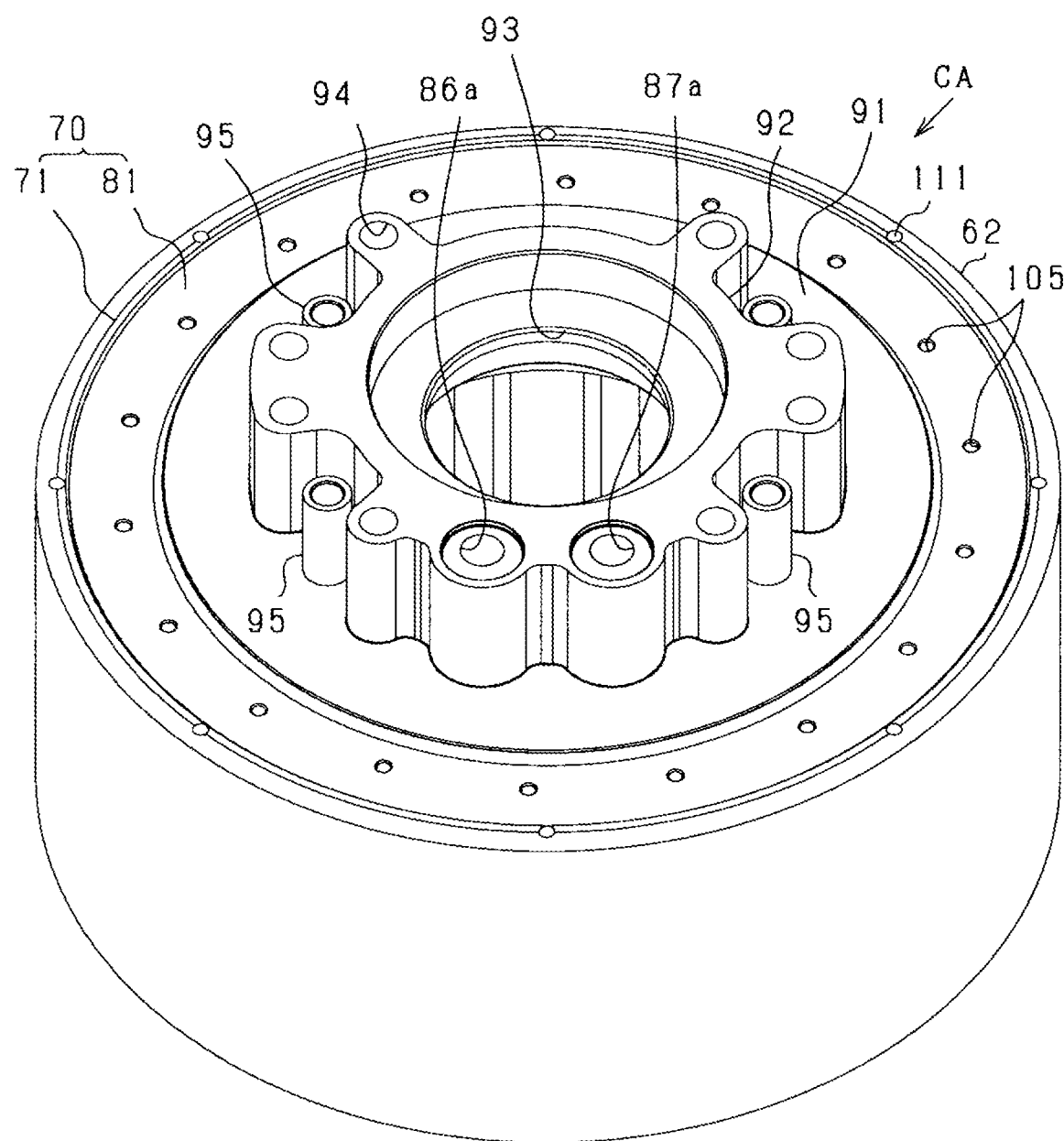
FIG. 12 is a perspective illustration of a core assembly, as viewed in a first axial direction.
Figure 13:
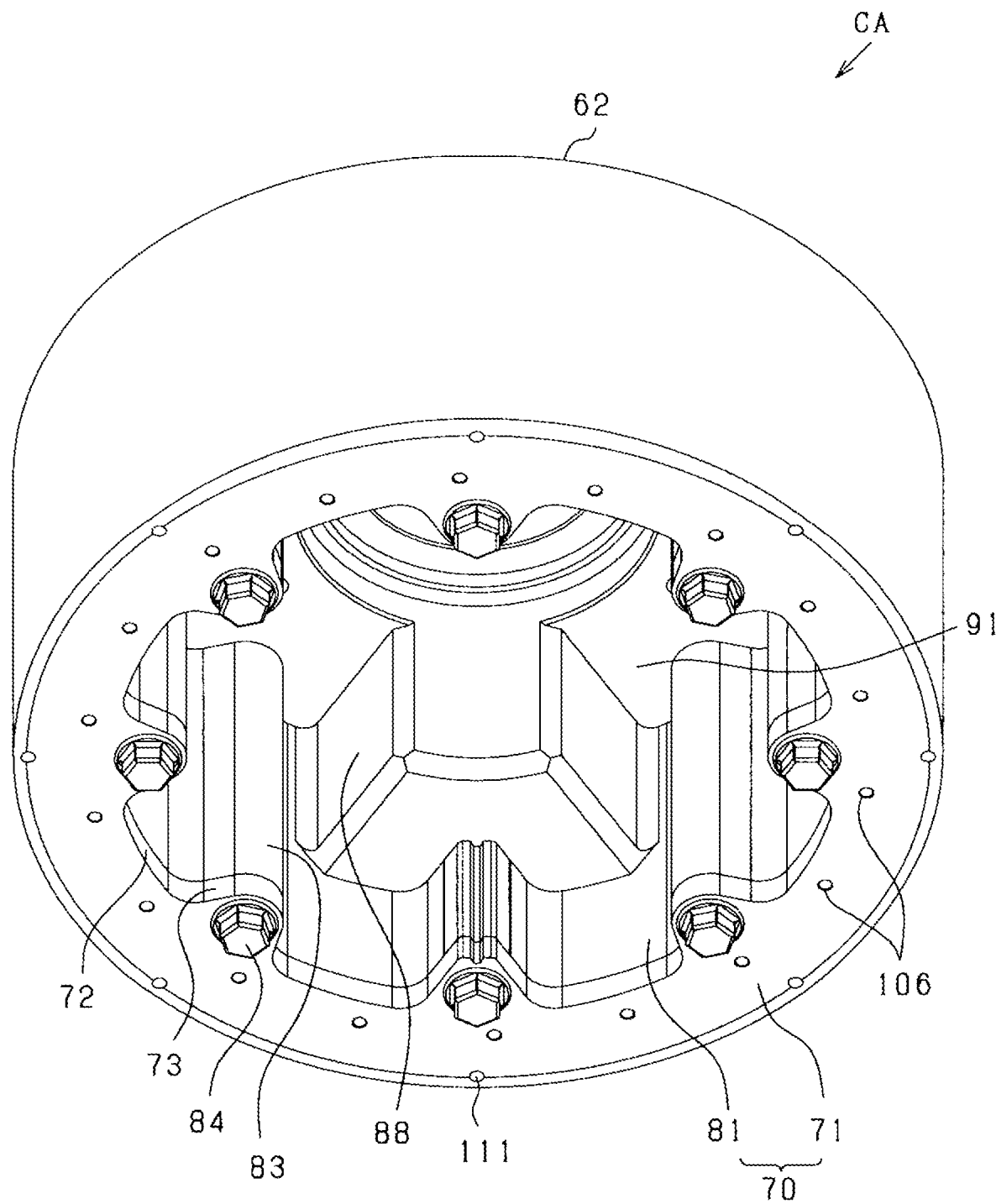
FIG. 13 is a perspective illustration of a core assembly, as viewed from a second axial direction.
Figure 14:
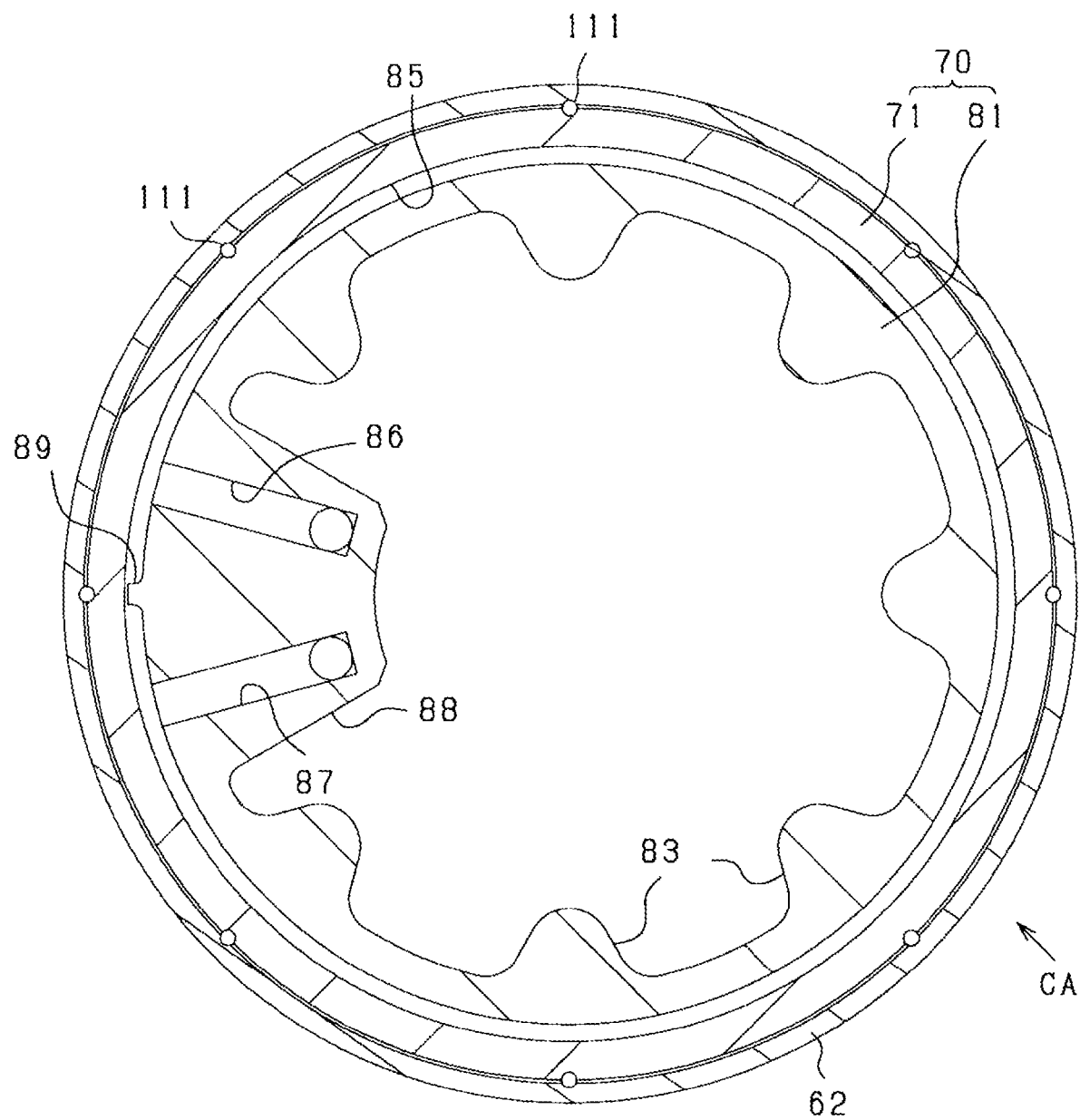
FIG. 14 is a transverse sectional view of a core assembly.
Figure 15:
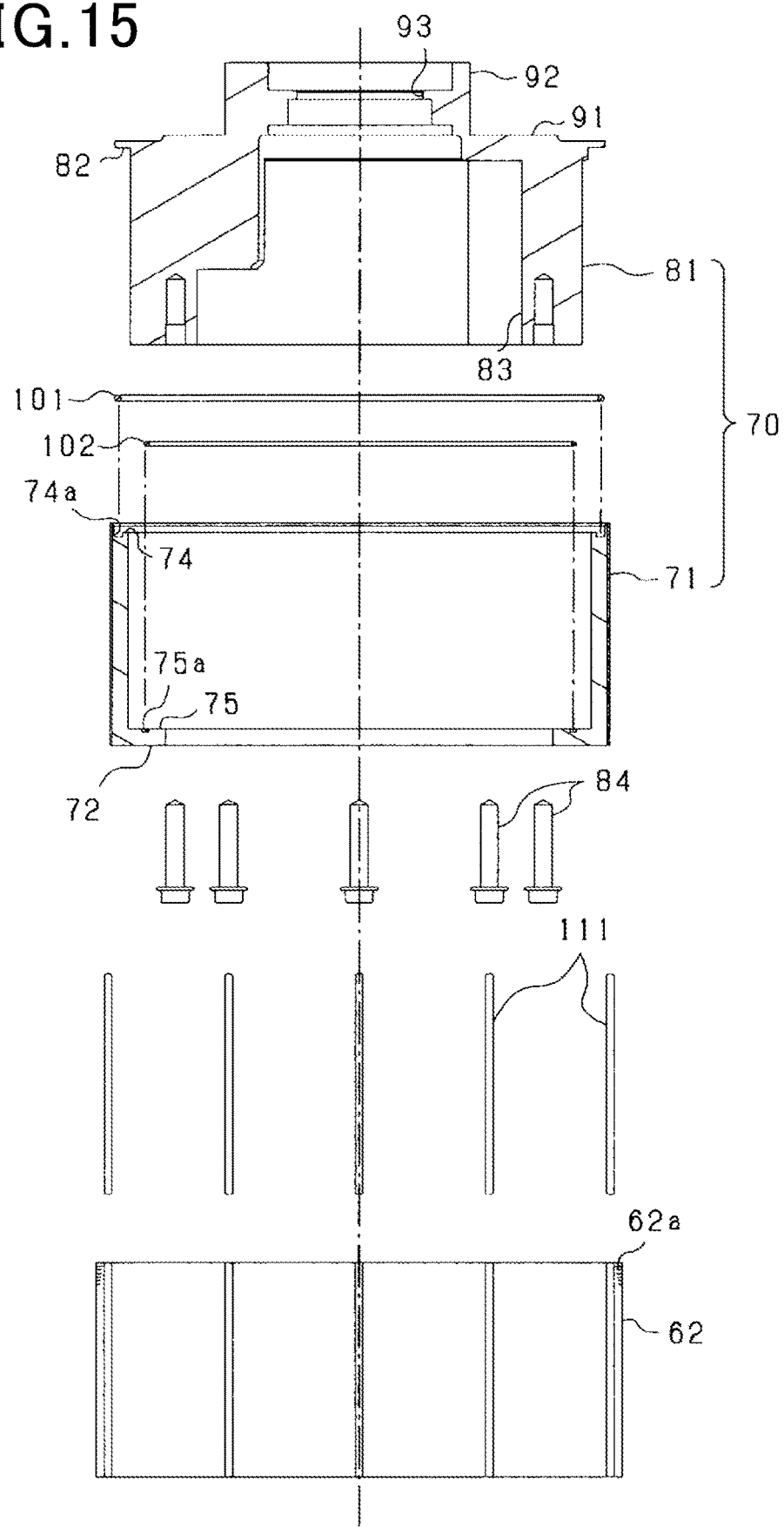
FIG. 15 is an exploded view of a core assembly.

First, the following describes the core assembly CA. FIG. 12 is a perspective view of the core assembly CA, as viewed from one side of the axial direction. FIG. 13 is a perspective view of the core assembly CA, as viewed from the other side of the axial direction. FIG. 14 is a transverse sectional view of the core assembly CA. FIG. 15 is an exploded sectional view of the core assembly CA.

The core assembly CA is comprised of, as described above, the stator core 62 and the stator holder 70 assembled to the radially inner periphery of the stator core 61. In other words, the stator core 62 is integrally assembled to the outer peripheral surface of the stator holder 70.

The stator core 62 is, for example, comprised of a plurality of core sheets 62a, each of which is made of a magnetic steel plate, stacked in the axial direction in the shape of a hollow cylinder having a given thickness in the radial direction. The stator winding 61 is mounted on the outer peripheral surface of the stator core 62 which faces the rotor 20. The stator core 62 has no irregularities on the outer peripheral surface thereof. The stator core 62 functions as a back yoke. The stator core 62 is, for example, comprised of the plurality of core sheets 62a stacked in the axial direction; each core sheet 62a has been punched out to have an annular plate-like shape. For the stator core 62 having a helical configuration, the stator core 62 may be comprised of elongated sheets helically wound and stacked in the axial direction to be shaped overall as a hollow cylindrical shape.

The stator 60 is designed to have a slot-less structure with no teeth for defining slots. Specifically, the stator 60 has any of the following structures:

(A) The stator 60 has inter-conductor members, each of which is disposed between conductor portions (intermediate conductor portions 152 described later) in the circumferential direction. As the inter-conductor members, magnetic material is used which meets a relation of Wt×Bs≤Wm×Br where Wt is a width of the inter-conductor members in the circumferential direction within one magnetic pole, Bs is the saturation magnetic flux density of the inter-conductor members, Wm is a width of the magnets 32 equivalent to one magnetic pole in the circumferential direction, and Br is the remanent flux density in the magnet 32.

(B) The stator 60 has the inter-conductor members each of which is disposed between the conductor portions (intermediate portions 152) in the circumferential direction. The inter-conductor members are each made of a non-magnetic material.

(C) The stator 60 has no inter-conductor member disposed between the conductor portions (i.e., the intermediate portions 152) in the circumferential direction.

The stator holder 70 is, as illustrated in FIG. 15, comprised of an outer cylindrical member 71 and an inner cylindrical member 81. The outer and inner cylindrical members 71 and 81 are integrally assembled to each other while the inner cylindrical member 81 is disposed radially inside the outer cylindrical member 71, in other words, the outer cylindrical member 71 is disposed radially outside the inner cylindrical member 81. Each of the outer and inner cylindrical members 71 and 81 is made of, for example, metal, such as aluminum or cast iron, or carbon fiber reinforced plastic (CFRP).

The outer cylindrical member 71 has a hollow cylindrical shape with the curvature of each of the outer and inner peripheral surfaces thereof being an exact circle. The outer cylindrical flange 72 has opposing first and second ends in its axial direction, and has the annular flange 72 extending radially inward from the first end thereof. The flange 72 has protrusions 73 arranged at a regular interval away from each other in the circumferential direction thereof (see FIG. 13). The outer cylindrical member 71 has the axially facing surfaces 74 and 75 which lie at the first and second ends thereof axially opposed to each other and face the inner cylindrical member 81 in the axial direction. The axially facing surfaces 74 and 75 have annular grooves 74a and 75a formed therein.

The inner cylindrical member 81 has an outer diameter smaller than that of the outer cylindrical member 71. The inner cylindrical member 81 has a hollow cylindrical shape with the curvature of the outer peripheral surface thereof being an exact circle. The inner cylindrical member 81 has opposing first and second ends in its axial direction, and has the annular outer flange 82 extending radially outward from the second end thereof. The inner cylindrical member 81 is assembled to the outer cylindrical member 71 while being in contact with the axially facing surfaces 74 and 75 of the outer cylindrical member 71. As illustrated in FIG. 13, the inner and outer cylindrical members 71 and 81 are fastened to each other using fasteners 84, such as bolts. Specifically, the inner cylindrical member 81 has a plurality of protrusions 83 formed on an inner peripheral surface thereof. The protrusions 83 are arranged at a regular interval away from each other in the circumferential direction of the inner cylindrical member 81 and protrude radially inward. The protrusions 83 have axially end surfaces placed laid to overlap the protrusions 73 of the outer cylindrical member 71. The protrusions 73 and 83 are joined together using the fasteners 84.

The outer and inner cylindrical members 71 and 81 are, as illustrated in FIG. 14, integrally assembled to each other. The inner peripheral surface of the outer cylindrical member 71 and the outer peripheral surface of the inner cylindrical member 81 are disposed to face each other with an annular clearance therebetween; the annular clearance serves as a coolant path 85 through which coolant, such as water, is supplied to flow. The coolant path 85 is formed to have an annular shape in the circumferential direction of the stator holder 70. More specifically, the inner cylindrical member 81 has the path formation wall 88 protruding from the inner peripheral surface of the inner cylindrical member 81; the path formation wall 88 has formed therein the inlet path 86 and the outlet path 87. Each of the paths 86 and 87 opens at the outer peripheral surface of the inner cylindrical member 81. The inner cylindrical member 81 has the partition 89 formed on the outer peripheral surface thereof to divide the coolant path 85 into an input side and an output side. This enables a coolant entering the input path through the inlet path 86 to flow the coolant path 85 in the circumferential direction, and thereafter to flow out from the outlet path 87.

Each of the inlet path 86 and the outlet path 87 has opposing first and second ends in its length direction. The first end of each of the inlet path 86 and outlet path 87 radially extends and opens at the outer peripheral surface of the inner cylindrical member 81. The second end of each of the inlet path 86 and the outlet path 87 axially extends and opens at an axial end of the inner cylindrical member 81. FIG. 12 shows the inlet opening 86*a* communicating with the inlet path 86 and the outlet opening 87*a* communicating with the outlet path 87. The inlet path 86 and the outlet path 87 communicate with the inlet port 244 and the outlet port 245 of the housing cover 242 (see FIG. 1), so that the coolant flows into the inlet port 244 and out of the outlet port 245.

The seal member 101 is disposed between the second end of the outer cylindrical member 71 and the second end of the inner cylindrical member 81 that is joined to the second end of the outer cylindrical member 71. The seal member 102 is disposed between the first end of the outer cylindrical member 71 and the first end of the inner cylindrical member 81 that is joined to the first end of the outer cylindrical member 71 (see FIG. 15). Specifically, the seal member 101, which is, for example, an O-ring, is disposed in the annular groove 74*a* of the outer cylindrical member 71 while being compressed by the inner cylindrical member 81. Similarly, the seal member 102, which is, for example, an O-ring, is disposed in the annular groove 75*a* of the outer cylindrical member 71 while being compressed by the inner cylindrical member 81.

The inner cylindrical member 81 has, as illustrated in FIG. 12, the annular end plate 91 at the second end thereof. The boss 92, which has a hollow cylindrical shape, is mounted on an outer surface of the end plate 91 to extend outwardly therefrom in the axial direction. The boss 92 extends around the through hole 93 through which the rotating shaft 11 passes. The boss 92 has a plurality of fasteners 94 for use in securement of the housing cover 242. The end plate 91 has disposed thereon a plurality of rods 95 which are located radially outside the boss 92 and extend in the axial direction. The rods 95, as will be described later in detail, serve as retainers for use in securement of the busbar module 200. The boss 92 serves as a bearing retainer which retains the bearing 12. Specifically, the bearing 12 is firmly mounted in the bearing holder 96 formed in an inner portion of the boss 92 (see FIG. 3).

the outer cylindrical member 71 and the inner cylindrical member 81, as clearly illustrated in FIGS. 12 and 13, have the recesses 105 and 106 for use in securement of a plurality of coil modules 150 which will be described later.

Specifically, the recesses 105 are, as clearly illustrated in FIG. 12, formed in an axial end of the inner cylindrical member 81, i.e., an axial outer end of the end plate 91 around the boss 92. The recesses 105 are arranged at equal intervals away from each other in the circumferential direction of the end plate 91. The recesses 106 are, as clearly illustrated in FIG. 13, formed in an axial end of the outer cylindrical member 71, i.e., an axial outer end of the flange 72. The recesses 106 are arranged at equal intervals away from each other in the circumferential direction of the flange 72. The recesses 105 and 106 are arranged on an imaginary circle defined to be coaxial with the core assembly CA. The recesses 105 are aligned with the recesses 106 in the axial direction. The recesses 105 and 106 are identical in number and spacing therebetween with each other.

The stator holder 70 is assembled to the stator core 62 while the stator core 62 applies radial compression force to the stator holder 70 for ensuring sufficient force to assemble the stator holder 70 and the stator core 62 to each other. Specifically, the stator holder 70 is fixedly fit in the stator core 62 using shrinkage-fitting or press-fitting with a predetermined degree of interference therebetween. This results in the stator core 62 and the stator holder 70 being assembled to each other while one of the stator core 62 and the stator holder 70 applies radial stress to the other thereof. For obtaining a high degree of torque from the rotating electrical machine 10, let us consider a measure to, for example, make the size of the stator 60 larger, resulting in a larger degree of force of the stator core 62, which tightens the stator holder 70 to the stator core 62, in order to firmly join the stator core 62 to the stator holder 70 together. An increase in compressed stress of the stator core 62, in other words, residual stress of the stator core 62, may result in a risk of causing the stator core 62 to be broken down.

In light of the above drawback, the structure in this embodiment in which the stator holder 79 is fit in the stator core 62 with a given amount of interference therebetween is designed to have a stopper which is arranged in portions of the stator core 62 and the stator holder 70 which radially face each other and works to achieve engagement of the stator core 62 and the stator holder 70 to hold the stator core 62 from moving in the circumferential direction thereof. Specifically, a plurality of engagement members 111 are, as illustrated in FIGS. 12 to 14, disposed between the stator core 62 and the outer cylindrical member 71 of the stator holder 70. The engagement members 111 are arranged at a given interval away from each other in the circumferential direction and function as stoppers to control misalignment between the stator core 62 and the stator holder 70 in the circumferential direction. For instance, one of the stator core 62 and the outer cylindrical member 71 may have formed therein recesses in which the engagement members 111 are fit. Instead of the engagement members 111, one of the stator core 62 and the outer cylindrical member 71 may alternatively have formed thereon protrusions fit in the recesses.

The above structure, therefore, serves to eliminate the risk of misalignment between the stator core 62 and the stator holder 70 (i.e., the outer cylindrical member 71) in the circumferential direction as well as to ensure an interference fit between the stator core 62 and the stator holder 70 (i.e., the outer cylindrical member 71). This, therefore, ensures the stability in alignment between the stator core 62 and the stator holder 70 even if the amount of interference between the stator core 62 and the stator holder 70 is relatively small and also eliminates the risk of damage to the stator core 62 which usually rises from an increase in amount of interference fit between the stator core 62 and the stator holder 70.

The inner cylindrical member 81 has an annular inner chamber formed radially thereinside around the rotating shaft 11. Electrical components, such as electrical components constitute, for example, an inverter serving as a power converter, may be installed in the annular inner chamber. The electrical components for example include one or more electrical modules in each of which semiconductor switches and capacitors are packaged. The electrical components are arranged while being in contact with the inner peripheral surface of the inner cylindrical member 81. The cooling of the electrical modules using the coolant flowing in the coolant path 85 may be achieved by arranging the electrical modules in contact with the inner periphery of the inner cylindrical member 81. The volume of the inner chamber located inside the inner periphery of the inner cylindrical member 81 may be increased by eliminating the protrusions 83 on the inner periphery of the inner cylindrical member 81 or decreasing the height of the protrusions 83.

Next, the structure of the stator winding 61 installed in the core assembly CA will be described below in detail. The stator winding 61 mounted in the core assembly CA is shown in FIGS. 10 and 11. Specifically, the winding segments 151, which constitute the stator winding 61, are circumferentially arranged radially outside the core assembly CA, i.e., the stator core 62.

The stator winding 61 is comprised of plural-phase windings that are arranged in a predetermined order in the circumferential direction; the assembly of the plural-phase windings arranged in the circumferential direction has a hollow cylindrical shape, i.e., an annular shape. The stator winding 61 in this embodiment includes three-phase windings: a U-phase winding, a V-phase winding, and a W-phase winding.

The stator 60, as illustrated in FIG. 11, includes an axial inside portion serving as the coil side CS that radially faces the magnet unit 22 of the rotor 20 and axial outside portions serving as the coil ends CE located axially outside the coil side CS. The stator core 62 is disposed inside the coil side CS such that the axial length of the stator core 62 occupies the axial length of the coil side CS.

Each-phase winding in the stator winding 61 includes a plurality of winding segments 151 (see FIG. 16), and each of the winding segments 151 constitutes the coil module 150. In other words, the coil module 150 of each phase winding is comprised of a modularized winding segment 151 of the corresponding phase winding. The stator winding 61 is made of a predetermined number of coil modules 150, which is determined based on the number of magnet poles of the rotating electrical machine.

Arranging the coil modules 150 of the plural-phase windings in the predetermined order in the circumferential direction results in the conductor portions of the plural-phase windings being arranged in the predetermined order; the arranged conductor portions of the plural-phase windings constitute the coil side CS of the stator winding 61. FIG. 10 illustrates the predetermined order of arrangement of the conductor portions of the U-, V-, and W-phase windings in the coil side CS of the stator winding 61. The number of magnet poles of the rotating electrical machine is set to 24, but may be optional.

Figure 16:
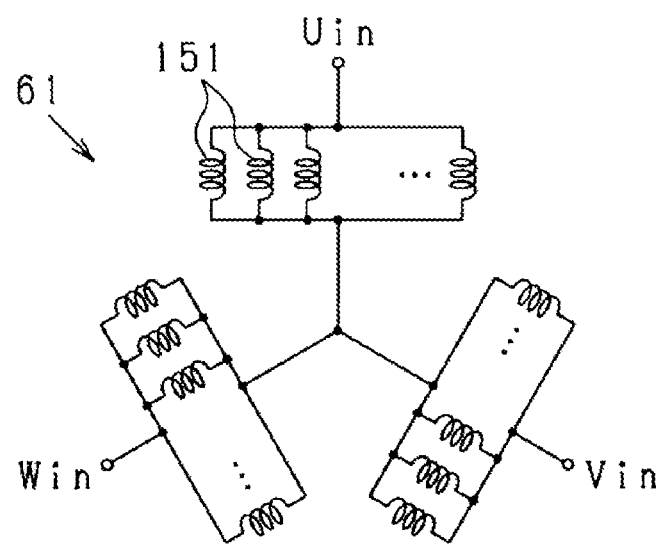
FIG. 16 is a circuit diagram which shows connections of winding segments of a three-phase winding.

The winding segments 151 of the coil modules 150 of each phase winding are connected in parallel or series to each other to thereby constitute the corresponding phase winding. FIG. 16 illustrates electrical connections among the winding segments 151 of each of the U-, V-, and W-phase windings. In FIG. 16, the winding segments 151 of each of the U-, V-, and W-phase windings are connected in parallel to each other.

The coil modules 150 are, as illustrated in FIG. 11, attached to the radial outside of the stator core 62. The coil modules 150 are attached to the stator core 62 while both end portions of the coil modules 150 in the axial direction project outside of the stator core 62, i.e., project toward the respective coil ends CE, in the axial direction. Specifically, the stator winding 61 includes an axial inside portion serving as the coil side CS and axial outside portions serving as the coil ends CE located on the axial outside of the coil side CS.

The coil modules 150 include a first type of coil modules 150 and a second type of coil modules 150. The configuration of each coil module 150 included in the first type is different from the configuration of each coil module 150 included in the second type. The winding segment 151 of each coil module 150 included in the first type has opposing first and second ends in the axial direction of the stator core 62, and each of the first and second ends of the winding segment 151 of each coil module 150, which constitutes a corresponding one of the coil ends CE, is bent radially inside the stator core 62. In contrast, the winding segment 151 of each coil module 150 included in the second type has opposing first and second ends in the axial direction of the stator core 62, and each of the first and second ends of the winding segment 151 of each coil module 150, which constitutes a corresponding one of the coil ends CE, extends linearly in the axial direction of the stator core 62 without being bent. In the following discussion for the sake of convenience, the winding segment 151, whose first and second ends are bent radially inside the stator core 62, will be referred to as a first winding segment 151A, and the coil module 150 including the first winding segment 151A will be referred to as a first coil module 150A. Similarly, the winding segment 151, whose first and second ends extend in the axial direction of the stator core 62 without being bent, will be referred to as a second winding segment 151B, and the coil module 150 including the second winding segment 151B will be referred to as a second coil module 150B.

Figure 17:
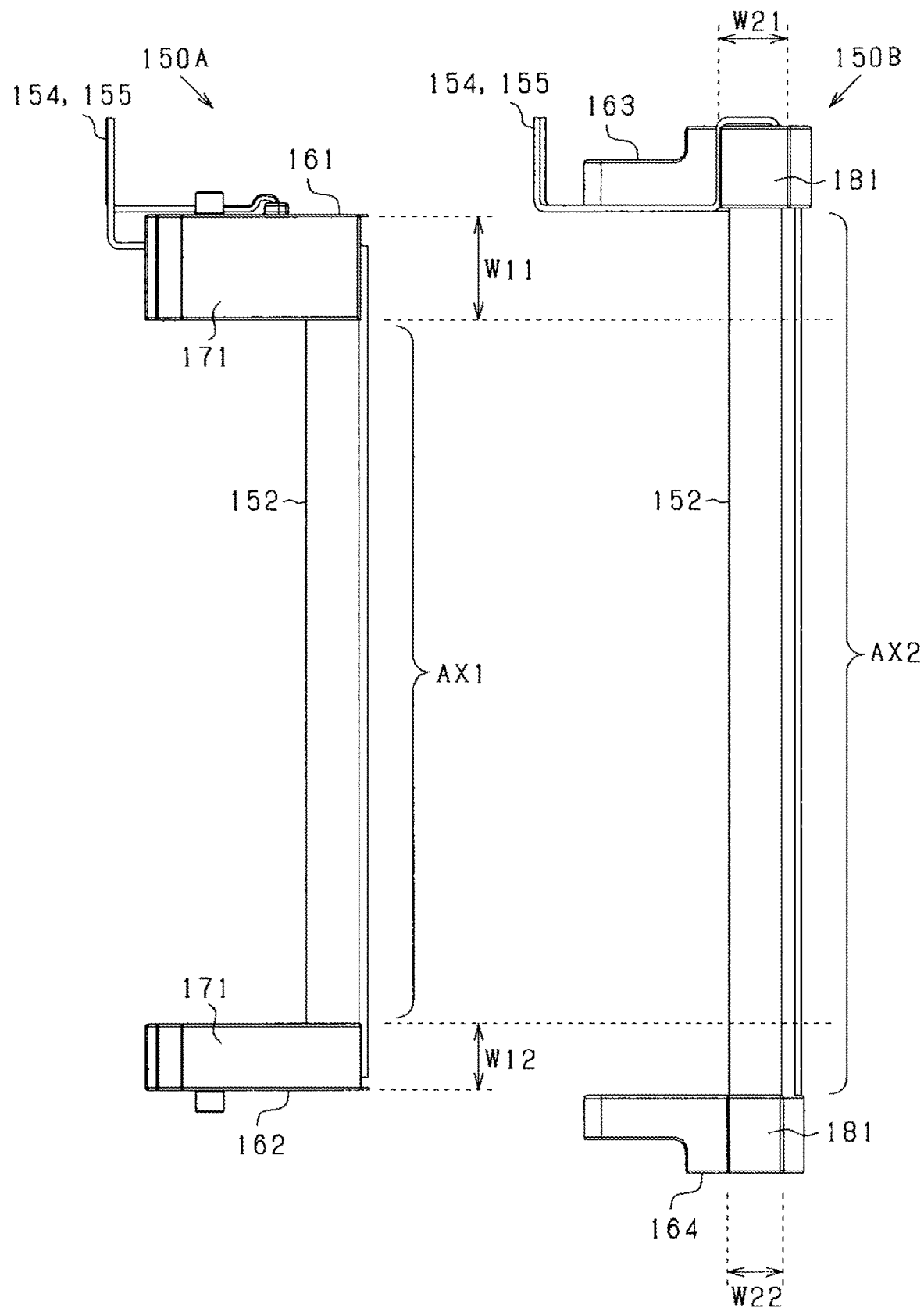
FIG. 17 is a side view which illustrates a first coil module and a second coil module arranged adjacent the first coil module for the sake of ease of comparison.
Figure 18:
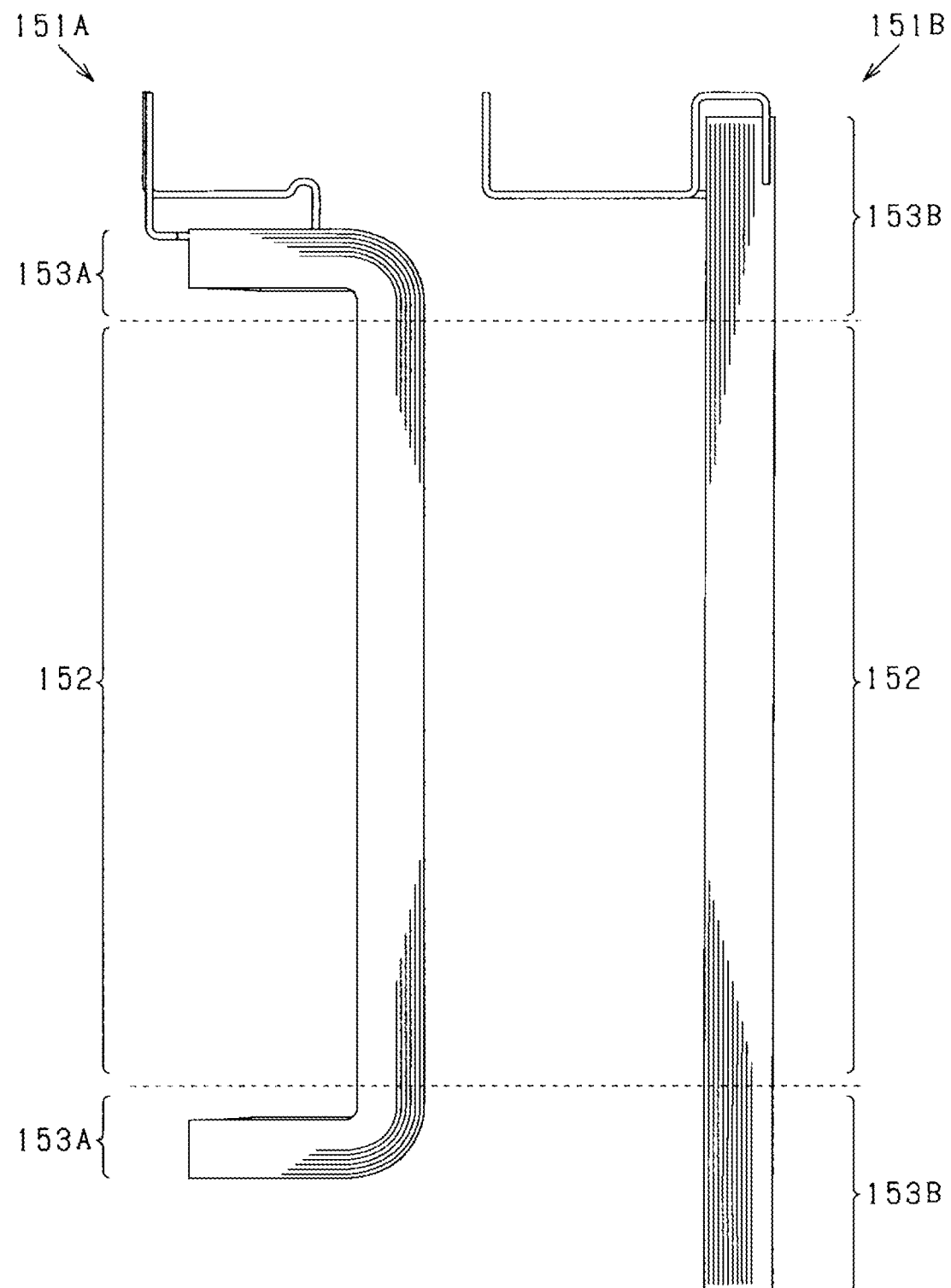
FIG. 18 is a side view which illustrates a first winding segment and a second winding segment arranged adjacent the first winding segment for the sake of ease of comparison.

FIG. 17 is a side view of each of the first coil module 150A and second coil module 150B which are arranged side by side for ease of comparison therebetween. FIG. 18 is a side view of each of the first winding segment 151A and second winding segment 151B which are arranged side by side for ease of comparison therebetween. As illustrated in each of FIGS. 17 and 18, each of the first and second coil modules 150A and 150B has a length in the axial direction of the stator core 62, and the axial length of the first coil module 150A is different from that of the second coil module 150B. Similarly, each of the first and second winding segments 151A and 151B has a length in the axial direction of the stator core 62, and the axial length of the first winding segment 151A is different from that of the second winding segment 151B. Additionally, the shape of each of the first and second ends of the first coil module 150A is different from that of the corresponding one of the first and second ends of the second coil module 150B. Similarly, the shape of each of the first and second ends of the first winding segment 151A is different from that of the corresponding one of the first and second ends of the second winding segment 151B. The first winding segment 151A has a substantially C-shape as viewed from the side, and the second winding segment 151B has a substantially I-shape as viewed from the side. Insulating covers 161 and 162, each of which serves as a first insulating cover, are mounted on the respective first and second ends of the first winding segment 151A in the axial direction. Similarly, insulating covers 163 and 164, each of which serves as a second insulating cover, are mounted on the respective first and second ends of the second winding segment 151B in the axial direction.

The following describes the configuration of each of the coil modules 150A and 150B in detail.

First, the following describes the configuration of the first coil module 150A. FIG. 19(a) is a perspective view of the first coil module 150A, and FIG. 19(b) is an exploded perspective view of components of the first coil module 150A. FIG. 20 is a sectional view taken along the line 20-20 in FIG. 19(a).

As illustrated in FIGS. 19(a) and 19(b), the first coil module 150A includes the first winding segment 151A, and the insulating covers 161 and 162. The winding segment 151A is comprised of a conductive wire member CR that is multiply wound. The insulating covers 161 and 162 are mounted on the respective first and second ends of the first winding segment 151A in the axial direction. Each of the insulating covers 161 and 162 is molded by an insulating material, such as a synthetic resin material.

The first winding segment 151A is comprised of a pair of intermediate conductor portions 152 and a pair of link portions 153A. The intermediate conductor portions 152 are disposed to linearly extend in parallel to each other. Each of the intermediate conductor portions 152 has opposing first and second axial ends respectively correspond to the first and second axial ends of the first winding segment 151A. One of the link portions 153A links or joints the first axial ends of the respective intermediate conductor portions 152 to each other, and the other of the link portions 153A links or joints the second axial ends of the respective intermediate conductor portions 152 to each other. The assembly of the intermediate conductor portions 152 and the link portions 153A constitutes the first winding segment 151A having an annular shape. The intermediate conductor portions 152 are arranged at a predetermined number of coil pitches away from each other. This arrangement of the intermediate conductor portions 152 of each phase winding enables at least one intermediate conductor portion 152 of at least one other-phase winding to be arranged between the intermediate conductor portions 152 of the corresponding phase winding. The intermediate conductor portions 152 of each phase winding in this embodiment are arranged two coil pitches away from each other. This arrangement of the intermediate conductor portions 152 of each phase winding enables two intermediate conductor portions 152 of the respective other phase windings to be arranged between the intermediate conductor portions 152 of the corresponding phase winding.

Each of the link portions 153A has the same shape. Each of the link portions 153A constitutes the corresponding one of the coil ends CE (see FIG. 11). Specifically, each of the link portions 153A is bent to extend perpendicularly to the intermediate conductor portions 152, i.e., to the axial direction.

Each of the first winding segments 151A, as clearly illustrated in FIG. 18, has axially opposed ends defining the link portions 153A. Each of the second winding segments 151B has axially opposed ends defining the link portions 153B. The link portions 153A and 153B of the winding segments 151A and 151B are different in configuration from each other. For ease of identification between the link portions 151A and 153B, the link portions 153A of the first winding segments 151A will also be referred to below as the first link portions 153A. The link portions 153B of the second winding segments 151B will also be referred to below as the second link portions 153B.

The intermediate conductor portions 152 of each of the winding segments 151A and 151B serve as coil side conductor portions that are circumferentially arranged away from each other and constitute the coil side CS. Each of the link portions 153A and 153B serves as a coil end link portion that links two of the intermediate conductor portions 152, which are located at different circumferential positions, of a corresponding same phase with each other; each of the link portions 153A constitutes the corresponding one of the coil ends CE.

The first winding segment 151A is, as illustrated in FIG. 20, comprised of the multiply wound conductive wire member CR to thereby have a substantially rectangular or square shape in its transverse section. FIG. 20 illustrates the transverse section of the intermediate conductor portions 152. As illustrated in FIG. 20, the conductive wire member CR is multiply wound, so that parts of the multiply-wound conductive wire member CR are arrayed in each intermediate conductor portion 152 in both the circumferential and radial directions. The arrayed parts of the multiply-wound conductive wire member CR in each intermediate conductor portion 152 of the first winding segment 151A in both the circumferential and radial directions result in the corresponding intermediate conductor portion 152 having a substantially rectangular shape. In each of the first link portions 153A, parts of the multiply wound conductive wire member CR are bent so that the bent parts of the multiply wound conductive wire member CR are arrayed in both the axial and radial directions in a radian end of the corresponding one of the first link portions 153A. In particular, the conductive wire member CR in this embodiment is concentrically wound to thereby constitute the first winding segment 151A. Howe to wound the conductive wire member CR is, however, optional. For example, the conductive wire member CR may be multiply wound in the form of an alpha winding coil.

The conductive wire member CR has both ends 154 and 155 opposite to each other. The ends 154 and 155, which will be referred to as winding ends 154 and 155, of the multiply wound conductor wire member CR are drawn out from the respective ends of one of the first link portions 153A, which is located at the second end (upper end) of the first winding segment 151A in FIG. 19(b). One of the winding ends 154 and 155 represents the start of winding of the multiply wound conductor wire member CR, and the other thereof represents the end of winding of the multiply wound conductor wire member CR. One of the winding ends 154 and 155 is connected to a current input/output (I/O) terminal, and the other of the winding ends 154 and 155 is connected to the neutral point.

Each intermediate conductor portion 152 of the first winding segment 151A is covered with the sheet-like insulating jacket 157. FIG. 19(a) illustrates the first coil module 150A in which the intermediate conductor portions 152 are covered with the insulating jackets 157, in other words, the intermediate conductor portions 152 are disposed inside the insulating jackets 157, but however, a combination of each of the intermediate conductor portions 152 and a corresponding one of the insulating jackets 157 is denoted by numeral 152 for the sake of convenience. The same applies to FIG. 22(a), as will be referred to later.

Each of the insulating jackets 157 is made of a film member FM that has a predetermined length that corresponds to an axial length of a portion of the intermediate conductor portion 152; the portion should be covered with an insulating material. The film member FM is wrapped around the intermediate conductor portion 152. The film member FM is for example made of polyethylene naphthalate (PEN). Specifically, the film member FM is comprised of a film base having opposing first and second surfaces, and a foamable adhesion layer mounted on the first surface of the film base. The film member FM is wrapped around and attached to an outer peripheral surface of the intermediate conductor portion 152 using the adhesion layer. The adhesion layer may be made from a non-foamable adhesive.

As illustrated in FIG. 20, parts of the multiply-wound conductive wire member CR are arrayed in each intermediate conductor portion 152 in both the circumferential and radial directions. This results in each intermediate conductor portion 152 having a substantially rectangular shape in its transverse cross section. The film member FM is wrapped around the outer peripheral surface of each intermediate conductor portion 152 while both circumferential ends of the film member FM are overlapped with each other, so that the insulating jacket 157 is disposed on the intermediate conductor portion 152. The film member FM is comprised of a rectangular sheet that has a predetermined longitudinal length that is longer than a single wrap-around length of each intermediate conductor portion 152, and has a predetermined lateral length that is longer than that of the corresponding intermediate conductor portion 152. The rectangular film member FM is wrapped around the outer peripheral surface of each intermediate conductor portion 152 while being folded along respective sides of the corresponding intermediate conductor portion 152. Foam produced from the adhesion layer is filled in a clearance between the intermediate conductor portion 152 and the film member FM wrapped therearound. The adhesion layer of one of the overlapped circumferential ends of the film member FM is joined to the adhesion layer of the other of the overlapped circumferential ends of the film member FM.

More specifically, each intermediate conductor portion 152 has a pair of first and second circumferential sides opposite to each other, each of which extends in a corresponding circumferential direction of the stator core 62, and a pair of first and second radial sides opposite to each other, each of which extends in a corresponding radial direction of the stator core 62. The insulating jacket 157 is wrapped around each intermediate conductor portion 152 to cover all the sides thereof. The first circumferential side of each intermediate conductor portion 152 of one phase winding faces the first circumferential side of a circumferentially adjacent intermediate conductor portion 152 of another phase winding. The overlapped circumferential ends of the film member FM will also be referred to as an overlapped portion OL. The overlapped portion OL of the film member FM wrapped around each intermediate conductor portion 152 of one phase winding is located on the first circumferential side of the corresponding intermediate conductor portion 152 of the one phase winding. That is, in the first winding segment 151A, the overlapped portion OL of the film member FM is located on the same first circumferential side of each of the intermediate conductor portions 152.

In the first winding segment 151A, the insulating jacket 157 wrapped around each intermediate conductor portion 152 extends between a part of the lower-side link portion 153A and a part of the upper-side link portion 153A; the part of the lower-side link portion 153A is covered with the insulating cover 162 and the part of the upper-side link portion 153A is covered with the insulating cover 161. In other words, the part of the lower-side link portion 153A is located within the insulating cover 162 and the part of the upper-side link portion 153A is located within the insulating cover 161. Referring to FIG. 17, reference character AX1 represents a portion of the first coil module 150A, which is uncovered with the insulating covers 161 and 162. The insulating jacket 157 is provided to cover over an extended portion of the first coil module 150A, which is axially wider than the portion AX1 of the first coil module 150A.

Next, the following describes the structure of each of the insulating covers 161 and 162.

Figure 21A:
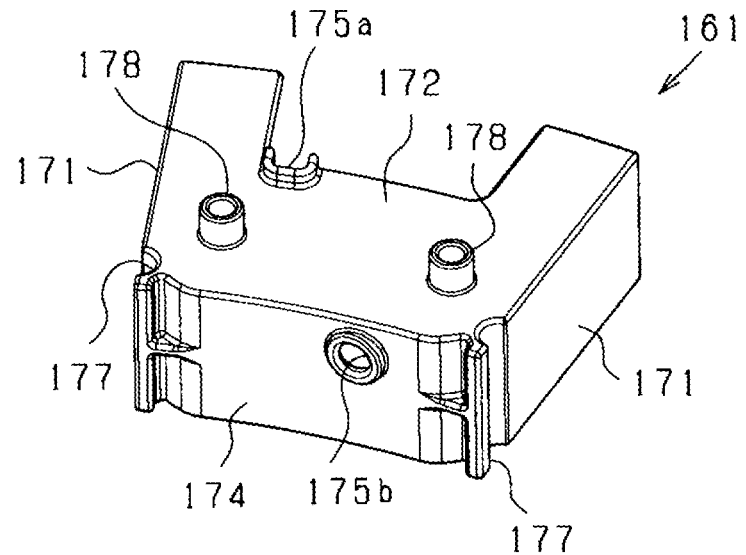
Figure 21B:
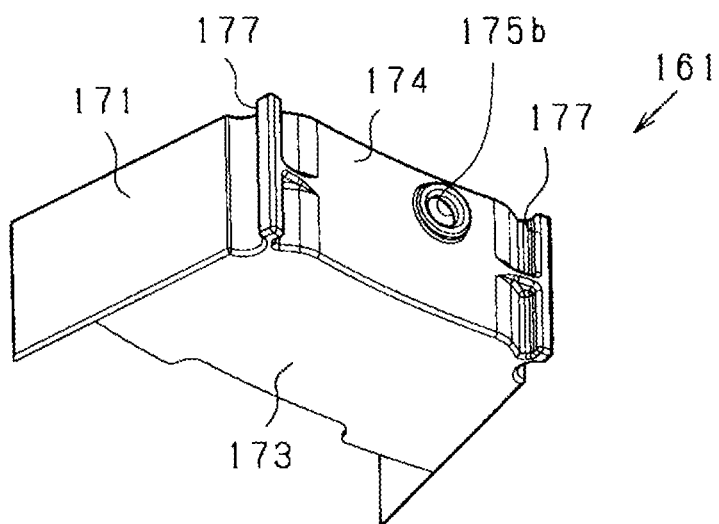

The insulating cover 161 is mounted to cover over the first link portion 153A disposed at the second end of the first winding segment 151A in the axial direction. The insulating cover 162 is mounted to cover over the first link portion 153A disposed at the first end of the first winding segment 151A in the axial direction. FIGS. 21(a) and 21(b) are perspective views respectively illustrating the insulating cover 161 as viewed from different directions.

As illustrated in FIGS. 21(a) and 21(b), the insulating cover 161 includes a pair of side walls 171, an outer wall 172, an axially inner wall 173, and a front wall 174. The side walls 171 constitute sides of the insulating cover 161 arranged at different positions in the circumferential direction of the stator core 62. The outer wall 172 constitutes an axially outer side of the insulating cover 161. The front wall 174 constitutes a radially inner side of the insulating cover 161. Each of the walls 171 to 174 has a plate-like shape, and are assembled to each other to have a solid shape with a radially outer opening surface. Each of the side walls 171 is disposed to be oriented toward the center axis of the core assembly CA to which the stator winding 61 including the side walls 171 is assembled. While the first coil modules 150A are arranged in the circumferential direction, the side walls 171 of each circumferentially adjacent pair of the insulating covers 161 face one another with being in contact with or adjacent to one another. This enables the first coil modules 150A to be arranged in the circumferential direction while being electrically isolated from each other.

The outer wall 172 of the insulating cover 161 has the opening 175a formed therethrough. The opening 175a enables the winding end 154 of the first winding segment 151A to be drawn out therethrough from the inside of the insulating cover 161. The front wall 174 of the insulating cover 161 has the opening 175b formed therethrough from the inside of the insulating cover 161. The opening 175b enables the winding end 155 of the first winding segment 151A to be drawn out therethrough from the inside of the insulating cover 161. The winding end 154 of the first winding segment 151A is drawn out through the opening 175a of the outer wall 172 in a corresponding radial direction and thereafter extends in the axial direction. The winding end 155 of the first winding segment 151A is drawn out from the inside of the insulating cover 161 through the opening 175b of the front wall 174 in the circumferential direction, and thereafter extends in a corresponding radial direction.

Each of the side walls 171 of the insulating cover 161 has the recess 177 disposed at a corner at the intersection of the corresponding one of the side walls 171 and the front wall 174. The recess 177 of each side wall 171 extends in the axial direction, and has a semi-circular shape in its transverse cross section. The insulating cover 161 has a center line along a corresponding radial direction; one side of the insulating cover 161 relative to the center line in the circumferential direction and the other side of the insulating cover 161 relative to the center line in the circumferential direction are symmetrical with each other about the center line. The outer wall 172 of the insulating cover 161 has a pair of protrusions 178 disposed at respective positions that are symmetrical with one another about the center line in the circumferential direction. Each protrusion 178 extends in the axial direction.

The following describes additional information about the recesses 177 of the insulating cover 161. As illustrated in FIG. 20, the first link portions 153A of the first winding segment 151A have a recessed shape that is convex toward the radial inside, i.e., toward the core assembly CA. This results in a circumferential space being formed between the circumferentially adjacent first link portions 153A of each circumferentially adjacent pair of first coil modules 150A; the circumferential space becomes wider as the space approaches the core assembly CA. This embodiment uses the circumferential spaces to form the recesses 177 in the side walls 171 of the insulating cover 161, that is, outside the curved portion of the first link portion 153A.

A temperature sensor, such as a thermistor, may be mounted to the first winding segment 151A. In this modification, the insulating cover 161 preferably has an opening formed therethrough. The opening enables signal lines extending from the temperature sensor to be drawn out from the inside of the insulating cover 161. This modification enables the temperature sensor to be efficiently installed in the insulating cover 161.

Although not described in detail using drawings, the insulating cover 162 has substantially the same structure as that of the insulating cover 161. Specifically, the insulating cover 162, like the insulating cover 161, includes a pair of side walls 171, the outer wall 172, the axially inner wall 173, and the front wall 174. The side walls 171 constitute sides of the insulating cover 162 arranged at different positions in the circumferential direction of the stator core 62. The outer wall 172 constitutes an axially outer side of the insulating cover 162. The front wall 174 constitutes a radially inner side of the insulating cover 162. Each of the side walls 171 of the insulating cover 162 has the recess 177 disposed at a corner at the intersection of the corresponding one of the side walls 171 and the front wall 174. The recess 177 of each side wall 171 extends in the axial direction, and has a semi-circular shape in its transverse cross section. The outer wall 172 of the insulating cover 162 has a pair of protrusions 178 disposed thereon. As different points of the insulating cover 162 from the insulating cover 161, the insulating cover 162 has no openings formed therethrough for drawing out the winding ends 154 and 155 from the inside thereof.

Each of the insulating covers 161 and 162 has a predetermined height W11, W12 in the axial direction. Specifically, the insulating cover 161 has the height W11 (i.e., width of a portion of the insulating cover 161 constituted by the side walls 171 and front wall 174 in the axial direction). Similarly, the insulating cover 162 has the height W12 (i.e., width of a portion of the insulating cover 162 constituted by the side walls 171 and front wall 174 in the axial direction). As illustrated in FIG. 17, the height W11 of the insulating cover 161 is set to be larger than the height W12 of the insulating cover 162, which is expressed by the relation W11>W12. That is, if the winding segment 151A is comprised of the multiply wound conductive wire member CR, the multiply wound conductive wire member CR is comprised of many turns of the conductive wire member CR while the turns are shifted in a direction perpendicular to the winding direction of each turn. This may result in the axial width of the turns of the conductive wire member CR becomes larger. Additionally, the insulating cover 161 covers over the first link portion 153A that includes the start of winding of the multiply wound conductor wire member CR, and the end of winding of the multiply wound conductor wire member CR. This may result in the number of overlapped parts of the multiply wound conductor wire member CR in the first link portion 153A being larger, resulting in the axial width of the turns of the conductive wire member CR becoming larger. From this viewpoint, the height W11 of the insulating cover 161 is set to be larger than the height W12 of the insulating cover 162. This prevents a limitation of the number of turns of the conductor wire member CR as compared with a case where the insulating covers 161 and 162 have the same height.

Next, the following describes the configuration of the second coil module 150B.

FIG. 22(a) is a perspective view of the coil module 150B, and FIG. 22(b) is an exploded perspective view of components of the first coil module 150B. FIG. 23 is a sectional view taken along the line 23-23 in FIG. 22(a).

As illustrated in FIGS. 22(a) and 22(b), the second coil module 150B includes the second winding segment 151B, and the insulating covers 163 and 164, which is similar to the first coil module 150A. The second winding segment 151B is comprised of a conductive wire member CR that is multiply wound. The insulating covers 163 and 164 are mounted on the respective first and second ends of the second winding segment 151B in the axial direction. Each of the insulating covers 163 and 164 is molded into the corresponding shape by an insulating material, such as a synthetic resin material.

The second winding segment 151B is comprised of a pair of intermediate conductor portions 152, and the pair of second link portions 153B. The intermediate conductor portions 152 are disposed to linearly extend in parallel to each other. Each of the intermediate conductor portions 152 has opposing first and second axial ends respectively correspond to the first and second axial ends of the second winding segment 151B. One of the second link portions 153B links the first axial ends of the respective intermediate conductor portions 152 to each other, and the other of the second link portions 153B links the second axial ends of the respective intermediate conductor portions 152 to each other. The assembly of the intermediate conductor portions 152 and the second link portions 153B constitutes the winding segment 151B having an annular shape. The configuration of each intermediate conductor portion 152 of the second winding segment 151B is the same as that of the corresponding intermediate conductor portion 152 of the first winding segment 151A. In contrast, the configuration of each of the second link portions 153B is different from that of the corresponding one of the first link portions 153A. Specifically, each of the second link portions 153B extends from the intermediate conductor portion 152 linearly in the axial direction without being radially bent. FIG. 18 illustrates the first winding segment 151A and the second winding segment 151B while being compared with each other.

The conductive wire member CR has both ends 154 and 155 opposite to each other. The ends 154 and 155, which will be referred to as winding ends 154 and 155, of the multiply wound conductor wire member CR are drawn out from the respective ends of one of the second link portions 153B, which is located at the second end (upper end) of the second winding segment 151B in FIG. 22(b). One of the winding ends 154 and 155 represents the start of winding of the multiply wound conductor wire member CR, and the other thereof represents the end of winding of the multiply wound conductor wire member CR. One of the winding ends 154 and 155 is connected to the current input/output (I/O) terminal, and the other of the winding ends 154 and 155 is connected to the neutral point.

Each intermediate conductor portion 152 of the second winding segment 151B is covered with the sheet-like insulating jacket 157, which is similar to the first winding segment 151A. The insulating jacket 157 is comprised of a film member FM that has a predetermined length that corresponds to an axial length of a portion of the intermediate conductor portion 152; the portion should be covered with an insulating material. The film member FM is wrapped around the intermediate conductor portion 152.

The configuration of the insulating jacket 157 of the second winding segment 151B is substantially identical to that of the insulating jacket 157 of the first winding segment 151A. Specifically, as illustrated in FIG. 23, the film member FM is wrapped around the outer peripheral surface of each intermediate conductor portion 152 while both circumferential ends of the film member FM are overlapped with each other. More specifically, each intermediate conductor portion 152 has a pair of first and second circumferential sides opposite to each other, each of which extends in a corresponding circumferential direction of the stator core 62, and a pair of first and second radial sides opposite to each other, each of which extends in a corresponding radial direction of the stator core 62. The insulating jacket 157 is wrapped around each intermediate conductor portion 152 to cover all the sides thereof. The first circumferential side of each intermediate conductor portion 152 of one phase winding faces the first circumferential side of a circumferentially adjacent intermediate conductor portion 152 of another phase winding. The overlapped portion OL of the film member FM wrapped around each intermediate conductor portion 152 of one phase winding are located on the first circumferential side of the corresponding intermediate conductor portion 152 of the one phase winding. That is, in the second winding segment 151B, the overlapped portion OL of the film member FM is located on the same first circumferential side of each of the intermediate conductor portions 152.

In the second winding segment 151B, the insulating jacket 157 wrapped around each intermediate conductor portion 152 extends between a part of the lower-side link portion 153B and a part of the upper-side link portion 153B; the part of the lower-side link portion 153B is covered with the insulating cover 164 and the part of the upper-side link portion 153B is covered with the insulating cover 163. In other words, the part of the lower-side link portion 153B is located within the insulating cover 164 and the part of the upper-side link portion 153B is located within the insulating cover 163. Referring to FIG. 17, reference character AX2 represents a portion of the second coil module 150B, which is uncovered with the insulating covers 163 and 164. The insulating jacket 157 is provided to cover over an extended portion of the second coil module 150B, which is axially wider than the portion AX2 of the second coil module 150B.

The insulating jacket 157 of the winding segment 151A extends to cover over a part of each of the link portions 153A, and the insulating jacket 157 of the winding segment 151B similarly extends to cover over a part of each of the link portions 153B. Specifically, each insulating jacket 157 of the first winding segment 151A is disposed to cover over (i) a corresponding one of the intermediate conductor portions 152 and (ii) a part of each link portion 153A, which continuously extends linearly from the corresponding one of the intermediate conductor portions 152. Because the axial length of the winding segment 151A is different from that of the winding segment 151B, the axial range of the winding segment 151A, which is covered with the insulating jacket 157, is also different from the axial range of the winding segment 151B, which is covered with the insulating jacket 157.

The following describes the structure of each of the insulating covers 163 and 164.

Figure 24A:
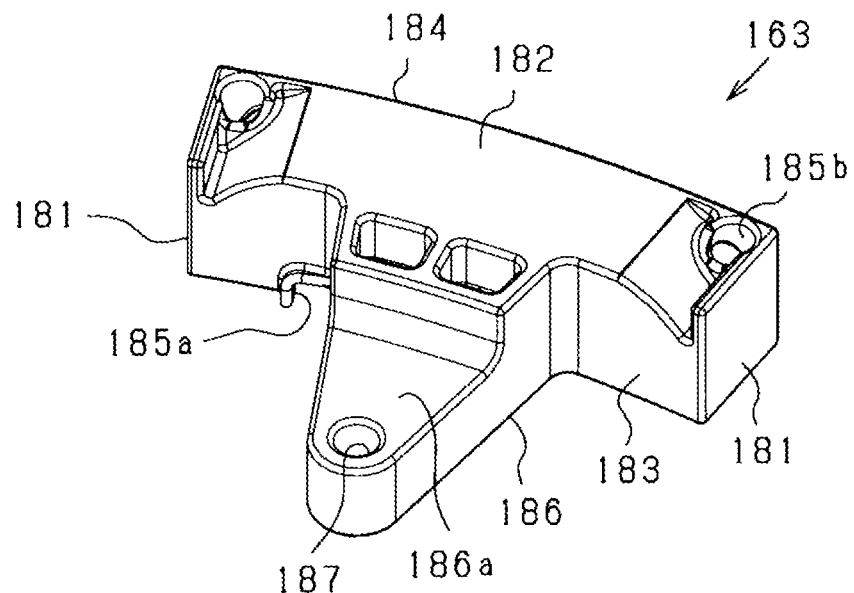
Figure 24B:
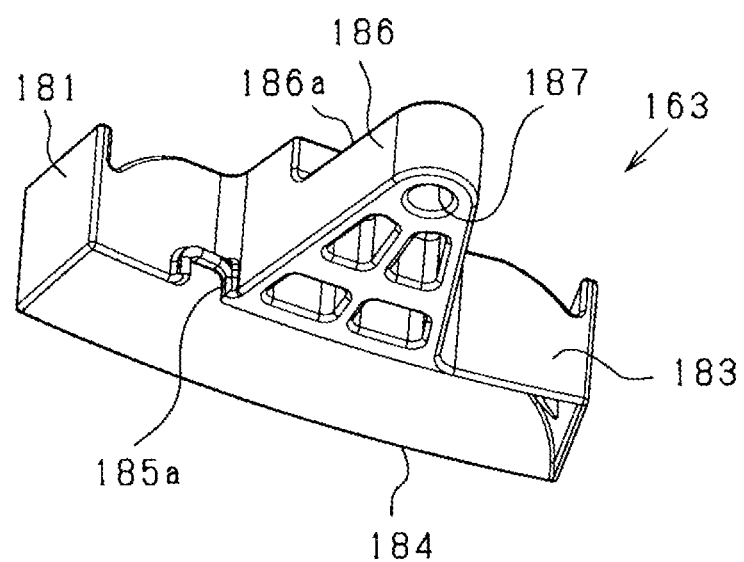

The insulating cover 163 is mounted to cover over the second link portion 153B disposed at the second end of the second winding segment 151B in the axial direction. The insulating cover 164 is mounted to cover over the second link portion 153B disposed at the first end of the second winding segment 151B in the axial direction. FIGS. 24(a) and 24(b) are perspective views respectively illustrating the insulating cover 163 as viewed from different directions.

As illustrated in FIGS. 24(a) and 24(b), the insulating cover 163 includes a pair of side walls 181, the outer wall 182, the radially inner front wall 183, and the rear wall 184. The side walls 181 constitute sides of the insulating cover 163 arranged at different positions in the circumferential direction of the stator core 62. The outer wall 182 constitutes an axially outer side of the insulating cover 163. The front wall 183 constitutes a radially inner side of the insulating cover 163. The rear wall 184 constitutes a radially outer side of the insulating cover 163. Each of the walls 181 to 184 has a plate-like shape, and are assembled to each other to have a solid shape with an axially inner opening surface. Each of the side walls 181 is disposed to be oriented toward the center axis of the core assembly CA to which the stator winding 61 including the side walls 181 is assembled. While the second coil modules 150B are arranged in the circumferential direction, the side walls 181 of each circumferentially adjacent pair of the insulating covers 163 face one another with being in contact with or adjacent to one another. This enables the second coil modules 150B to be arranged in the circumferential direction while being electrically isolated from each other.

The front wall 183 of the insulating cover 163 has the opening 185a formed therethrough from the inside of the insulating cover 163. The opening 185a enables the winding end 154 of the second winding segment 151B to be drawn out therethrough from the inside of the insulating cover 163. The outer wall 182 of the insulating cover 163 has an opening 185b formed therethrough from the inside of the insulating cover 163. The opening 185b enables the winding end 155 of the second winding segment 151B to be drawn out therethrough from the inside of the insulating cover 163.

The front wall 183 of the insulating cover 163 has the protrusion 186 protruding radially inward from the front wall 183. The protrusion 186 is disposed at the middle between the side walls 181 in the circumferential direction, and is configured to protrude more radially inward than each second link portion 153B does. That is, the protruding length of the protrusion 186 is larger than the protruding length of each second link portion 153B. The protrusion 186 has a tapered shape that becomes tapered as extending radially inward as viewed from above. The protrusion 186 has an extending end, and the through hole 187 formed through the extending end; the through hole 187 extends in the axial direction. The configuration of the protrusion 186 may be freely designed as long as (1) The protrusion 186 protrudes more radially inward than each second link portion 153B does.
(2) The extending end of the protrusion 186 has formed therethrough the through hole 187 that is disposed at qual distances away from the side walls 181 in the circumferential direction.

Preferably, for considering an overlapped state of the protrusion 163 and the radially disposed insulating covers 161, the circumferential width of the protrusion 186 is as narrow as possible for preventing interference between the protrusion 186 and the winding ends 154 and 155.

In particular, the extending end of the protrusion 186 has an axial thickness smaller than an axial thickness of the remaining portion of thereof. The extending end of the protrusion 186, which has a smaller thickness, is defined as a low-height portion 186a. The low-height portion 186a of the protrusion 186 has the through hole 187 formed therethrough. The axial height of the low-height portion 186a of the protrusion 186 of each second coil module 150B relative to the end surface of the first end of the inner cylindrical member 81 is lower than the axial height of the upper link portion 153B of the corresponding second coil module 150B while the second coil modules 150B are assembled to the core assembly CA.

As illustrated in FIG. 23, the remaining part of the protrusion 186 has a pair of through holes 188 formed therethrough. The through holes 188 of the protrusion 186 enable, while the insulating covers 161 and 163 are axially overlapped with each other, adhesive to be applied through the through holes 188. This results in the applied adhesive being filled between the axially overlapped insulating covers 161 and 163.

Although omitted in the drawings, the insulating cover 164 has substantially the same structure as that of the insulating cover 163. Specifically, the insulating cover 164, like the insulating cover 163, includes a pair of side walls 181, the outer wall 182, the radially inner front wall 183, and the rear wall 184. The side walls 181 constitute sides of the insulating cover 164 arranged at different positions in the circumferential direction of the stator core 62. The outer wall 182 constitutes an axially outer side of the insulating cover 164. The front wall 183 constitutes a radially inner side of the insulating cover 164. The rear wall 184 constitutes a radially outer side of the insulating cover 164. The front wall 183 of the insulating cover 164 has the protrusion 186 protruding radially inward from the front wall 183. The protrusion 186 has the through hole 187 formed through the extending end. As different points of the insulating cover 164 from the insulating cover 163, the insulating cover 164 has no openings formed therethrough for drawing out the winding ends 154 and 155 of the second winding segment 151B from the inside thereof.

Each side wall 181 of the insulating cover 163 has a predetermined radial width W21, and each side wall 181 of the insulating cover 164 has a predetermined radial width W22. Specifically, as illustrated in FIG. 17, the radial width W21 of the insulating cover 163 is set to be larger than the radial width W22 of the insulating cover 164, which is expressed by the following relation "W21>W22". That is, if the winding segment 151B is comprised of the multiply wound conductive wire member CR, the insulating cover 163 covers over the second link portion 153B that includes the start of winding of the multiply wound conductor wire member CR, and the end of winding of the multiply wound conductor wire member CR. This may result in the number of overlapped parts of the multiply wound conductor wire member CR in the second link portion 153B being larger, resulting in the axial width of the turns of the conductive wire member CR becoming larger. From this viewpoint, the radial width W21 of the insulating cover 163 is set to be larger than the radial width W22 of the insulating cover 164. This prevents a limitation of the number of turns of the conductor wire member CR as compared with a case where the insulating covers 163 and 164 have the same radial width.

FIG. 25 is a view illustrating how the overlapped portions OL of the respective film members FM are arranged while the coil modules 150A and 150B are circumferentially arranged. As described above, the film member FM is wrapped around the outer peripheral surface of each intermediate conductor portion 152 of each coil module 150A, 150B while (1) Both circumferential ends of the film member FM are overlapped with each other as the overlapped portion OL (2) The overlapped portion OL of the film member FM is located at the first circumferential side of the corresponding intermediate conductor portion 152; the first circumferential side faces the intermediate conductor portion 152 of another phase (see FIGS. 20 and 23).

This results in the overlapped portion OL of each film member FM being located on the same side, i.e., the right side in FIG. 25, of the corresponding intermediate conductor portion 152 in the circumferential direction. This therefore results in the overlapped portion OL of the film member FM of the intermediate conductor portion 152 of a one-phase winding segment 151A and the overlapped portion OL of the film member FM of the intermediate conductor portion 152 of another-phase winding segment 151B, which is circumferentially adjacent to the one-phase winding segment 151A, being circumferentially not overlapped with each other. Between the circumferentially adjacent pair of intermediate conductor portions 152, at most three parts of the film members FM are located.

Next, the following describes the structure of the coil modules 150A and 150B being assembled to the core assembly CA.

The axial length of the coil module 150A is different from that of the coil module 150B, and the configuration of each link portion 153A of the coil module 150A is different from that of the corresponding link portion 153B of the coil module 150B. The coil modules 150A and 150B are assembled to the core assembly CA while the first link portions 153A of each coil module 150A are disposed radially closer to the core assembly CA and the second link portions 153B of each coil module 150B are disposed radially farther from the core assembly CA. The insulating covers 161 to 164 are secured to the core assembly CA while the insulating covers 161 and 163 are axially overlapped with each other at the second end of the core assembly CA and the insulating covers 162 and 164 are axially overlapped with each other at the first end of the core assembly CA.

FIG. 26 is a plan view illustrating that the insulating covers 161 are circumferentially arranged while the first coil modules 150A are assembled to the core assembly CA. FIG. 27 is a plan view illustrating that the insulating covers 161 and 163 are circumferentially arranged while the first and second coil modules 150A and 150B are assembled to the core assembly CA. FIG. 28(a) is a longitudinal sectional view illustrating that the coil modules 150A and 150B are assembled to the core assembly CA before fastening of the insulating covers 161 and 163 to the core assembly CA using fastening pins 191. FIG. 28(b) is a longitudinal sectional view illustrating that the coil modules 150A and 150B are assembled to the core assembly CA after fastening of the insulating covers 161 and 163 to the core assembly CA using the fastening pins 191.

As illustrated in FIG. 26, while the first coil modules 150 are assembled to the core assembly CA, the insulating covers 161 are circumferentially arranged such that the side walls 171 of each circumferentially adjacent pair of the insulating covers 161 face one another with being in contact with or adjacent to one another. Each circumferentially adjacent pair of the insulating covers 161 is arranged such that a boundary line LB extending along the facing side walls 171 is axially aligned with a corresponding one of the recesses 105 formed in the outer surface of the end plate 91 of the inner cylindrical member 81. Since the side walls 171 of each circumferentially adjacent pair of the insulating covers 161 are in contact with or adjacent to one another, the recesses 177 of each circumferentially adjacent pair of the insulating covers 161 form a through hole extending in the axial direction. The through hole formed in each circumferentially adjacent pair of the insulating covers 161 is axially aligned with the corresponding one of the recesses 105 of the end plate 91 of the inner cylindrical member 81.

The second coil modules 150B are, as illustrated in FIG. 27, assembled to the assembly of the first coil modules 150A and the core assembly CA. This assembling of the second coil modules 150B to the core assembly CA results in the side walls 181 of each circumferentially adjacent pair of the insulating covers 163 facing one another with being in contact with or adjacent to one another. This assembling of the second coil modules 150B to the core assembly CA also results in the link portions 153A and 153B intersecting with each other on a virtual circle along which the intermediate conductor portions 152 are circumferentially arranged while the assembly of the coil modules 150A and 150B and the core assembly CA is viewed above. Each insulating cover 163 is disposed such that (1) The protrusion 186 is axially overlapped with a boundary of a corresponding circumferentially adjacent pair of the insulating covers 161
(2) The through hole 187 is axially aligned with the through hole defined by the recesses 177 of a corresponding one circumferentially adjacent pair of the insulating covers 161.

When the second coil modules 150B are assembled to the assembly of the first coil modules 150A and the core assembly CA, the protrusion 186 of each insulating cover 163 is guided by the protrusions 178 of a corresponding circumferentially adjacent pair of insulating covers 161. This results in the through hole 187 of the protrusion 186 of each insulating cover 163 being axially aligned with (1) The through hole defined by the recesses 177 of a corresponding one circumferentially adjacent pair of the insulating covers 161
(2) A corresponding one of the recesses 105 of the end plate 91 of the inner cylindrical member 81

When the coil modules 150B are assembled to the assembly of the core assembly CA and the coil modules 150A, the through hole defined by the recesses 177 of each circumferentially adjacent pair of the insulating covers 161 is located inwardly. There may be therefore a concern that it is difficult to axially align the through hole 187 of the protrusion 186 of each insulating cover 163 with the through hole defined by the recesses 177 of a corresponding circumferentially adjacent pair of the insulating covers 161. Regarding such a concern, the protrusion 186 of each insulating cover 163 is guided by the protrusions 178 of a corresponding circumferentially adjacent pair of insulating covers 161. This makes it possible to easily axially align the through hole 187 of the protrusion 186 of each insulating cover 163 with the through hole defined by the recesses 177 of a corresponding one circumferentially adjacent pair of the insulating covers 161.

Joining of the insulating cover 161 and the insulating cover 613 is, as illustrated in FIGS. 28(a) and 28(b), achieved by the fastening pin 191 at an overlap of the insulating cover 161 with the protrusion 186 of the insulating cover 163. Specifically, such joining is accomplished by aligning the recess 105 of the inner cylindrical member 81, the recess 177 of the insulating cover 161, and the through hole 187 of the insulating cover 163 with each other and then inserting the fastening pin 191 into them, thereby firmly securing the insulating covers 161 and 163 to the inner cylindrical member 81. This results in joint of a respective circumferentially adjacent coil modules 150A and 150B to the core assembly CA at the coil end CE using the common fastening pin 191. It is advisable that each of the fastening pins 191 be made from high-thermal conductive material, such as metal.

As illustrated in FIG. 28(b), the fastening pin 191, which has opposing upper and lower ends in its axial direction, for each insulating cover 163 is mounted through the low-height portion 186a of the corresponding insulating cover 163. In this state, the upper end of the fastening pin 191 is disposed to project over the low-height portion 186a while being axially lower than an outer surface, i.e., an upper surface, of the outer wall 182 of the insulating cover 163. The fastening pin 191 has a length in its axial direction, and the length of the fastening pin 191 is larger than the axially overlapped portion of the low-height portion 186a of the protrusion 186 and the insulating cover 161, so that the upper end of the fastening pin 191, which projects over the low-height portion 186a, serves as a margin. The margin of the fastening pin 191 enables, for insertion of each fastening pin 191 through the corresponding through hole 187 and the corresponding through hole formed by the recesses 177 into the corresponding recess 105, the corresponding fastening pin 191 to be easily inserted through the corresponding through hole 187 and the corresponding through hole formed by the recesses 177 into the corresponding recess 105. The upper end of the fastening pin 191 is disposed to be axially lower than the outer surface 173, i.e., the upper surface, of the insulating cover 163. This prevents an increase in the axial length of the stator 60 due to the projecting fastening pins 191.

After the insulating covers 161 and 163 are fastened to the core assembly CA using the fastening pins 191, adhesive is applied through the through holes 188 of the insulating cover 163, so that the applied adhesive is filled between the axially overlapped insulating covers 161 and 163. This results in the axially overlapped insulating covers 161 and 163 being strongly joined to each other. For the sake of simplicity, FIGS. 28(a) and 28(b) illustrate the through holes 188 as being formed through the remaining part of the protrusion 186 except the low-height portion 186a of the insulating cover 163 between the outer surface (upper surface) of the outer wall 182 and an outer surface, i.e., a lower surface) of a bottom wall of the insulating cover 163; the bottom wall is opposite to the outer wall 182. Actually, the through holes 188 may be formed through a thinner-thickness part of the protrusion 186; the thinner-thickness part of the protrusion 186 is smaller in axial thickness than the remaining of the protrusion 186.

The securement of the insulating covers 161 and 163 using the fastening pin 191 is, as illustrated in FIG. 28(b), achieved on the axial end surface of the stator holder 70 which is located radially inside the stator core 62 (i.e., the left side of the drawing). The insulating covers 161 and 163 are attached to the stator holder 70 using the fastening pin 191. In other words, the first link portions 153A are fixed on the axial ends of the stator holder 70. The stator holder 70 has the coolant path 85 therein, so that heat generated from the first winding segments 151A will be transferred directly from the first upper link portions 153A to the coolant path 85 of the stator holder 70 or a region of the stator holder 70 around the coolant path 85. Additionally, each fastening pin 191 is disposed in a corresponding one of the recesses 105 of the stator holder 70, thereby facilitating the transfer of heat to the stator holder 70 through the corresponding fastening pin 191. The above configuration of the rotating electrical machine 10, therefore, has a higher performance of cooling the stator winding 61.

Eighteen insulating covers 161 and eighteen insulating covers 163 are arranged to be axially overlapped with one another; the axially overlapped insulating covers 161 and 173 constitute the coil end CE. Eighteen recesses 105 are formed in the outer surface of the stator holder 70. The eighteen insulating covers 161 and eighteen insulating covers 163 are secured to the core assembly CA at the respective eighteen recesses 105 and eighteen fastening pins 191.

How the insulating covers 162 and 164 are assembled to the first end of the core assembly CA in the axial direction, which is although unillustrated, is similar to how the insulating covers 161 and 163 are assembled to the second end of the core assembly CA in the axial direction. Specifically, the securement of the first coil modules 150A is first achieved by placing the side walls 171 of the respective circumferentially adjacent insulating covers 162 in contact with or close to each other to define an axially extending through hole by the recesses 177 of the insulating covers 162. The axially extending through hole is aligned with a corresponding one of the recesses 106 formed in the axial end of the outer cylindrical member 71. The securement of each of the second coil module 150B is achieved to align the through-hole 187 of the insulating cover 164 with the through-hole of the insulating cover 163 and the recess 106 of the outer cylindrical member 71. The fastening pin 191 is inserted into the recesses 106 and 177 and the through-hole 187, thereby firmly attaching the insulating covers 162 and 164 to the outer cylindrical member 71.

Preferably, all the coil modules 150A are assembled to the outer peripheral surface of the core assembly CA, and thereafter all the coil modules 150B are assembled to the outer peripheral surface of the core assembly CA and the insulating covers 161 to 164 are fastened to the core assembly CA using the fastening pins 191. Alternatively, a first step of fastening a pair of one first coil module 150A and one second col module 150B to one another using one fastening pin 191 is carried out. Next, a second step of assembling, to the outer peripheral surface of the core assembly CA, the first coil module 150A and second coil module 150B fastened to each other by the fastening pin 191 is carried out. Then, the first step and second step are repeatedly carried out.

Next, the following describes the busbar module 200.

The busbar module 200 is electrically connected to the winding segments 151 of the coil modules 150, so that
(1) First ends of the winding segments 151 for the U-phase are connected in parallel to each other
(2) First ends of the winding segments 151 for the V-phase are connected in parallel to each other
(3) First ends of the winding segments 151 for the W-phase are connected in parallel to each other
(4) Second ends, which are opposite to the first ends, of the winding segments 151 for all the phases are connected to each other at a neutral point.

FIG. 29 is a perspective view of the busbar module 200.
FIG. 30 is a longitudinal sectional view of a part of the busbar module 200.

The busbar module 200 includes the annular ring 201, a plurality of connection terminals 202, and three input/output (I/O) terminals 203 provided for the respective phase windings. The connection terminals 202 extend from the annular ring 201. The annular ring 201 is made of an insulating member, such as resin, in a circular shape.

The annular ring 201, as illustrated in FIG. 30, includes a plurality of, i.e., five in this modification, substantially annular plates 204 stacked in the same axial direction. The annular plates 204 will be also referred to as substantially annular stacked plates 204. The busbar module 200 also includes four busbars 211 to 214. Each of the busbars 211 to 214 is interposed between a corresponding axially adjacent pair of annular stacked plates 204. Each of the busbars 211 to 214 has an annular shape. The busbars 211 to 214 include a U-phase busbar 211, a V-phase busbar 212, a W-phase busbar 213, and a neutral-point busbar 214. These busbars 211 to 214 are aligned in the axial direction of the annular ring 201 while their major surfaces face each other. Each of the busbars 211 to 214 is adhered to a corresponding axially adjacent pair of annular stacked plates 204. For example, adhesive sheets are preferably used for bonding each of the busbars 211 to 214 to a corresponding axially adjacent pair of annular stacked plates 204. Semi-liquid adhesive or liquid adhesive may alternatively be applied to opposing major surfaces of each stacked plate 204 for bonding each of the busbars 211 to 214 to a corresponding axially adjacent pair of annular stacked plates 204. First ends of the connection terminals 202 are each connected to a corresponding one of the busbars 211 to 214 in the annular ring 201, and second ends of the connection terminals 202 protrude radially outside the annular ring 201.

An upper surface of the annular ring 201, that is, an outermost one of the five stacked plates 204 has formed thereon the protrusion 201a which extends in an annular shape.

The busbar module 200 may be designed as long as the busbars 211 to 214 are embedded in the annular ring 201. For example, the annular ring 201 and the busbars 211 to 214 arranged at regular intervals may be integrally insert molded. Although the busbars 211 to 214 of the busbar module 200 are aligned in the axial direction while the bar surface of each busbar 211 to 214 is perpendicular to the axial direction, but the arrangement of the busbars 211 to 214 may be optionally selected. For example, the busbars 211 to 214 of the busbar module 200 are aligned in the radial direction. Two of the busbars 211 to 214 may alternatively be aligned in the axial direction, and the remaining two thereof may be aligned in the radial direction. The busbars 211 to 214 may extend in respective directions.

The connection terminals 202 are, as illustrated in FIG. 29, aligned in the circumferential direction of the annular ring 201. Each of the connection terminals 202 extends in the axial direction of the annular ring 201 radially outside the bus bar module 200. The connection terminals 202 include connection terminals connected to the U-phase busbar 211, connection terminals connected to the V-phase busbar 212, connection terminals connected to the W-phase busbar 213, and connection terminals connected to the neutral-point busbar 214. The number of connection terminals 202 is set to be identical to the number of winding ends 154 and 155 of the winding segments 151 of the coil modules 150, so that the connection terminals 202 are respectively connected to the winding ends 154 and 155. This results in the busbar module 200 being connected to each of the U-phase winding segments 151, the V-phase winding segments 151, and the W-phase winding segments 151.

The I/O terminals 203 are made of, for example, a busbar material and extend in the axial direction. The I/O terminals 203 include a U-phase I/O terminal 203U, a V-phase I/O terminal 203V, and a W-phase I/O terminal 203W. The U-phase I/O terminal 203U, V-phase I/O terminal 203V, and W-phase I/O terminal 203W are connected to the respective U-phase busbar 211, V-phase busbar 212, and W-phase busbar 213 in the annular ring 201. Electrical power is inputted to each-phase winding of the stator winding 61 from an unillustrated inverter through a corresponding one of the I/O terminals 203. Electrical power is outputted to the unillustrated inverter from each-phase winding of the stator winding 61 from an unillustrated inverter through a corresponding one of the I/O terminals 203.

Current sensors may be integrally installed in the busbar module 200 for respectively measuring a U-phase current, a V-phase current, and a W-phase current. In this case, current measurement terminals may be provided for the busbar module 200. Electrical current information measured by each current sensor may be output to an unillustrated controller through a corresponding one of the current measurement terminals.

The annular ring 201 has an inner peripheral surface, and protrusions 205 extending radially inward from the inner peripheral surface. Each of the protrusions 205 serves as a fixture to be fixed to the stator holder 70. Each of the protrusions 205 has an extending end, and the through hole 206 formed through the extending end thereof. The through hole 206 of each protrusion 205 extends in the axial direction of the annular ring 201.

FIG. 31 is a perspective view illustrating the busbar module 200 assembled to the stator holder 70. FIG. 32 is a longitudinal sectional view illustrating how the busbar module 200 is fixed to the stator holder 70. The structure of the stator holder 70 before the busbar module 200 is assembled to the stator holder 70 is illustrated in FIG. 12.

The busbar module 200 is, as illustrated in FIG. 31, mounted on the end plate 91 and surrounds the boss 92 of the inner cylindrical member 81. The busbar module 200 is assembled to the rods 95 (see FIG. 12), so that the busbar module 200 is positioned. The busbar module 200 is then assembled to the inner cylindrical member 81 of the stator holder 70 using fasteners 217, such as bolts.

More specifically, as illustrated in FIG. 32, the rods 95 are mounted on the end plate 91 of the inner cylindrical member 81 and located radially outside the boss 92. Each of the rods 95 extends from the end plate 91 in the axial direction of the end plate 91. The busbar module 200 is secured by the fasteners 217 to the rods 95 with the rods 95 inserted into the through-holes 206 formed in the protrusions 205. In this embodiment, the securement of the busbar module 20 is achieved using the retainer plates 220 made from metallic material, such as iron. Each of the retainer plates 220 includes the mating fastener portion 222, the press portion 223, and the bent 224. The mating fastener portion 222 has formed therein the through-hole 221 through which the fastener 217 passes. The press portion 223 works to press the upper surface of the annular ring 201 of the busbar module 200. The bent 224 is located between the mating fastener portions 222 and the press portion 223.

Each of the retainer plates 220 is disposed on the annular ring 201 with the fastener 217 inserted into the through-hole 221 of the retainer plate 220 and threadedly engaging the rods 95 of the inner cylindrical member 81. The press portion 223 of the retainer plate 220 is placed in contact with the upper surface of the annular ring 201 of the busbar module 200. The screwing of the fasteners 217 into the rods 95 causes the retainer plates 220 to be pressed downward, as viewed in the drawing, so that the annular ring 201 is pressed downward by the press portions 223. The downward pressure, as produced by the screwing of each of the fasteners 217, is transmitted to the press portion 223 through the bent 224, so that the annular ring 201 is pressed by the press portion 223 with the aid of elastic pressure created by the bent 224.

The annular ring 201, as described above, has the annular protrusion 201a disposed on the upper surface thereof. The head (i.e., the press portion 223) of each of the retainer plates 220 is contactable with the annular protrusion 201a. This eliminates a risk that the downward pressure produced by the retainer plate 220 may be dispersed radially outward, thereby ensuring the stability in transmitting the pressure, as produced by the tightening of the fasteners 217, to the press portions 223.

After the busbar module 200 is secured to the stator holder 70, the I/O terminals 203 are, as illustrated in FIG. 31, disposed to be circumferentially 180 degrees opposite to the inlet opening 86a and the outlet opening 87a that communicate with the coolant path 85. The I/O terminals 203 and the inlet and outlet openings 86a and 87a may alternatively be disposed to be close to each other.

Next, the following describes the lead member 230 that electrically connects the I/O terminals 203 of the busbar module 200 to an external device of the rotating electrical machine 10.

The rotating electrical machine 10 is, as illustrated in FIG. 1, configured to have the I/O terminals 203 of the busbar module 200 disposed to project outward from the housing cover 242. The I/O terminals 203 are connected to the lead member 230 outside the housing cover 242. The lead member 230 is configured to connect the I/O terminals 203 for the respective phases extending from the busbar module 200 to power lines for the respective phases extending from an external apparatus, such as an inverter.

FIG. 33 is a longitudinal sectional view illustrating the housing cover 242 to which the lead member 230 is mounted. FIG. 34 is a perspective view of the lead member 230. The housing cover 242, as can be seen in FIG. 34, has the through holes 242a formed therethrough. The through holes 242a enable the I/O terminals 203 to be drawn out from the inside of the housing cover 242.

The lead member 230 includes the base 231 secured to the housing cover 242 and the terminal plug 232 fit in the through-hole 242a of the housing cover 242. The terminal plug 232 has formed therein three through-holes 233 through which the three I/O terminals 203 for the respective phases pass. The through-holes 233 are shaped to have elongated sections which are substantially aligned with each other.

The base 231 has mounted thereon three lead busbars 234 for the respective phases. Each of the lead busbars 234 is bent in an L-shape and secured to the base 231 using the fastener 235, such as a bolt. Each of the lead busbars 234 is also connected using the fastener 236, such as a combination of a bolt and a nut, to the head of the I/O terminal 203 disposed in a corresponding one of the through-holes 233 of the terminal plug 232.

To the lead member 230, unillustrated three-phase power wires can be connected. This enables power to be input to or output from each of the three-phase I/O terminals 203.

The structure of a control system for controlling an operation of the rotating electrical machine 10 will be described below. FIG. 35 is an electrical circuit diagram of the control system for the rotating electrical machine 10. FIG. 36 is a functional block diagram which illustrates control steps performed by the controller 270.

The stator winding 61 is, as illustrated in FIG. 35, made up of a U-phase winding, a V-phase winding, and a W-phase winding. The stator winding 61 connects with the inverter 260 working as a power converter. The inverter 260 is made of a bridge circuit having as many upper and lower arms as the phases of the stator winding 61. The inverter 260 is equipped with a series-connected part made up of the upper arm switch 261 and the lower arm switch 262 for each phase. Each of the switches 261 and 262 is turned on or off by a corresponding one of the driver circuits 263 to energize or deenergize a corresponding one of the phase windings. Each of the switches 261 and 262 is made of, for example, a semiconductor switch, such as a MOSFET or IGBT. The capacitor 264 is also connected to each of the series-connected parts made up of the switches 261 and 262 to output electrical charge required to achieve switching operations of the switches 261 and 262.

Intermediate joints of the upper arm switches 261 and the lower arm switches 262 are connected to ends of the U-phase winding, the V-phase winding, and the W-phase winding. The U-phase winding, the V-phase winding, and the W-phase winding are connected in the form of a star connection (i.e., Y-connection). The other ends of the U-phase winding, the V-phase winding, and the W-phase winding are connected with each other at a neutral point.

The control device 270 serves as a controller and is made up of a microcomputer equipped with a CPU and memories. The control device 270 analyzes information about parameters sensed in the rotating electrical machine 10 or a request for a motor mode or a generator mode in which the rotating electrical machine 10 operates to control switching operations of the switches 261 and 262 to excite or deexcite the stator winding 61. The parameters derived about the rotating electrical machine 10 include an angular position (i.e., electrical angle) of the rotor 20 measured by an angle detector, such as a resolver, the voltage at a power supply (i.e., voltage inputted to the inverter) measured by a voltage sensor, and/or exciting current for each phase winding measured by a current sensor. For instance, the control device 270 performs a PWM operation at a given switching frequency (i.e., carrier frequency) or an operation using a rectangular wave to turn on or off the switches 261 and 262. The control device 270 may be designed as a built-in controller installed inside the rotating electrical machine 10 or an external controller located outside the rotating electrical machine 10.

The rotating electrical machine 10 in this embodiment has a decreased electrical time constant because the rotating electrical machine 10 is of a slot-less structure (i.e., toothless structure), so that the stator 60 has a decreased inductance. In terms of the decreased electrical time constant, it is preferable to increase the switching frequency (i.e., carrier frequency) to enhance the switching speed in the rotating electrical machine 10. In terms of such requirements, the capacitor 264 serving as a charge supply capacitor is connected parallel to the series-connected part made up of the switches 261 and 262 for each phase of the stator winding 61, thereby reducing the wiring inductance, which deals with electrical surges even through the switching speed is enhanced.

The inverter 260 is connected at a high potential terminal thereof to a positive terminal of the dc power supply 265 and at a low potential terminal thereof to a negative terminal (i.e., ground) of the dc power supply 265. The dc power supply 265 is made of, for example, an assembly of a plurality of electrical cells connected in series with each other. The smoothing capacitor 266 is connected to the high and low potential terminals of the inverter 260 in parallel to the dc power supply 265.

FIG. 36 is a block diagram which illustrates a current feedback control operation to control electrical currents delivered to the U-phase winding, the V-phase winding, and the W-phase winding.

In FIG. 36, the current command determiner 271 uses a torque-dq map to determine current command values for the d-axis and the q-axis using a torque command value in the motor mode of the rotating electrical machine 10 (which will also be referred to as a motor-mode torque command value), a torque command value in the generator mode of the rotating electrical machine 10 (which will be referred to as a generator-mode torque command value), and an electrical angular velocity $\omega$ derived by differentiating an electrical angle $\theta$ with respect to time. The generator-mode torque command value is a regenerative torque command value in a case where the rotating electrical machine 10 is used as a power source of a vehicle.

The d-q converter 272 works to convert currents (i.e., three phase currents), as measured by current sensors mounted for the respective phase windings, into a d-axis current and a q-axis current that are components in a two-dimensional rotating Cartesian coordinate system in which a d-axis is defined as a direction of an axis of a magnetic field or field direction.

The d-axis current feedback control device 273 determines a command voltage for the d-axis as a manipulated variable for bringing the d-axis current into agreement with the current command value for the d-axis in a feedback mode. The q-axis current feedback control device 274 determines a command voltage for the q-axis as a manipulated variable for bringing the q-axis current into agreement with the current command value for the q-axis in a feedback mode. The feedback control devices 273 and 274 calculate the command voltage as a function of a deviation of each of the d-axis current and the q-axis current from a corresponding one of the current command values using PI feedback techniques.

The three-phase converter 275 works to convert the command values for the d-axis and the q-axis into command values for the U-phase, V-phase, and W-phase windings. Each of the devices 271 to 275 is engineered as a feedback controller to perform a feedback control operation for a fundamental current in the d-q transformation theory. The command voltages for the U-phase, V-phase, and W-phase windings are feedback control values.

The operation signal generator 276 uses the known triangle wave carrier comparison to produce operation signals for the inverter 260 as a function of the three-phase command voltages. Specifically, the operation signal generator 276 works to produce switch operation signals (i.e., duty signals) for the upper and lower arms for the three-phase windings (i.e., the U-, V-, and W-phase windings) under PWM control based on comparison of levels of signals derived by normalizing the three-phase command voltages using the power supply voltage with a level of a carrier signal, such as a triangle wave signal. The switch operation signals produced by the operation signal generator 276 are outputted to the drivers 263 of the inverter 260. The drivers 263 turn on or off the switches 261 and 263 for the phase windings.

Subsequently, a torque feedback control operation will be described below. This operation is to increase an output of the rotating electrical machine 10 and reduce torque loss in the rotating electrical machine 10, for example, in a high-speed and high-output range wherein an output voltage from the inverter 260 rises. The controller 270 selects one of the torque feedback control operation and the current feedback control operation and perform the selected one as a function of an operating condition of the rotating electrical machine 10.

FIG. 37 shows the torque feedback control operation for the U-, V-, and W-phase windings.

The voltage amplitude calculator 281 works to calculate a voltage amplitude command that is a command value of a degree of a voltage vector as a function of the motor-mode torque command value or the generator-mode torque command value for the rotating electrical machine 10 and the electrical angular velocity ω derived by differentiating the electrical angle θ with respect to time.

The d-q converter 282, like the d-q converter 272, works to convert currents, as measured by current sensors mounted for the respective phase windings, into a d-axis current and a q-axis current that are components. The torque calculator 283 calculates a torque value in the U-phase, V-phase, or the W-phase as a function of the d-axis current and the q-axis current converted by the d-q converter 282. The torque calculator 283 may be designed to calculate the voltage amplitude command using map listing relations among the d-axis current, the q-axis current, and the voltage amplitude command.

The torque feedback controller 284 calculates a voltage phase command that is a command value for a phase of the voltage vector as a manipulated variable for bringing the estimated torque value into agreement with the motor-mode torque command value or the generator-mode torque command value in the feedback mode. Specifically, the torque feedback controller 284 calculates the voltage phase command as a function of a deviation of the estimated torque value from the motor-mode torque command value or the generator-mode torque command value using PI feedback techniques.

The operation signal generator 285 works to produce the operation signal for the inverter 260 using the voltage amplitude command, the voltage phase command, and the electrical angle θ. Specifically, the operation signal generator 285 calculates the command values for the three-phase windings based on the voltage amplitude command, the voltage phase command, and the electrical angle θ and then generates switching operation signals for the upper and lower arms for the three-phase windings by means of PWM control based on comparison of levels of signals derived by normalizing the three-phase command voltages using the power supply voltage with a level of a carrier signal, such as a triangle wave signal. The switching operation signals produced by the operation signal generator 285 are then outputted to the drivers 263 of the inverter 260. The drivers 263 turns on or off the switches 261 and 262 for the phase windings.

The operation signal generator 285 may alternatively be designed to produce the switching operation signals using pulse pattern information that is map information about relations among the voltage amplitude command, the voltage phase command, the electrical angle θ, and the switching operation signal, the voltage amplitude command, the voltage phase command, and the electrical angle θ.

Modifications

Modifications of the above embodiment will be described below.

The arrangement of the magnets of the magnet unit 22 may be modified in the following way. The magnets 32 of the magnet unit 22 illustrated in FIG. 38 are each configured to have an easy axis of magnetization which is oblique to the radial direction of the magnet unit 22 and along which a magnetic path is created to extend linearly. This structure also enables the magnetic path created in each of the magnets 32 to have a length greater than the dimension or thickness of the magnets 32 in the radial direction, thereby enhancing the permeance in the magnets 32.

The magnet unit 22 may alternatively be engineered to have a Halbach array.

Each of the link portions 151 of each winding segment 151 may be bent to extend toward the radially inward or radially outward. Specifically, each first link portion 153A may be bent to be closer to the core assembly CA or farther away therefrom. Each second link portion 153B may be bent as long as the bent second link 153B circumferentially intersects with a part of the first link portion 153A at the axially outer side of the first link portion 153A.

The winding segments 151 may include only one of the first type of winding segments 151A and the second type of winding segments 151B. Specifically, each winding segment 151 may have a substantially L-shape or Z-shape as viewed from the side thereof. When each winding segment 151 is shaped to have a substantially L-shape, one of the link portions of the corresponding winding segment 151 at one of the first and the second ends may be bent toward the radially inward or radially outward, and the other of the link portions may extend without being bent. Alternatively, when each winding segment 151 is shaped to have a substantially Z-shape, one of the link portions of the corresponding winding segment 151 at one of the first and the second ends may be bent toward the radially inward or radially outward, and the other of the link portions may be bent toward the opposite direction of the one of the link portions. In any case, the insulating covers, each of which covers over a corresponding one of the link portions, may preferably cause the coil modules 150 to be secured to the core assembly CA.

In the above structure, all the winding segments 151 for each phase winding are connected in parallel to each other, but this may be modified as follows. Specifically, all the winding segments 151 for each phase may be divided into plural parallel-connection groups in which the winding segments 151 are connected in parallel to each other, and the parallel-connection groups may be connected in series to each other. For example, all n winding segments 151 for each phase may be divided into two parallel-connection groups in which n/2 winding segments 151 are connected in parallel to each other, and the two parallel-connection groups may be connected in series to each other. As another example, all n winding segments 151 for each phase may be divided into three parallel-connection groups in which n/3 winding segments 151 are connected in parallel to each other, and the three parallel-connection groups may be connected in series to each other. Moreover, all the winding segments 151 for each phase winding are connected in series to each other.

The stator winding 61 of the rotating electrical machine 10 may be comprised of two-phase windings, such as U-phase winding and a V-phase winding. In this example, the pair of intermediate conductor portions 152 of each phase winding are arranged one coil pitch away from each other. This arrangement of the pair of intermediate conductor portions 152 of each phase winding enables one intermediate conductor portion 152 of the other phase winding to be arranged between the pair of intermediate conductor portions 152 of the corresponding phase winding.

Although the rotating electrical machine 10 is designed as an outer-rotor surface-magnet rotating electrical machine, but however, may be designed as an inner-rotor surface-magnet rotating electrical machine. FIGS. 39(*a*) and 39(*b*) are views illustrating the structure of the stator unit 300 of the inner-rotor surface-magnet rotating electrical machine; the stator unit 300 is comprised of coil modules 310A and 310B. Specifically, FIG. 39(*a*) is a perspective view of the assembly of the core assembly CA and the coil modules 310A and 310B assembled to the inner peripheral surface of the core assembly CA. FIG. 39(*b*) is a perspective view of the winding segment 311A included in the coil module 310A and the winding segment 311B included in the coil module 310B. The inner-rotor surface-magnet rotating electrical machine is configured such that the stator holder 70 is assembled to the outer peripheral surface of the stator core 62 so that the core assembly CA is constructed. Additionally, the coil modules 310A and 310B are assembled to the inner peripheral surface of the stator core 62.

The winding segment 311A has substantially the same structure as that of the first winding segment 151A. Specifically, the winding segment 311A is comprised of a pair of intermediate conductor portions 312, and a pair of link portions 313A. Each of the link portions 313A is bent to extend radially outward toward the core assembly CA. The second winding segment 311B has substantially the same structure as that of the second winding segment 151B. Specifically, the winding segment 311B is comprised of a pair of intermediate conductor portions 312, and a pair of second link portions 313B. Each second link portion 313B circumferentially intersects with a part of the corresponding first link portion 313A at the axially outer side of the corresponding first link portion 313A. The insulating cover 315 is mounted to cover over each link portion 313A of the winding segment 311A. The insulating cover 316 is mounted to cover over each link portion 313B of the winding segment 311B.

The insulating cover 315 has opposing first and second circumferential sides, and the semi-circular recess 317 formed in each of the first and second circumferential sides thereof. The insulating cover 316 has the protrusion 318 extending radially outward. The protrusion 318 has an extending end, and a through hole 3019 formed through the extending end thereof.

FIG. 40 is a plan view illustrating that the first and second coil modules 310A and 310B are assembled to the core assembly CA. The stator holder 70, as illustrated in FIG. 40, has a plurality of recesses 105 formed in the end surface of each of the first and second ends in the axial direction. The recesses 105 are circumferentially arranged at regular intervals away from each other. The stator holder 70 has a cooling mechanism using liquid coolant or air. For example, the stator holder 70 may have, as an air-cooling mechanism, a plurality of fins mounted to the outer peripheral surface thereof.

Each insulating cover 316 is, as clearly illustrated in FIG. 40, axially overlapped with a corresponding circumferentially adjacent pair of insulating covers 315 while (1) The through hole 319, which serves as a second engagement portion, formed in the corresponding insulating cover 316 at a circumferentially center thereof is axially aligned with a corresponding pair of recesses 317, which serves as second engagement portions, formed in the corresponding circumferentially adjacent pair of insulating covers 315, (2) The fastening pin 321 is fit in the through hole 319 of each insulating cover 316 and the corresponding pair of recessed grooves 317 formed in the corresponding circumferentially adjacent pair of insulating covers 315, so that each insulating cover 316 and the corresponding circumferentially adjacent pair of insulating covers 315 are fastened to each other by the fastening pin 321.

Each fastening pin 321 is, as can be seen in FIG. 40, fit through the corresponding through hole 319 of the corresponding insulating cover 316 and the corresponding through hole formed by the recesses 317 of the insulating covers 315. This results in (1) The insulating covers 315 and 316 being fixedly mounted to each of the first and second outer surfaces of the stator holder 70 in the axial direction; the stator holder 70 is located radially outside the stator core 62, (2) The insulating covers 315 and 316 being fastened by the fastening pins 321.

The stator holder 70 is equipped with the coolant mechanism is, so that heat generated from the first winding segments 311A and 311B is likely to be transferred to the stator holder 70. The above configuration of the rotating electrical machine 10, therefore, has a higher performance of cooling the stator winding 61.

The stator 60 included in the rotating electrical machine 10 may include protrusions, such as teeth, protruding from its back yoke. In this modification, the coil modules 150 or other components may be assembled to the back yoke of the stator 60.

The rotating electrical machine 10 has a star-connection wiring structure, but however, may alternatively configured to have a delta-connection (Δ-configuration) wiring structure.

The rotating electrical machine 10, which is designed as a revolving-field type rotating electrical machine comprised of a rotor working as a magnetic field generator, and a stator working as an armature, but may be designed as a revolving armature type of rotating electrical machine comprised of a rotor working as an armature, and a stator serving as a magnetic field generator.

Second Modification

The magnet unit 22 and the stator winding 61 in each of the first embodiment and the above-described first modification may be designed to have structures described below. The following discussion will mainly refer to structural elements of the magnet unit 22 and the stator winding 61 which are different from those in the first embodiment and the first modification. The rotating electrical machine 10 in the second modification has substantially the same structure as that in the first embodiment.

The stator winding 61 will first be described. The stator winding 61, as already described with reference to FIG. 16, includes a plurality of winding segments 151 each of which is made of a winding of the conductor wire member CR. The winding segments 151 are connected in parallel to or series with each other to complete the stator winding 61. Each of the winding segments 151, as described with reference to FIGS. 18 to 25, includes a pair of intermediate conductor portions 152 and a pair of link portions 153A or 153B. The intermediate conductor portions 152 are arranged at a given interval away from each other in the circumferential direction of the stator winding 61. The link portions 153A or 153B connect a corresponding two of the intermediate conductor portions 152.

Next, how to produce the winding segments 151 will be described below. Each of the winding segments 151 is, as already described, made of a plurality of turns of the conductor wire member CR to thereby have a substantially rectangular or square shape in its transverse section. In other words, the single conductor wire member CR is multiply wound so that each of the intermediate conductor portions 152, as viewed in a transverse cross section thereof illustrated in FIG. 41, has segments (which will also be referred to below as wire segments) arrayed in the circumferential and radial directions of the stator winding 61. Specifically, each of the intermediate conductor portions 152 of the winding segments 151 has the wire segments of the conductor wire member CR which are arranged in a plurality of circumferential rows and a plurality of radial rows to thereby have substantially a rectangular shape in transverse cross section thereof. FIG. 41 exemplifies only the first coil module 150A, but the second coil module 150B is designed to have the same structure as that of the first coil module 150A.

How to wind the conductor wire member CR will be described below with reference to FIGS. 42 and 43. FIG. 42 is a perspective view of the bobbin 501 on which the conductor wire member CR is wound. FIG. 43 is a schematic view which illustrates the order in which the wire segments of the conductor wire member CR which form the intermediate conductor portion 152 are arranged (which will also be referred to as an arrangement order). In FIG. 43, the arrangement order of the conductor wire member CR is numbered. For the sake of convenience of discussion or illustration, FIG. 43 demonstrates the number of the wire segments of the conductor wire member CR (i.e., the number of circumferential rows and radial rows of the wire segments) which make each of the intermediate conductor portions 152 as being smaller than actual.

The production of each of the winding segments 151 is achieved by looping the conductor wire member CR, like an air core coil, around the bobbin 501 illustrated in FIG. 42. The bobbin 501 includes the flat plate member 502 and the quadrangular cylinder 503 extending upright from the plate member 502. The cylinder 503 is, as can be seen in FIG. 42, of a rectangular shape elongated vertically.

Specifically, the winding segment 151 is made by spooling the conductor wire member CR around the bobbin 501 while bringing segments (i.e., turns) of the conductor wire member CR on the outer periphery of the cylinder 503. More specifically, the conductor wire member CR is first wrapped about a portion of the outer periphery of the cylinder 503 close to the plate member 502 in a single turn. Such wrapping is started from one of the long sides of the cylinder 503. After being wound on the outer periphery of the cylinder 503 in a single turn, the conductor wire member CR is shifted perpendicularly away from the plate member 502 on one of the short sides of the cylinder 503 by a distance equivalent to the diameter of the conductor wire member CR without creating an air gap between adjacent segments (i.e., turns) of the conductor wire member CR on the long side of the cylinder 503 in the second turn. This causes the conductor wire member CR to be oriented obliquely to the plate member 502 on one of the short sides of the cylinder 503 and also perpendicular to the plate member 502 on the other short side and the opposed long sides of the cylinder 503. Such a sequence of winding operations is repeated, so that the wire segments (i.e., turns) of the conductor wire member CR are arranged or stacked on the outer periphery of the cylinder 503 without any air gap therebetween in a direction perpendicular to the plate member 502.

After a preselected number of the wire segments (i.e., turns) of the conductor wire member CR are stacked on one another in the direction perpendicular to the plate member 502 without any air gap therebetween in the form of a layer (which will also be referred to as a first layer), the conductor wire member CR is returned back toward the plate member 502 and continues to be wound over the first layer of the wire segments (i.e., turns) on the cylinder 503. Such a sequence of winding operations is repeated to stack the layers of the wire segments (i.e., turns) of the conductor wire member CR outward of the cylinder 503 to make a single winding of the conductor wire member CR. Finally, such a winding is removed from the bobbin 501 to complete the winding segment 151.

Afterwards, the winding segment 151 is subjected to bending. The insulating jackets 157 and the insulating covers 161 and 163 are also installed on the winding segment 151. This completes the coil module 150. The wire segments (i.e., turns) of the conductor wire member CR staked on the long sides of the cylinder 503 of the bobbin 501 constitute the intermediate conductor portions 152, while the wire segments stacked on the short sides of the cylinder 503 constitute the link portions 153A and 153B.

The single conductor wire member CR is wound in the above way to make the winding segment 151 with the wire segments arranged in a matrix form illustrated in FIG. 43, as viewed in a transverse cross section of the conductor wire member CR. In other words, the single conductor wire member CR is spooled several times in the circumferential direction of the bobbin 501 while being shifted to and from the plate member 502, thereby constructing the pair of intermediate conductor portions 152 which are used for the same phase and arranged adjacent to each other at a given coil pitch away from each other in the circumferential direction of the stator winding 61.

The paired intermediate conductor portions 152 of the conductor wire member CR are, therefore, as clearly illustrated in FIG. 43, shaped to have the wire segments which are located in circumferentially innermost rows (i.e., the first rows) and arranged in an orderly manner in the radial direction of the stator winding 61. Specifically, the first wire segment of the conductor wire member CR is placed in the circumferentially innermost row, as expressed as the first row in FIG. 43 (i.e., the first layer of turns), and the radially innermost row (i.e., the first stack of turns which is on a radially innermost side of the stator winding 61) in the left intermediate conductor portion 152. Subsequently, the second wire segment of the conductor wire member CR is placed in the circumferentially innermost row and the radially innermost row in the right intermediate conductor portion 152. The third wire segment of the conductor wire member CR is placed in the circumferentially innermost row and the second to the radially innermost row (which will also be referred to as the radially second row) in the left intermediate conductor portion 152. The fourth wire segment of the conductor wire member CR is placed in the circumferentially innermost row and the radially second row in the right intermediate conductor portion 152. Similarly, the fifth wire segment of the conductor wire member CR is placed in the circumferentially innermost row and the radially third row in the left intermediate conductor portion 152.

After a given number of turns (i.e., three turns in FIG. 42) of the conductor wire member CR are arranged in an orderly manner in the radial direction of the stator winding 61, the conductor wire member CR changes its direction of movement, in other words, is returned back in a direction opposite a direction in which the turns are made in the circumferentially innermost row (i.e., the first layer) and starts producing the second layer of turns over the first layer. In other words, the conductor wire member CR is wound from the radially outer side to the radially inner side of the stator winding 61 to have the wire segments of the conductor wire member CR arranged in an orderly manner.

Specifically, the sixth wire segment of the conductor wire member CR is placed in the second (i.e., the second layer) to the circumferentially innermost row (which will also be referred to as the circumferentially second row) and the radially third row (i.e., the third to the radially innermost row) in the right intermediate conductor portion 152. Subsequently, the seventh wire segment of the conductor wire member CR is placed in the circumferentially second row (i.e., the second layer) and the radially third row in the left intermediate conductor portion 152. The eighth wire segment of the conductor wire member CR is placed in the circumferentially second row and the radially second row in the right intermediate conductor portion 152. The ninth wire segment of the conductor wire member CR is placed in the circumferentially second row and the radially second row in the left intermediate conductor portion 152. Similarly, the tenth wire segment of the conductor wire member CR is placed in the circumferentially second row and the radially first row in the right intermediate conductor portion 152.

Afterwards, the conductor wire member CR changes its direction of movement and starts producing the third layer of turns over the second layer. Specifically, the eleventh wire segment of the conductor wire member CR is placed in the circumferentially third row and the radially first row in the left intermediate conductor portion 152. Next, the twelfth wire segment of the conductor wire member CR is placed in the circumferentially third row and the radially first row in the right intermediate conductor portion 152. The thirteenth wire segment of the conductor wire member CR is placed in the circumferentially third row and the radially second row in the left intermediate conductor portion 152. The fourteenth wire segment of the conductor wire member CR is placed in the circumferentially third row and the radially second row in the right intermediate conductor portion 152. Similarly, the fifteenth wire segment of the conductor wire member CR is placed in the circumferentially third row and the radially third row in the left intermediate conductor portion 152.

The above winding usually has a risk that when the conductor wire member CR changes its direction of movement on each end of the cylinder 503 of the bobbin 501, it may physically interfere with a corresponding one of portions of the conductor wire member CR having already been wound on the short sides of the cylinder 503 (which forms the link portions 153A or 153B). This may result in a failure in arranging turns of the conductor wire member CR close to each other on the long sides of the cylinder 503 without any gap therebetween, which results in a circumferentially outward positional deviation of turns of the conductor wire member CR in a subsequent layer. More specifically, in order to avoid interference with the portion of the conductor wire member CR wound on the short side of the cylinder 503 of the bobbin 501, the conductor wire member CR is, as denoted by a broken line in FIG. 43, shifted circumferentially outward. For instance, the sixth wire segment of the conductor wire member CR is not placed at an intersection between the circumferential first row and the radially third row in the right intermediate conductor portion 152. For the sake of better understanding, FIG. 43 demonstrates the sixth wire segment of the conductor wire member CR as being located in the circumferentially second row, but however, it may be arranged closer to the circumferentially first row. For the same reason described above, the eleventh wire segment of the conductor wire member CR is not placed at an intersection between the circumferentially second row and the radially first row in the left intermediate conductor portions 152.

the above winding of the conductor wire member CR will cause, as can be seen from FIGS. 41 and 43, the wire segments of the conductor wire member CR which construct the paired intermediate conductor portions 152 to be arrayed asymmetrically with respect to the circumferential center between the paired intermediate conductor portions 152. The stator 60 in the second modification is designed to have the slot-less structure described in the first embodiment, so that the magnetic flux, as produced by the magnet unit 22, directly interlinks with the conductor wire member CR of the stator winding 61. This will result in significant disadvantages arising from the asymmetrical arrangement of the wire segments of the conductor wire member CR. For instance, when one magnetic pole faces the paired intermediate conductor portions 152 of the same phase, it may result in torque ripple or a variation in electromotive force which generates a circulating current in the stator 60.

If the stator 60 is designed to have teeth which will not be magnetically saturated when subjected to magnetic flux produced by the magnets, the magnetic flux produced by the magnet unit 22 interlinks with the conductor wire member CR through the teeth, thereby resulting in no disadvantages arising the asymmetrical arrangement of the wire segments of the conductor wire member CR.

In view of the above fact, the magnet unit 22 in the second modification is designed to have the following structure. Specifically, the magnet unit 22 is, as illustrated in FIG. 44, equipped with a plurality of magnets 532 arranged adjacent to each other in the circumferential direction of the magnet unit 22 in a substantially circular shape. Each of the magnets 532 is of an arc-shape in transverse section thereof. The magnets 532 are separate from each other across the d-axis, but however, may alternatively be discrete from each other across the q-axis or both the d- and q-axes.

Each of the magnets 532 of the magnet unit 22 is magnetically oriented to have a plurality of easy axes of magnetization each of which is of an arc-shape around the orientation center point C10 defined on the q-axis. The easy axes of magnetization define magnetic paths in each of the magnets 532. The easy axes of magnetization at least include an easy axis of magnetization which extends along, in other words, in coincidence with an arc OA which is defined around the orientation center point C10 on the q-axis and passes the first intersection P1 (i.e., a point of intersection) between an end of the magnet 532 close to the d-axis and a peripheral surface of the magnet 532 (i.e., the magnetic flux acting surface 534) which faces the stator 60. The shape of each of the magnetic paths may be contoured as a portion of a true circle or a portion of an ellipse. The orientation center point C10 is, as described above, defined on the q-axis, but however, may alternatively be fixed at another location. It is, however, advisable that the orientation center point C10 be located closer to the q-axis than to the d-axis. FIG. 44 illustrates the orientation center point C10 as being positioned between each of the magnets 532 and the stator winding 61, but however, may alternatively be located away from the stator 60, in other words, closer to the magnet holder 31 than the magnetic flux acting surface 534 is.

In the second modification, the tangent line Tn1 which touches the magnetic path at the first intersection P1 is selected to be inclined to the d-axis at a given orientation oblique angle θ10. Specifically, each of the easy axes of magnetization in the magnets 532 is preferably oblique to the d-axis at an angle in an angular range (e.g., 15° to 45°) at least on the end of the magnet 532 close to the d-axis or the first intersection P1.

It is found that the oblique orientation of the easy axes of magnetization to the d-axis facilitates concentration of vectors of magnetic fluxes, as outputted from the stator-facing peripheral surface (i.e., the magnetic flux acting surface 534) of the magnet 532, on the d-axis, which results in an enhanced density of magnetic flux on the d-axis as compared with when the easy axes of magnetization are oriented parallel to the d-axis.

If the easy axes of magnetization are inclined overly more than a certain angle, it will result in an undesirable reduction in vector component of magnetic fluxes flowing out of the stator-facing peripheral surface (i.e., the magnetic flux acting surface 534) of the magnet 532, which leads to a decrease in density of magnetic flux on the d-axis. It is, therefore, desirable that the orientation oblique angle be selected from an angular range in light of the shape of the magnets 532 or the size of the air gap to increase the density of magnetic flux on the d-axis to be greater than that when the easy axes of magnetization are oriented parallel to the d-axis. The tangent line Tn1 at the first intersection P1 may be oriented parallel to the d-axis.

Each of the magnets 532 has the magnet recess 510 formed in the magnetic flux acting surface 534 that is an armature-facing peripheral surface thereof. The magnet recess 510 lies around the q-axis and is curved inward in the magnet 532, in other words, radially away from the stator 60 (i.e., radially outward of the rotor 20). Each of the magnet recesses 510 extends in the axial direction of the rotor 20 in the shape of a groove. Each of the magnet recesses 510 occupies an electrical angle of 60° or more about the center of the rotor 20 across the q-axis. Specifically, in the second modification, each of the magnet recesses 510 occupies an electrical angle of 60° across the q-axis.

The magnet unit 22 has the major magnetic pole faces 520 which are defined by portions of the magnetic flux acting surfaces 534. Each of the major magnetic pole faces 520 is arranged closer to the d-axis than to the q-axis and faces the stator winding 61 through an air gap therebetween. In the second modification, each of the major magnetic pole faces 520 lies between every two of the magnet recesses 510 which are arranged adjacent to each other in the circumferential direction of the rotor 20. In other words, each of the major magnetic pole faces 520 is defined by portions of the magnetic flux acting surfaces 534 which are located closest to the stator winding 61.

Each of the major magnetic pole faces 520 is geometrically shaped to have a circumferential direction which is selected not to face the intermediate conductor portions 152 of the same phase, in other words, the paired intermediate conductor portions 152. Specifically, the major magnetic pole angle θa is selected to be less than or equal to the inter-conductor angle θb. The major magnetic pole angle θa is an angle which a first straight line makes with a second straight line. The first straight line is defined to extend between one of circumferentially opposed ends of each of the major magnetic pole faces 520 and the center of rotation of the rotor 20. The second straight line is defined to extend between the other end of a corresponding one of the major magnetic pole faces 520 and the center of rotation (i.e., the axial center) of the rotor 20. The inter-conductor angle θb is an angle which a third straight line makes with a fourth straight line. The third straight line is defined to extend between a circumferentially inner end of one of the paired intermediate conductor portions 152 and the center of rotation of the rotor 20. The fourth straight line is defined to extend between a circumferentially inner end of the other intermediate conductor portion 152 and the center of rotation of the rotor 20.

More specifically, the major magnetic pole angle θa is determined to meet an electrical angle relation of 0<θa≤120°. Every two of the major magnetic pole faces 520 which are arranged adjacent to each other in the circumferential direction of the rotor 20 are located at an interval of 60° or more in electrical angle away from each other. In the second modification, the major magnetic pole angle θa is set to 120°. The major magnetic pole faces 520 arranged adjacent to each other in the circumferential direction are located at an electrical angle of 60° away from each other. The major magnetic pole angle θa is selected to be equal to the inter-conductor angle θb.

The second modification offers the following beneficial advantages.

The major magnetic pole angle θa is, as described above, selected to be less than or equal to the inter-conductor angle θb. More specifically, the major magnetic pole angle θa is determined to be 120°. The major magnetic pole faces 520 arranged adjacent to each other in the circumferential direction are located at an electrical angle of 60° away from each other. Such an angular relation results in each of the major magnetic pole faces 520 not simultaneously facing the paired intermediate conductor portions 152, in other words, the intermediate conductor portions 152 belonging to the same phase. This minimizes the torque ripple regardless of the above-described asymmetric arrangement of the wire segments of each conductor wire member CR which constitute the paired intermediate conductor portions 152. The fact that each major magnetic pole face 520 does not simultaneously face the intermediate conductor portions 152 of the same phase serves to reduce the circulating current.

The magnet unit 22 is magnetically oriented to have a plurality of easy axes of magnetization each of which is of an arc-shape around the orientation center point C/O defined on the q-axis. The easy axes of magnetization define the magnetic paths in each of the magnets 532. This results in an undesirable decreased length of the magnetic paths in a portion of each magnet 532 which is located close to the q-axis and the stator 60, so that they are easily demagnetized. In order to alleviate this drawback, each magnet 532 has the magnet recess 510 formed to remove the above easy-to-demagnetize portion, thereby enabling the volume of material of each magnet 532 to be decreased without sacrificing the density of magnetic flux around the d-axis.

The magnet unit 22 has the easy axes of magnetization which extend more parallel to the d-axis in a region close to the d-axis than that in a region close to the q-axis. The magnetic paths are defined along the easy axes of magnetization. More specifically, the easy axes of magnetization are developed which are in the shape of an arc around the orientation center point C/O defined on the q-axis and create the magnetic paths in each magnet 532. Such a geometrical shape of the easy axes of magnetization results in an increased length of the magnetic path, thereby facilitating concentration of magnetic fluxes flowing from the q-axis to enhance the density of magnetic flux on the d-axis.

The paired intermediate conductor portions 152 are made by starting winding conductor wire member CR from the circumferentially inner sides thereof and stacking segments of the conductor wire member CR on each other on a layer-basis. The conductor wire member CR is wound to arrange turns in an orderly manner in the radial direction of the stator winding 61 and reversed in its winding direction when reaching the radial ends of the intermediate conductor portions 152. This causes the segments of the conductor wire member CR to be arranged bilaterally symmetrically other than the radial ends of the intermediate conductor portions 152. This minimizes asymmetrical portions of the segments of the conductor wire member CR, thereby reducing adverse effects arising from the asymmetrical arrangement of the segments of conductor wire member CR between the intermediate conductor portions 152.

Variation of Second Modification

The structure in the second modification may be changed in the following way. The following discussion mainly refer to structural parts different from those in the first embodiment or the first and second modifications. This variation will be discussed, as an example, with reference to the structure in the second modification.

If the number of phases of the stator winding 61 is expressed by S, the major magnetic pole angle θa is preferably selected to meet a relation of 0<θa≤2π/S.

The magnet unit 22 in the second modification may be designed, as illustrated in FIG. 45, to have a Halbach array of magnets. The magnet unit 22, as illustrated in FIG. 45, includes the first magnets 601 and the second magnets 602. Each of the first magnets 601 has easy axes of magnetization which are oriented linearly along the d-axis and form magnetic paths extending therealong. Each of the second magnets 602 has easy axes of magnetization which are oriented linearly along the q-axis and which form magnetic paths extending therealong. The first magnets 601 and the second magnets 602 are arranged alternately in the circumferential direction of the magnet unit 22. The first magnets 601 and the second magnets 602 of the magnet unit 22 are magnetized to have directions of magnetization to create magnetic polarities alternating in the circumferential direction. The magnet unit 22, as clearly illustrated in FIG. 45, has the major magnetic pole faces 612 each of which has a circumferential dimension substantially equal to that of each of the first magnets 601.

Each of the major magnetic pole faces 612 may be shaped to have the major magnetic pole angle θa which is less than or equal to the inter-conductor angle θb. The major magnetic pole angle θa is selected to meet a relation of 0<θa≤120° in electrical angle. Every two of the major magnetic pole faces 612 which are arranged adjacent to each other in the circumferential direction of the magnet unit 22 are located at an interval of 60° or more in electrical angle away from each other.

The magnet unit 22 in the second modification may alternatively, as illustrated in FIG. 46, include a plurality of magnets 650 having easy axes of magnetization which are oriented linearly along the d-axis (or the radial direction of the magnet unit 22) and form magnetic paths extending therealong. The magnets 650 are arranged at equal intervals away from each other through air gaps in the circumferential direction. The magnet unit 22 in FIG. 46 has major magnetic pole faces each of which is shaped to have a circumferential dimension substantially equal to that of the stator facing peripheral surface 652 of the magnet 650. The major magnetic pole angle θa of the major magnetic pole faces is selected to be less than or equal to the inter-conductor angle θb. The major magnetic pole angle θa is selected to meet a relation of 0<θa≤120° in electrical angle. Every two of the major magnetic pole faces 612 which are arranged adjacent to each other in the circumferential direction of the magnet unit 22 are located at an interval of 60° or more in electrical angle away from each other.

The methods of winding the conductor wire member CR in the second modification may be changed. For instance, the conductor wire member CR may, as demonstrated in FIG. 47, start to be wound from one of radially opposed ends of the cylinder 503 of the bobbin 501 to have wire segments arranged on stack-to-stack basis. After the wire segments are arranged adjacent each other in the circumferential direction to make the first stack, the conductor wire member CR continues to be wound to make the second stack arranged adjacent to the first stack in the radial direction of the stator winding 61. This winding may also have a risk that when the conductor wire member CR changes its direction of movement, it may physically interfere with portions of the conductor wire member CR having already been wound to form the link portions 153A or 153B. In order to avoid such interference, the stacks of the wire segments of the conductor wire member CR are, as can be seen in FIG. 47, changed in number of the wire segments between the layers, thereby resulting in bilaterally asymmetrical arrangement of the wire segments of the conductor wire member CR between the paired intermediate conductor portions 152.

The stator 60 in the second modification has no inter-conductor members between the intermediate conductor portions 152 arranged adjacent to each other in the circumferential direction, but however, may alternatively be designed to have non-magnetic material made inter-conductor members disposed between the intermediate conductor portions 152. For instance, resinous members may be each arranged between the intermediate conductor portions 152. As the inter-conductor members, magnetic material is used which meets a relation of Wt×Bs<Wm×Br where Wt is a width of the inter-conductor members in the circumferential direction within one magnetic pole, Bs is the saturation magnetic flux density of the inter-conductor members, Wm is a width of the magnets 32 equivalent to one magnetic pole in the circumferential direction, and Br is the remanent flux density in the magnet 32. For instance, the stator 60 may be designed to have toothed portions or protrusions which are extra-fine or extremely small not to function as conventional teeth usually used in stators.

This disclosure in this application is not limited to the above-described embodiments. This disclosure includes the above embodiments and modifications which may be made by those of ordinary skill in the art. For instance, this disclosure is not limited to parts or combinations of the parts referred to in the embodiments, but may be realized using various combinations of the parts. This disclosure may include additional possible arrangements or omissions of the parts in the embodiments. This disclosure may include exchanges of the parts among the embodiments or combinations of the parts in the embodiments. Disclosed technical scopes are not limited to statements in the embodiments. It should be appreciated that the disclosed technical scopes include elements specified in the appended claims, equivalents of the elements, or all possible modifications of the elements without departing from the principle of this disclosure.

While this disclosure has referred to the preferred embodiments, it should be appreciated that the disclosure is not limited to the embodiments. This disclosure may include a variety of combinations of the embodiments, a combination of diverse modifications of the embodiments and equivalents thereof.

What is claimed is:

1. A rotating electrical machine comprising:
a magnetic field-producing unit including a magnet unit which is equipped with a plurality of magnetic poles whose polarities alternate in a circumferential direction of the magnet unit;
an armature which includes a multi-phase armature winding; and
a rotor which is implemented by one of the magnetic field-producing unit and the armature, wherein
the armature winding is made of a winding of a conductor wire member and includes conductor portions which face the magnet unit and are arranged at a given interval away from each other in a circumferential direction of the armature,
the armature is configured to have one of a first, a second, and a third structure:
the first structure is equipped with inter-conductor members each of which is disposed between the conductor portions in the circumferential direction and made using a magnetic material which meets a relation of Wt×Bs≤Wm×Br where Wt is a width of the inter-conductor members in the circumferential direction within one magnetic pole, Bs is a saturation magnetic flux density of the inter-conductor members, Wm is a width of a portion of the magnet unit equivalent to one magnetic pole in the circumferential direction, and Br is the remanent flux density in the magnet unit,
the second structure has the inter-conductor members each of which is made of a non-magnetic material, and
the third structure has no inter-conductor members disposed between the conductor portions in the circumferential direction,
each of the conductor portions includes wire segments of the conductor wire member which are arranged in a plurality of circumferentially arranged rows and a plurality of radially arranged rows,
the conductor portions include a first conductor portion and a second conductor portion which are arranged adjacent to each other in the circumferential direction as a pair and belong to a same phase, the first conductor portion including the wire segments of the conductor wire member which are arranged asymmetrically with those of the second conductor portion in the circumferential direction,
the magnet unit includes a plurality of magnets which are arranged adjacent to each other in the circumferential direction,
the magnets have armature-facing peripheral surfaces which include major magnetic pole faces each of which is disposed across a d-axis that is a center of the magnetic pole, and
a major magnetic pole angle ($\theta a$) is selected to be less than or equal to an inter-conductor angle ($\theta b$), the major magnetic pole angle being an angle which a first straight line makes with a second straight line, the first straight line being defined to extend between one of circumferentially opposed ends of each of the major magnetic pole faces and the center of rotation of the rotor, the second straight line being defined to extend between the other end of a corresponding one of the major magnetic pole faces and the center of rotation of the rotor, the inter-conductor angle being an angle which a third straight line makes with a fourth straight line, the third straight line being defined to extend between a circumferentially inner end of one of the first and second conductor portions and the center of rotation of the rotor, the fourth straight line being defined to extend between a circumferentially inner end of other of the first and second conductor portions and the center of rotation of the rotor.

2. The rotating electrical machine as set forth in claim 1, wherein the major magnetic pole angle is selected to meet a relation of $0<\theta a \leq 120°$, and two of the major magnetic pole faces which are arranged adjacent to each other in the circumferential direction are located at an interval of 60° or more in electrical angle away from each other.

3. The rotating electrical machine as set forth in claim 2, wherein each of the magnets is magnetically oriented to have easy axes of magnetization which extend more parallel to the d-axis in a region close to the d-axis than that in a region close to a q-axis that is a magnetic boundary between the poles, the easy axes of magnetization defining magnetic paths extending therealong,
each of the magnets has a magnet recess formed in a peripheral surface thereof facing the armature, the magnet recess lying around the q-axis and being curved inward in the magnet in a radial direction of the magnet unit,
each of the magnet recesses occupies an electrical angle of 60° or more across the q-axis, and
each of the major magnetic pole faces lies between two of the magnet recesses which are arranged adjacent to each other in the circumferential direction.

4. The rotating electrical machine as set forth in claim 3, wherein if the number of phases of the armature winding is expressed by S, the major magnetic pole angle is selected to meet a relation of $0<\theta a \leq 2\pi/S$ in electrical angle.

5. The rotating electrical machine as set forth in claim 4, wherein the armature winding includes a plurality of winding segments each of which is of a circular shape and made of a winding of the conductor wire member,
each of the winding segments includes the pair of first and second conductor portions and a pair of link portions which connects the first and second conductor portions together, and
each of the first and second conductor portions has a first row that is one of the radially arranged rows of the wire segments of the conductor wire member, the first row being located at one of radial ends of a corresponding one of the first and second conductor portions, the wire segments of the first rows being asymmetrically arranged in the circumferential direction between the first and second conductor portions, each of the first and second conductor portions also having a second row that is one of the radially arranged rows of the wire segments other than the first row, the wire segments of the second rows being symmetrically arranged in the circumferential direction between the first and second conductor portions.

6. The rotating electrical machine as set forth in claim 3, wherein the armature winding includes a plurality of winding segments each of which is of a circular shape and made of a winding of the conductor wire member,
each of the winding segments includes the pair of first and second conductor portions and a pair of link portions which connects the first and second conductor portions together, and
each of the first and second conductor portions has a first row that is one of the radially arranged rows of the wire segments of the conductor wire member, the first row being located at one of radial ends of a corresponding one of the first and second conductor portions, the wire segments of the first rows being asymmetrically arranged in the circumferential direction between the first and second conductor portions, each of the first and second conductor portions also having a second row that is one of the radially arranged rows of the wire segments other than the first row, the wire segments of the second rows being symmetrically arranged in the circumferential direction between the first and second conductor portions.

7. The rotating electrical machine as set forth in claim 2, wherein if the number of phases of the armature winding is expressed by S, the major magnetic pole angle is selected to meet a relation of $0<\theta a \leq 2\pi/S$ in electrical angle.

8. The rotating electrical machine as set forth in claim 7, wherein the armature winding includes a plurality of winding segments each of which is of a circular shape and made of a winding of the conductor wire member, each of the winding segments includes the pair of first and second conductor portions and a pair of link portions which connects the first and second conductor portions together, and each of the first and second conductor portions has a first row that is one of the radially arranged rows of the wire segments of the conductor wire member, the first row being located at one of radial ends of a corresponding one of the first and second conductor portions, the wire segments of the first rows being asymmetrically arranged in the circumferential direction between the first and second conductor portions, each of the first and second conductor portions also having a second row that is one of the radially arranged rows of the wire segments other than the first row, the wire segments of the second rows being symmetrically arranged in the circumferential direction between the first and second conductor portions.

9. The rotating electrical machine as set forth in claim 2, wherein the armature winding includes a plurality of winding segments each of which is of a circular shape and made of a winding of the conductor wire member, each of the winding segments includes the pair of first and second conductor portions and a pair of link portions which connects the first and second conductor portions together, and each of the first and second conductor portions has a first row that is one of the radially arranged rows of the wire segments of the conductor wire member, the first row being located at one of radial ends of a corresponding one of the first and second conductor portions, the wire segments of the first rows being asymmetrically arranged in the circumferential direction between the first and second conductor portions, each of the first and second conductor portions also having a second row that is one of the radially arranged rows of the wire segments other than the first row, the wire segments of the second rows being symmetrically arranged in the circumferential direction between the first and second conductor portions.

10. The rotating electrical machine as set forth in claim 1, wherein each of the magnets is magnetically oriented to have easy axes of magnetization which extend more parallel to the d-axis in a region close to the d-axis than that in a region close to a q-axis that is a magnetic boundary between the poles, the easy axes of magnetization defining magnetic paths extending therealong, each of the magnets has a magnet recess formed in a peripheral surface thereof facing the armature, the magnet recess lying around the q-axis and being curved inward in the magnet in a radial direction of the magnet unit, each of the magnet recesses occupies an electrical angle of 60° or more across the q-axis, and each of the major magnetic pole faces lies between two of the magnet recesses which are arranged adjacent to each other in the circumferential direction.

11. The rotating electrical machine as set forth in claim 10, wherein if the number of phases of the armature winding is expressed by S, the major magnetic pole angle is selected to meet a relation of $0<\theta a \leq 2\pi/S$ in electrical angle.

12. The rotating electrical machine as set forth in claim 11, wherein the armature winding includes a plurality of winding segments each of which is of a circular shape and made of a winding of the conductor wire member, each of the winding segments includes the pair of first and second conductor portions and a pair of link portions which connects the first and second conductor portions together, and each of the first and second conductor portions has a first row that is one of the radially arranged rows of the wire segments of the conductor wire member, the first row being located at one of radial ends of a corresponding one of the first and second conductor portions, the wire segments of the first rows being asymmetrically arranged in the circumferential direction between the first and second conductor portions, each of the first and second conductor portions also having a second row that is one of the radially arranged rows of the wire segments other than the first row, the wire segments of the second rows being symmetrically arranged in the circumferential direction between the first and second conductor portions.

13. The rotating electrical machine as set forth in claim 10, wherein the armature winding includes a plurality of winding segments each of which is of a circular shape and made of a winding of the conductor wire member, each of the winding segments includes the pair of first and second conductor portions and a pair of link portions which connects the first and second conductor portions together, and each of the first and second conductor portions has a first row that is one of the radially arranged rows of the wire segments of the conductor wire member, the first row being located at one of radial ends of a corresponding one of the first and second conductor portions, the wire segments of the first rows being asymmetrically arranged in the circumferential direction between the first and second conductor portions, each of the first and second conductor portions also having a second row that is one of the radially arranged rows of the wire segments other than the first row, the wire segments of the second rows being symmetrically arranged in the circumferential direction between the first and second conductor portions.

14. The rotating electrical machine as set forth in claim 1, wherein if the number of phases of the armature winding is expressed by S, the major magnetic pole angle is selected to meet a relation of $0<\theta a \leq 2\pi/S$ in electrical angle.

15. The rotating electrical machine as set forth in claim 14, wherein the armature winding includes a plurality of winding segments each of which is of a circular shape and made of a winding of the conductor wire member, each of the winding segments includes the pair of first and second conductor portions and a pair of link portions which connects the first and second conductor portions together, and each of the first and second conductor portions has a first row that is one of the radially arranged rows of the wire segments of the conductor wire member, the first row being located at one of radial ends of a corresponding one of the first and second conductor portions, the wire segments of the first rows being asymmetrically arranged in the circumferential direction between the first and second conductor portions, each of the first and second conductor portions also having a second row that is one of the radially arranged rows of the wire segments other than the first row, the wire segments of the second rows being symmetrically arranged in the circumferential direction between the first and second conductor portions.

16. The rotating electrical machine as set forth in claim 1, wherein the armature winding includes a plurality of winding segments each of which is of a circular shape and made of a winding of the conductor wire member, each of the winding segments includes the pair of first and second conductor portions and a pair of link portions which connects the first and second conductor portions together, and each of the first and second conductor portions has a first row that is one of the radially arranged rows of the wire segments of the conductor wire member, the first row being located at one of radial ends of a corresponding one of the first and second conductor portions, the wire segments of the first rows being asymmetrically arranged in the circumferential direction between the first and second conductor portions, each of the first and second conductor portions also having a second row that is one of the radially arranged rows of the wire segments other than the first row, the wire segments of the second rows being symmetrically arranged in the circumferential direction between the first and second conductor portions.

* * * * *